(12) United States Patent
Ito et al.

(10) Patent No.: US 7,965,840 B2
(45) Date of Patent: Jun. 21, 2011

(54) DATA TRANSMISSION AND RECEPTION METHOD AND DATA TRANSMISSION AND RECEPTION DEVICE

(75) Inventors: Yujiro Ito, Kanagawa (JP); Tsutomu Shimosato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1544 days.

(21) Appl. No.: 10/483,376

(22) PCT Filed: May 7, 2003

(86) PCT No.: PCT/JP03/05676
§ 371 (c)(1),
(2), (4) Date: Jan. 9, 2004

(87) PCT Pub. No.: WO03/096608
PCT Pub. Date: Nov. 20, 2003

(65) Prior Publication Data
US 2004/0158726 A1      Aug. 12, 2004

(30) Foreign Application Priority Data
May 10, 2002   (JP) ................................ 2002-135039

(51) Int. Cl.
*H04N 7/167* (2006.01)
(52) U.S. Cl. ........ 380/214; 380/201; 380/204; 380/217; 380/224; 380/226; 348/61; 348/469
(58) Field of Classification Search ............... 380/200, 380/204, 210, 214, 217, 224, 226, 274; 718/250; 725/38, 90; 348/61–100, 469
See application file for complete search history.

(56) References Cited

U.S. PATENT DOCUMENTS

| | | | |
|---|---|---|---|
| 4,390,898 A * | 6/1983 | Bond et al. | 380/214 |
| 4,654,480 A | 3/1987 | Weiss | |
| 4,742,544 A * | 5/1988 | Kupnicki et al. | 380/215 |
| 5,371,547 A * | 12/1994 | Siracusa et al. | 375/240.01 |
| 5,561,714 A * | 10/1996 | Hershberger | 380/216 |
| 5,606,612 A * | 2/1997 | Griffin et al. | 380/217 |

(Continued)

FOREIGN PATENT DOCUMENTS

EP            0 199 161            10/1986

(Continued)

OTHER PUBLICATIONS

Jack K: "Video Demystified, Digital Video Interfaces" Video Demystified, XX, XX, Jan. 1, 2001, pp. 92-185, XP002393272.

*Primary Examiner* — Edan Orgad
*Assistant Examiner* — Yin-Chen Shaw
(74) *Attorney, Agent, or Firm* — Frommer Lawrence & Haug LLP; William S. Frommer; Thomas F. Presson

(57) ABSTRACT

A method of transmitting and receiving data in which cipher-transmission of digital information data for which forbidden codes including timing identification codes are predetermined can be carried out with enciphered digital information data without containing undesirable forbidden code. Digital information data contained in word sequence data which also contain time reference code data composed of the timing identification codes are subjected to enciphering process without producing the forbidden code to produce the enciphered digital information data which do not contain any forbidden code. Enciphered word sequence data are constituted with the enciphered digital information data and the time reference code data to be transmitted.

10 Claims, 20 Drawing Sheets

FORBIDDEN CODE FOR HD SIGNALS (10 BITS WORD)

| 000h | 0000000000 | 3FCh | 1111111100 |
|---|---|---|---|
| ↓ | 0000000001 | ↓ | 1111111101 |
| ↓ | 0000000010 | ↓ | 1111111110 |
| 003h | 0000000011 | 3FFh | 1111111111 |

U.S. PATENT DOCUMENTS

| | | | | | |
|---|---|---|---|---|---|
| 5,706,346 | A | * | 1/1998 | Katta et al. | 380/217 |
| 5,719,943 | A | * | 2/1998 | Amada et al. | 380/202 |
| 5,923,384 | A | * | 7/1999 | Enomoto et al. | 348/705 |
| 6,049,568 | A | * | 4/2000 | Kagawa | 375/240.28 |
| 6,526,144 | B2 | * | 2/2003 | Markandey et al. | 380/28 |
| 7,203,955 | B2 | * | 4/2007 | Mercier | 725/141 |
| 7,221,406 | B2 | * | 5/2007 | Yamashita | 348/469 |

FOREIGN PATENT DOCUMENTS

| | | |
|---|---|---|
| EP | 0 641 130 | 3/1995 |
| GB | 2 276 799 | 10/1994 |
| JP | 63-502393 | 9/1988 |
| JP | 63 502393 | 9/1988 |
| JP | 4 179344 | 6/1992 |
| JP | 4-179344 | 6/1992 |
| JP | 6-225258 | 8/1994 |
| JP | 6 225258 | 8/1994 |
| JP | 7-67140 | 3/1995 |
| JP | 7 67140 | 3/1995 |
| JP | 10-108217 | 4/1998 |
| JP | 10 108217 | 4/1998 |
| JP | 2001 326616 | 11/2001 |
| JP | 2001-326616 | 11/2001 |
| JP | 2004 312405 | 11/2004 |
| WO | WO 91 16778 | 10/1991 |

* cited by examiner

FIG 1
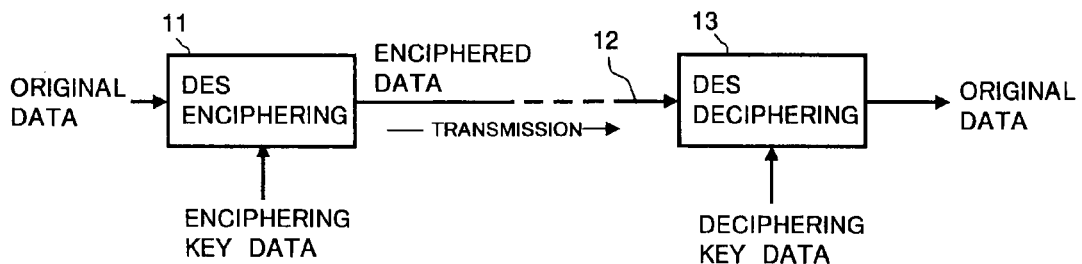
FIG 3
FORBIDDEN CODE FOR HD SIGNALS (10 BITS WORD)
| 000h | 0 0 0 0 0 0 0 0 0 0 | 3FCh | 1 1 1 1 1 1 1 1 0 0 |
| --- | --- | --- | --- |
| ↓ | 0 0 0 0 0 0 0 0 0 1 |  | 1 1 1 1 1 1 1 1 0 1 |
|  | 0 0 0 0 0 0 0 0 1 0 | ↓ | 1 1 1 1 1 1 1 1 1 0 |
| 003h | 0 0 0 0 0 0 0 0 1 1 | 3FFh | 1 1 1 1 1 1 1 1 1 1 |
FIG 5
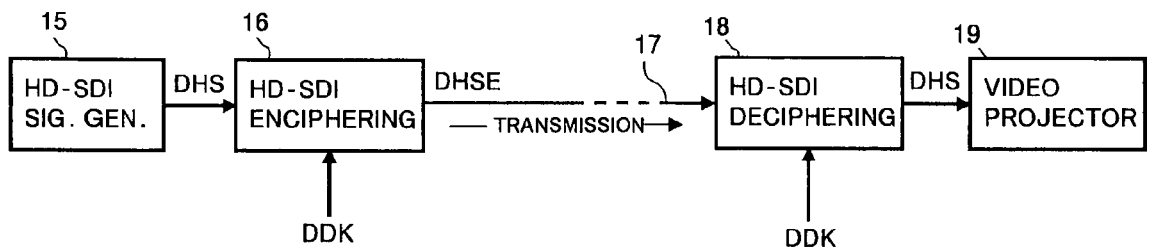

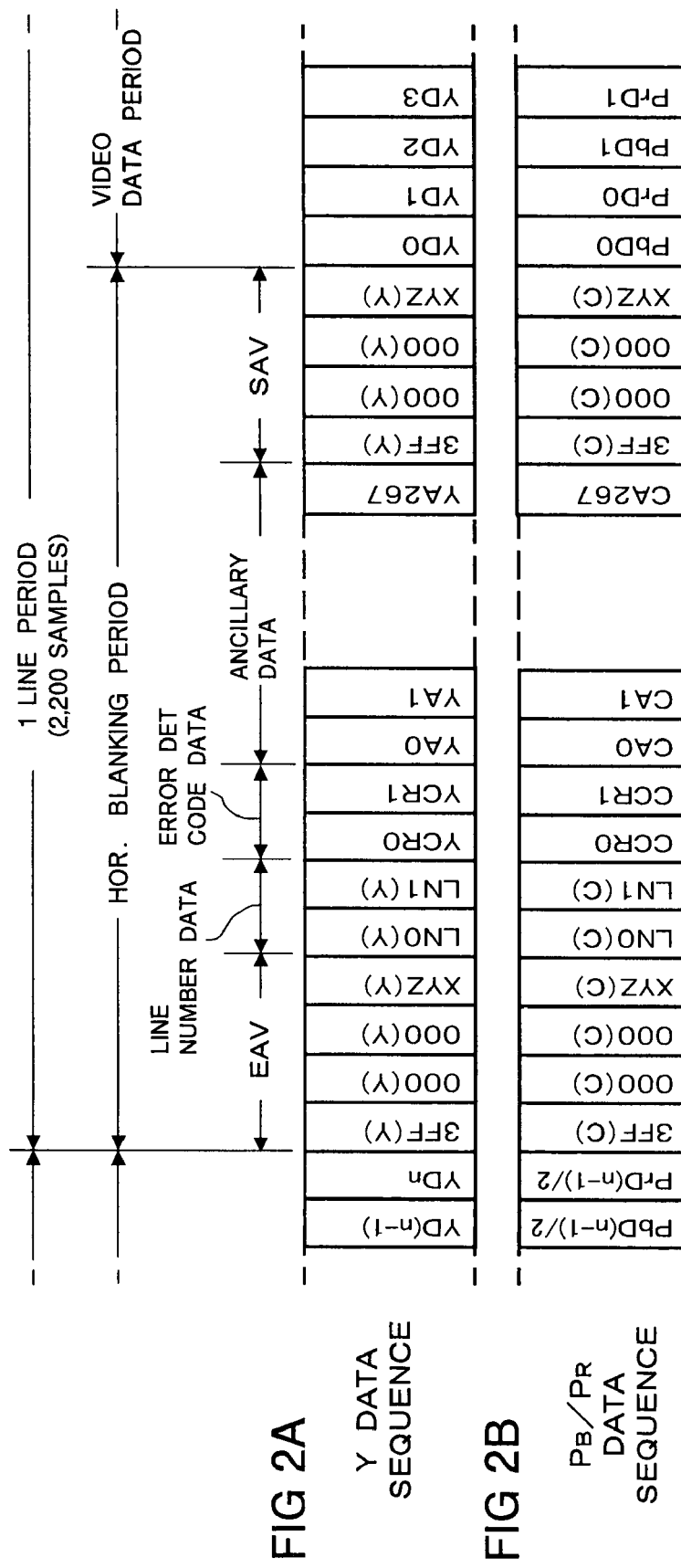

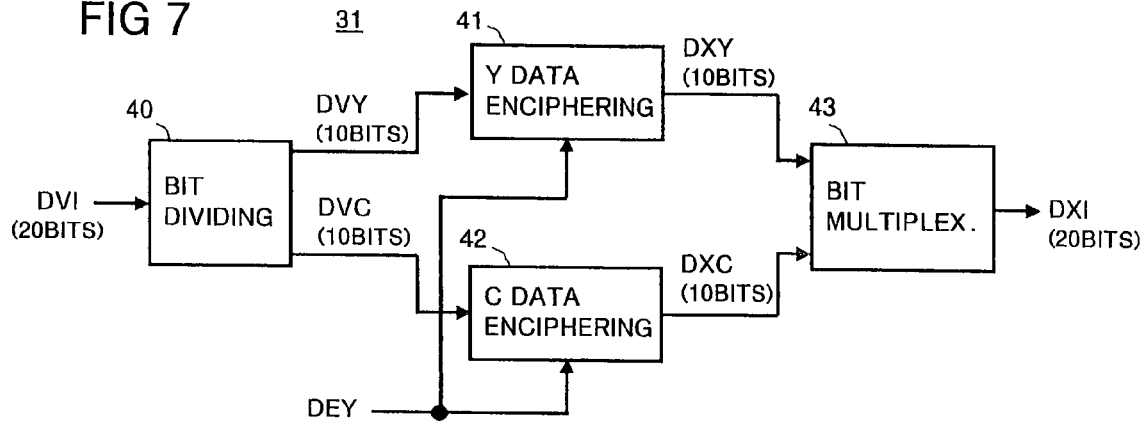
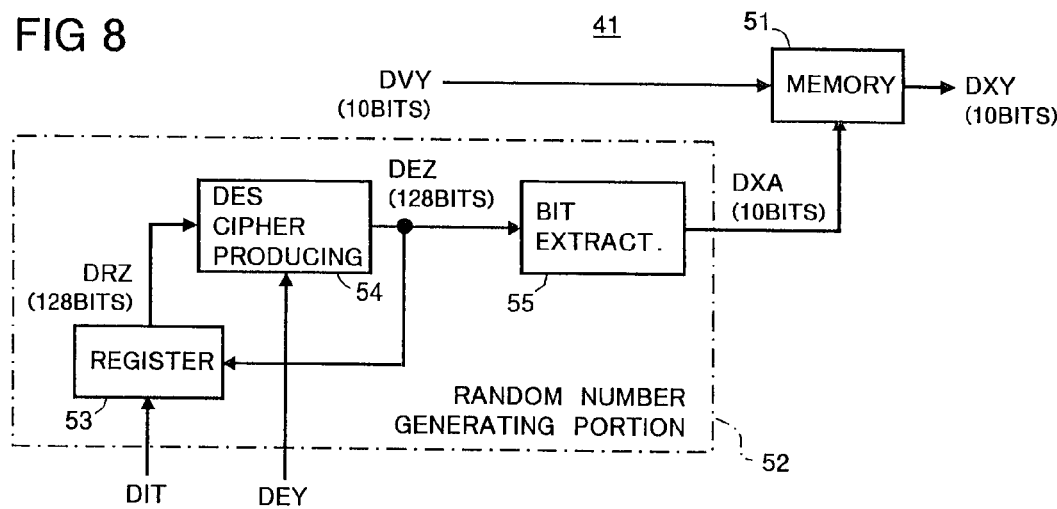
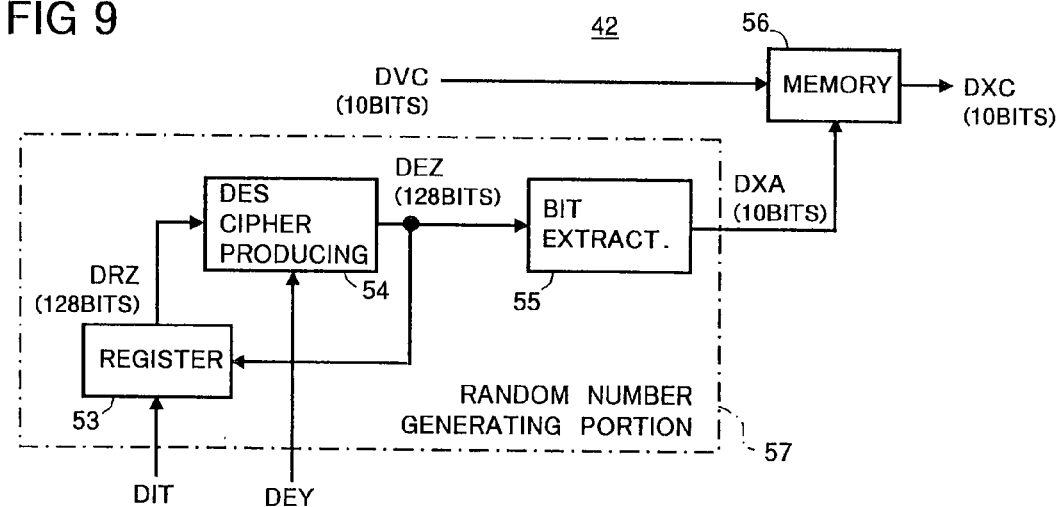

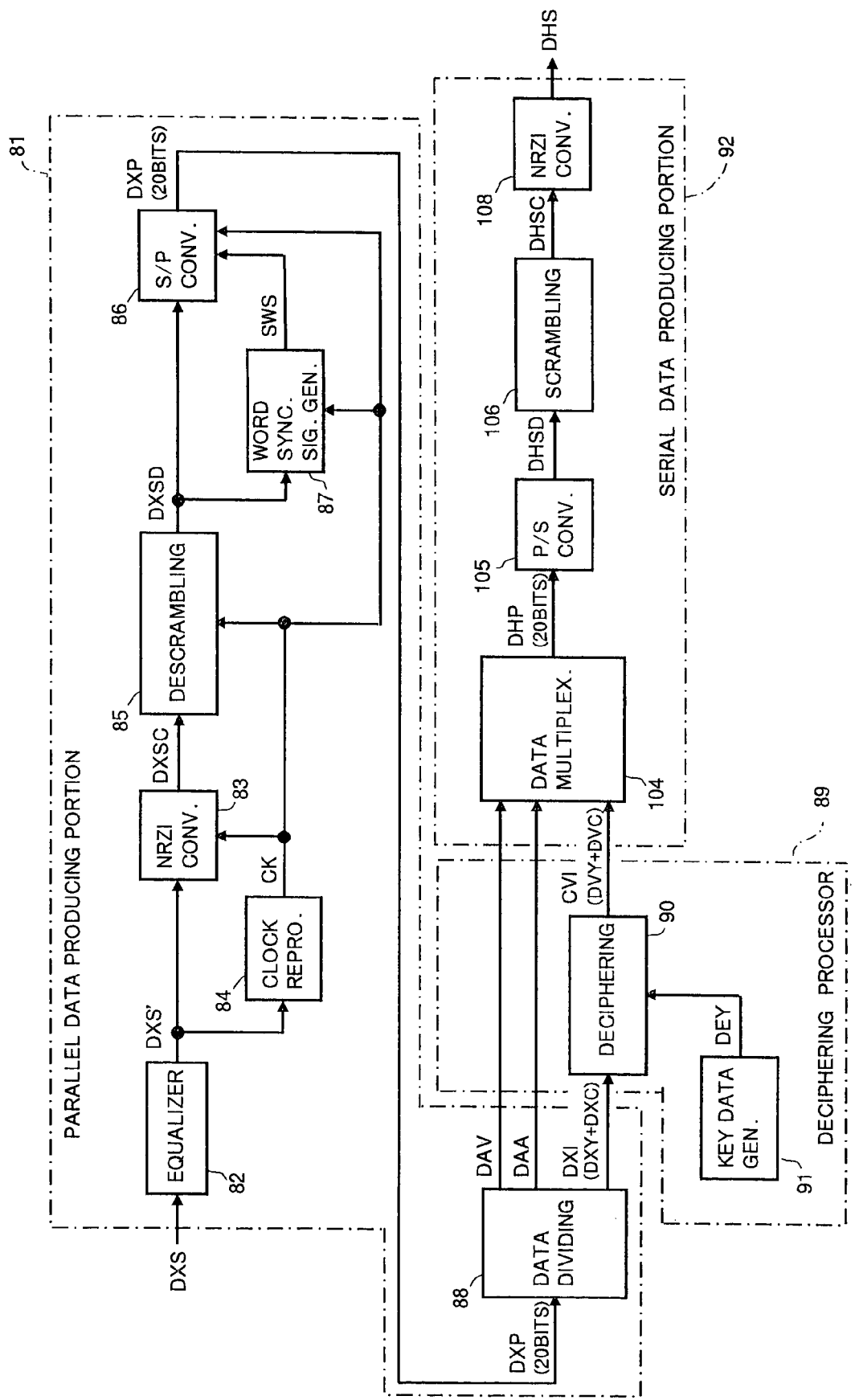

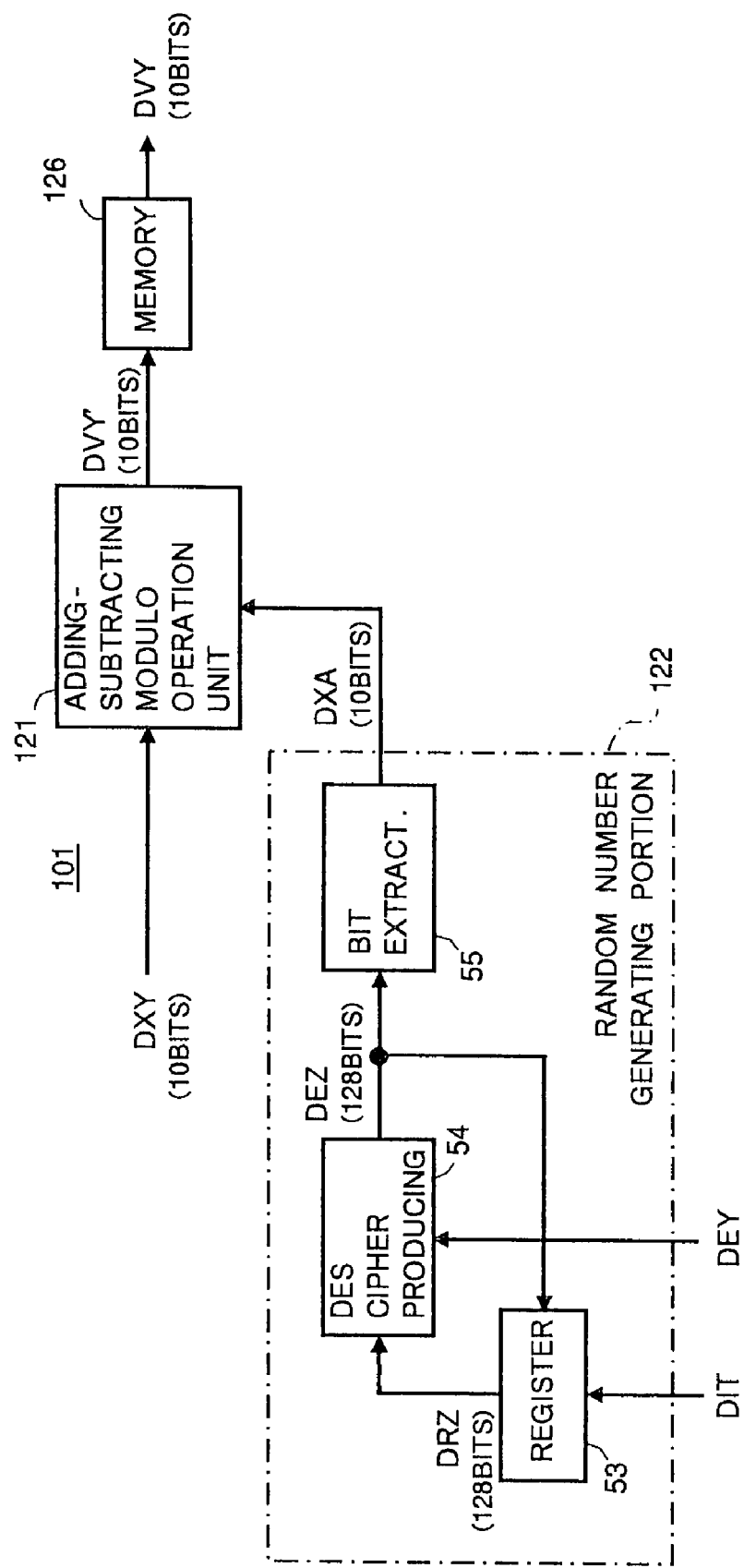

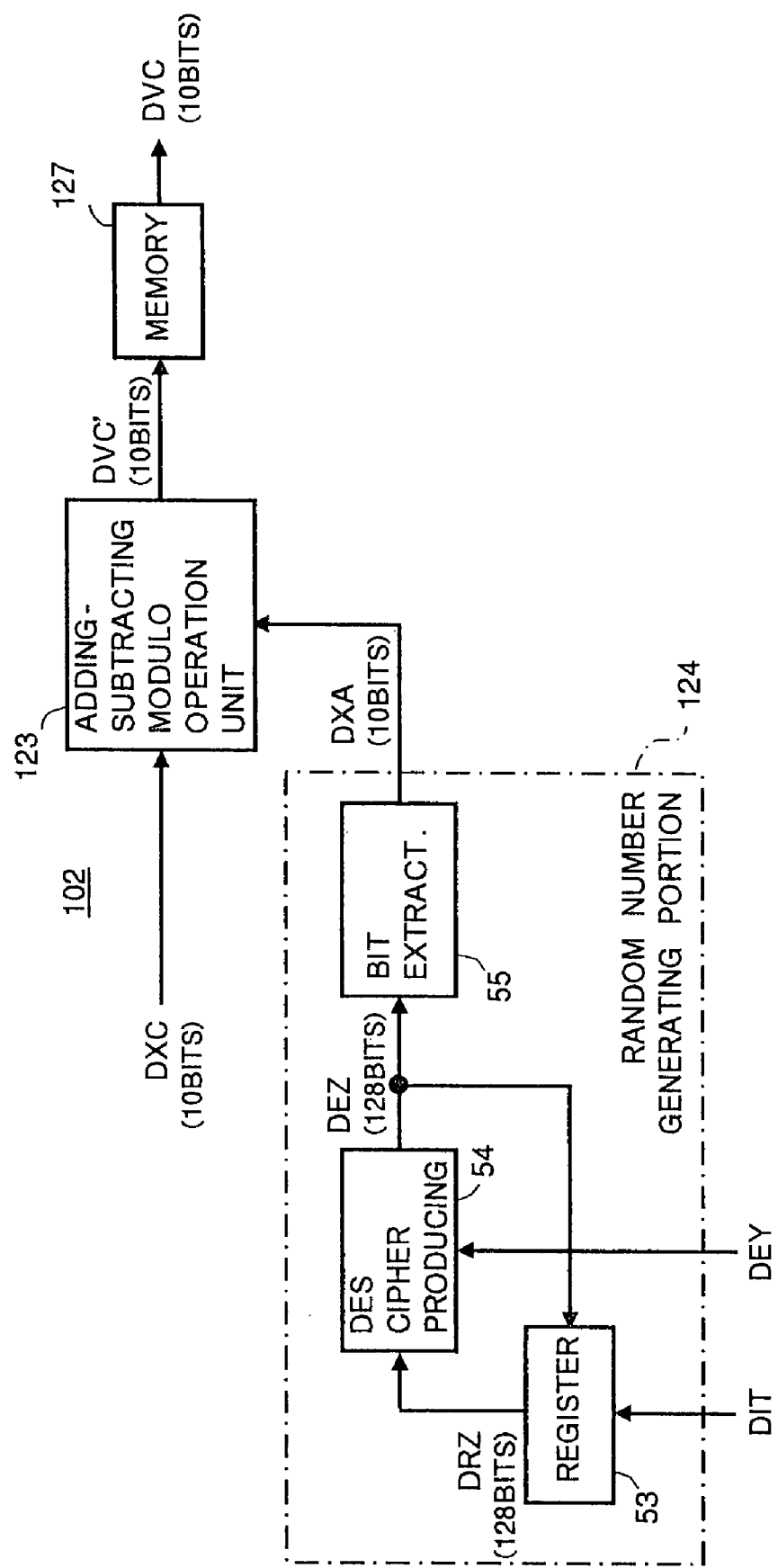

DATA TRANSMISSION AND RECEPTION METHOD AND DATA TRANSMISSION AND RECEPTION DEVICE

TECHNICAL FIELD

The present invention relates to a method of transmitting data by which digital information data or multiple data obtained by adding digital ancillary data to the digital information data are subjected to enciphering process and enciphered data obtained thereby are transmitted so that original data can be reproduced by subjecting the enciphered data to deciphering process, or an apparatus for transmitting data on which the method of transmitting data mentioned above is performed.

TECHNICAL BACKGROUND

In the field of data transmission by which digital data representing various kinds of signal information are transmitted, there have been proposed to subject digital data which are to be transmitted to enciphering process at a transmission side and to reproduce original data by subjecting the enciphered digital data to deciphering process at a receiving side, in order to prevent the digital data from being eavesdropped on a data transmission line. One of typical algorisms for enciphering digital data is the DES (Date Encryption Standard) published in 1977 by the National Bureau of Standards, the United State of America.

With cipher-transmission based on the DES, digital data are enciphered in accordance with the rules determined by enciphering key data prepared previously to produce enciphered digital data and the enciphered digital data are deciphered in accordance with the rules determined by deciphering key data prepared previously to reproduce original digital data. The deciphering key data are prepared to be the same as the enciphering key data so that each of the deciphering key data and the enciphering key data are formed with common data. The algorisms for enciphering and deciphering have been opened to the public and the common key data are kept secret for the purpose of enciphering.

FIG. 1 shows a basic structure of a cipher-transmission system according to the DES. In the basic structure shown in FIG. 1, digital data to be transmitted are supplied to a DES enciphering portion 11 as original data. Enciphering key data prepared previously are also supplied to the DES enciphering portion 11. In the DES enciphering portion 11, the original data are subjected to the DES enciphering process in accordance with the rules determined by the enciphering key data to produce enciphered data. The enciphered data obtained from the DES enciphering portion 11 are transmitted through a data transmission line 12 having one end thereof connected with the DES enciphering portion 11.

The enciphered data having been transmitted through the data transmission line 12 are supplied to a DES deciphering portion 13 with which the other end of the data transmission line 12 is connected. Deciphering key data which is the same as the enciphering key data are also supplied to the DES deciphering portion 13. In the DES deciphering portion 13, the enciphered data are subjected to the DES deciphering process in accordance with the rules determined by the deciphering key data to reproduce the original data.

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of digital word sequence data representing video signal information. The digital video signal under the HDTV system (hereinafter, referred to the HD signal) is formed in accordance with, for example, the BTA S-002 which is one of a series of standards established by the Broadcasting Technology Association (BTA) in Japan so as to be in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD signal is a digital television signal by which each frame picture is formed with first and second field pictures each appearing at a rate of 60 Hz and which is constituted in accordance with an arrangements including a frame rate of 30 Hz, 1125 lines per frame, 2,200 data samples per line and a sampling frequency of 74.25 MHz. For example, the HD signal in the form of Y and $P_B/P_R$ signals is constituted in accordance with such data formats as shown in FIGS. 2A and 2B.

The data formats shown in FIGS. 2A and 2B include a part of a portion corresponding to a line period (hereinafter, referred to a line period portion) of a luminance signal data sequence (hereinafter, referred to a Y data sequence) as shown in FIG. 2A, which represents a luminance signal component of a video signal, and a part of a line period portion of a color difference signal data sequence (hereinafter, referred a $P_B/P_R$ data sequence) as shown in FIG. 2B, which represents color difference signal components of the video signal. Each of data words constituting the Y data sequence or the $P_B/P_R$ data sequence is composed of 10 bits. This means that each of the Y data sequence and the $P_B/P_R$ data sequence constitutes 10-bit word sequence data having a word transmission rate of, for example, 74.25 Mwps.

In the Y data sequence, each line period portion of which is formed with a portion corresponding to a horizontal blanking period and a portion corresponding to a video data period appearing after the horizontal blanking period, time reference code data SAV (Start of Active Video) which are composed of four 10-bit words (3FF(Y), 000(Y), 000(Y), XYZ(Y): 3FF and 000 are hexadecimal numbers and (Y) indicates a word contained in the Y data sequence) are provided just before the portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the $P_B/P_R$ data sequence, each line period portion of which is formed with a portion corresponding to a horizontal blanking period and a portion corresponding to a video data period appearing after the horizontal blanking period, time reference code data SAV which are composed of four 10-bit words (3FF(C), 000(C), 000(C), XYZ(C) (C) indicates a word contained in the $P_B/P_R$ data sequence) are provided just before the portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence are provided in the portion corresponding to the horizontal blanking period of the Y data sequence and the time reference code data EAV and SAV contained in the $P_B/P_R$ data sequence are provided in the portion corresponding to the horizontal blanking period of the $P_B/P_R$ data sequence.

Initial three 10-bit words (3FF, 000,000) of four 10-bit words (3FF, 000,000, XYA), each of which is shown with (Y) or (C), are used for establishing word synchronization or line synchronization and a last one 10-bit word (XYZ) of four 10-bit words (3FF, 000,000, XYA), which is also shown with (Y) or (C), is used for discriminating the first field from the second field in each frame or for discriminating the time reference code data EAV from the time reference code data SAV.

For the HD signal constituted with the Y data sequence and the P.sub.B/P.sub.R data sequence as described above, some forbidden codes, each of which can not be used as an information code forming video data or ancillary data, and which include timing discrimination codes forming the time reference code data SAV or EAV, are predetermined. When each of the Y data sequence and the P.sub.B/P.sub.R data sequence constitutes 10-bit word sequence data, the forbidden codes mentioned above are 000h to 003h and 3FCh to 3FFh (000 to 003 and 3FC to 3FF are hexadecimal numbers and h indicates a hexadecimal number), that is, 0000000000 to 0000000011 and 1111111100 to 1111111111, as shown in FIG. 3.

When the HD signal constituted with the Y data sequence and the P.sub.B/P.sub.R data sequence is subjected to transmission through a data transmission line, it is desired for the HD signal to be converted to serial data from word sequence data so as to be subjected to serial transmission through a simplified data transmission line. In connection with the serial transmission of the HD signal constituted with the Y data sequence and the P.sub.B/P.sub.R data sequence, it has been standardized to transmit the HD signal in conformity with the HD SDI (High Definition Serial Digital Interface) according to the BTA S-004 which is one of a series of standards established by the BTA in Japan.

In the transmission of the HD signal in conformity with the HD SDI, the Y data sequence and the P.sub.B/P.sub.R data sequence are multiplexed, with their portions corresponding to the horizontal blanking periods in each of which the time reference code data EAV and SAV are provided and which synchronize with each other, to produce a multiple word sequence as shown in FIG. 4 and then the multiple word sequence is converted to serial data to be transmitted. Each of data words constituting the multiple word sequence shown in FIG. 4 is composed of 10 bits and the word transmission rate of the multiple word sequence shown in FIG. 4 is set to be 74.25Mwps.times.2=148.5Mwps. In the multiple word sequence thus obtained as shown in FIG. 4, multiple time reference code data (multiple SAV) which are composed of eight 10-bit words (3FF(C), 3FF(Y), 000(C), 000(Y), 000(C), 000(Y), XYZ(C), XYZ(Y)) are provided just before the portion corresponding to a video data period and another multiple time reference code data EAV (multiple EAV) which are composed of eight 10-bit words (3FF(C), 3FF(Y), 000(C), 000(Y), 000(C), 000(Y), XYZ(C), XYZ(Y)) are provided just after the portion corresponding to the video data period.

The each of the 10-bit words constituting the multiple word sequence is sent bit by bit from the least significant bit (LSB) to the most significant bit (MSB) so that the multiple word sequence is converted to a serial data. Then, the serial data is subjected to scrambling process to produce a serial transmission HD signal (hereinafter, referred to an HD-SDI signal) and the HD-SDI signal is transmitted through a data transmission line. The HD-SDI signal thus transmitted has a bit transmission rate of, for example, 148.5Mwps.times.10=1.485 Gbps.

In the case of the transmission of the HD-SDI signal through the data transmission line, it is also desired to subject the HD-SDI signal to enciphering process at a transmission side and to reproduce original HD-SDI data by subjecting the enciphered HD-SDI data to deciphering process at a receiving side, in order to prevent the HD-SDI data from being eavesdropped on the data transmission line. Such cipher-transmission of the HD-SDI signal can be theoretically carried out with a cipher-transmission system which is similar to the cipher-transmission system according to the DES having the basic structure shown in FIG. 1.

For example, when an HD signal is converted to an HD-SDI signal in accordance with the HD SDI to be transmitted through a data transmission line and the transmitted HD-SDI signal is reconverted to the HD signal in accordance with the HD SDI to be supplied to, for example, a video projector which operates to display images based on the HD signal, it is considered to have such a cipher-transmission system as shown in FIG. 5 for conducting the cipher-transmission of the HD-SDI signal.

In the cipher-transmission system shown in FIG. 5, an HD-SDI signal DHS derived from an HD-SDI signal generating portion 15, in which an HD signal obtained from a video camera or the like is converted to the HD-SDI signal HDS in accordance with the HD SDI, is supplied to an HD-SDI enciphering portion 16. Enciphering key data DDK prepared previously are also supplied to the HD-SDI enciphering portion 16. In the HD-SDI enciphering portion 16, the HD-SDI signal DHS is first subjected to serial to parallel (S/P) conversion to reproduce the original HD signal constituted with Y and P.sub.B/P.sub.R data sequences and a video data portion of the reproduced HD signal is subjected to the DES enciphering process in accordance with the rules determined by the enciphering key data DDK to produce an enciphered HD signal. Then, in the HD-SDI enciphering portion 16, the enciphered HD signal is subjected to parallel to serial (P/S) conversion to produce enciphered serial data DHSE. The enciphered serial data DHSE are derived from the HD-SDI enciphering portion 16 to be transmitted through a data transmission line 17 having one end thereof connected with the HD-SDI enciphering portion 16.

The enciphered serial data DHSE having been transmitted through the data transmission line 17 are supplied to an HD-SDI deciphering portion 18 with which the other end of the data transmission line 17 is connected. Deciphering key data DDK which is the same as the enciphering key data DDK supplied to the HD-SDI enciphering portion 16 are also supplied to the HD-SDI deciphering portion 18. In the HD-SDI deciphering portion 18, the enciphered serial data DHSE are subjected to the S/P conversion to reproduce the enciphered HD signal and a video data portion of the enciphered HD signal is subjected to the DES deciphering process in accordance with the rules determined by the deciphering key data DDK to reproduce the original HD signal constituted with Y and P.sub.B/P.sub.R data sequences. Then, in the HD-SDI deciphering portion 18, the Y and P.sub.B/P.sub.R data sequences constituting the reproduced HD signal are multiplexed with each other in accordance with the HD SDI to produce a word multiple data sequence and the word multiple data sequence thus obtained are subjected to the P/S conversion to reproduce the HD-SDI signal DHS.

The HD-SDI signal DHS obtained from the HD-SDI deciphering portion 18 is supplied to a video projector 19. In the video projector 19, the HD signal is reproduced from the HD-SDI signal DHS and used for display of images.

In such a manner as described above, the cipher-transmission of the HD-SDI signal is seemingly carried out. However, in the cipher-transmission system shown in FIG. 5, a serious problem, with which the deciphering process to which the enciphered serial data DHSE are subjected in the HD-SDI deciphering portion 18 is interfered and the reproduction of the HD signal from the HD-SDI signal DHI can not be appropriately carried out in the video projector 19, is brought about.

This problem is explained as follows.

When the HD-SDI signal DHS is converted to the HD signal and the video signal portion of the HD signal is subjected to the DES enciphering process in accordance with the rules determined by the enciphering key data DDK to produce the enciphered HD signal in the HD-SDI enciphering portion 16, the bidden codes aforementioned, that is, 000h to 003h and 3FCh to 3FFh are undesirably contained with a certain probability in the video data portion of the enciphered HD signal though the video data portion of the HD signal does not contain anyone of the forbidden codes of 000h to 003h and 3FCh to 3FFh. As a result, the enciphered serial data DHSE are produced based on the enciphered HD signal which has the video data portion containing the forbidden codes in the HD-SDI enciphering portion 16 and then transmitted from the HD-SDI enciphering portion 16 through the data transmission line 17 to the HD-SDI deciphering portion 18.

The forbidden codes are originally contained in the HD signal in the form of the timing identification codes constituting the time reference codes SAV and EAV and portions of the HD-SDI signal DHS which corresponds to the serial data converted from the forbidden codes constituting the time reference codes data SAV and EAV are detected to be used for making word-synchronization between the HD-SDI signal DHS and the reproduced HD signal so that the reproduced HD signal is properly obtained when the original HD signal is reproduced from the HD-SDI signal DHS.

Under such a situation, when the enciphered serial data DHSE which are produced based on the enciphered HD signal having the video data portion containing the forbidden codes is transmitted from the HD-SDI enciphering portion 16 through the data transmission line 17 to the HD-SDI deciphering portion 18, it is feared in the HD-SDI deciphering portion 18 that a portion of the enciphered serial data DHSE which corresponds to the serial data converted from the forbidden codes contained in video data portion of the enciphered HD signal is undesirably detected, in addition to portions of the enciphered serial data DHSE which properly correspond to the serial data converted from the forbidden codes contained in the HD signal for constituting the time reference codes SAV and EAV, just as a portion of the enciphered serial data DHSE which corresponds to the serial data converted from the forbidden codes constituting the time reference codes data SAV or EAV. If the portion of the enciphered serial data DHSE which corresponds to the serial data converted from the forbidden codes contained in video data portion of the enciphered HD signal is also detected just as the portion of the enciphered serial data DHSE which corresponds to the serial data converted from the forbidden codes constituting the time reference codes data SAV or EAV when the ciphered HD signal is reproduced from the enciphered serial data DHSE in the HD-SDI deciphering portion 18, appropriate word-synchronization between the enciphered serial data DHSE and the ciphered HD signal to be reproduced is not made and therefore the ciphered HD signal can not be properly reproduced.

Further, as a result, the HD-SDI signal DHS which is obtained from the HD-SDI deciphering portion 18 to be supplied to the video projector 19 comes to have improper contents and accordingly the HD signal which is reproduced from the HD-SDI signal DHS from the HD-SDI deciphering portion 18 in the video projector 19 also comes to have improper video data.

The problems mentioned above are brought about by the data transmission in which the forbidden codes are undesirably contained with a certain probability in the video data portion of the enciphered HD signal and thereby the ciphered serial data DHSE contain an undesirable portion thereof corresponding to the serial data converted from the forbidden codes when the HD-SDI signal DHS is reconverted to the HD signal to be subjected to the DES enciphering process in accordance with the rules determined by the deciphering key data DDK to produce the ciphered HD signal and the ciphered serial data DHSE are obtained based on the ciphered HD signal to be transmitted in the HD-SDI enciphering portion 16.

Accordingly, it is an object of the present invention to provide a first method of transmitting data which can be applicable to enciphered data transmission in which digital information data which correspond to serial data obtained based on word sequence data which contain digital information data in which forbidden codes including timing identification codes are contained and time reference code data constituted with the timing identification codes, for example, such data as constituting an HD-SDI signal, are subjected to enciphering process to produce enciphered serial data and the enciphered serial data are transmitted, and by which the ciphered data transmission is carried out under a condition wherein the enciphered serial data can be prevented from containing an undesirable portion thereof corresponding to serial data converted from the forbidden codes.

Another object of the present invention is to provide a first apparatus for transmitting data in which the first method of transmitting data mentioned above is carried out.

A further object of the present invention is to provide a second method of transmitting data which can be applicable to enciphered data transmission in which digital information data which correspond to serial data obtained based on word sequence data which contain digital information data in which forbidden codes including timing identification codes are contained and time reference code data constituted with the timing identification codes, for example, such data as constituting an HD-SDI signal, are subjected to enciphering process to produce enciphered serial data and the enciphered serial data are transmitted, and by which the ciphered data transmission is carried out under a condition wherein the enciphered serial data can be prevented from containing an undesirable portion thereof corresponding to serial data converted from the forbidden codes and the original digital information data can be surely reproduced by subjecting enciphered digital information data obtained based on the transmitted enciphered serial data to deciphering process.

A still further object of the present invention is to provide a second apparatus for transmitting data in which the second method of transmitting data mentioned above is carried out.

DISCLOSURE OF THE INVENTION

According to embodiments of the invention, there is provided a method of transmitting data, which comprises the steps of subjecting digital information data to enciphering process in such a manner as not to produce forbidden code for producing enciphered digital information data which do not contain any forbidden code, said digital information data containing a group of data including timing identification data in the form of forbidden codes which are not used as information codes for representing information and contained in word sequence data which contain also time reference code data constituted with the timing identification codes in addition to the digital information data, producing enciphered word sequence data which include the enciphered digital information data and the time reference code data, and transmitting the enciphered word sequence data.

According to embodiments of the invention, there is provided an apparatus for transmitting data, which comprises an enciphering processor for subjecting digital information data to enciphering process in such a manner as not to produce forbidden code for producing enciphered digital information data which do not contain any forbidden code, said digital information data containing a group of data including timing identification data in the form of forbidden codes which are not used as information codes for representing information and contained in word sequence data which contain also time reference code data constituted with the timing identification code in addition to the digital information data, a data multiplexer for multiplexing the enciphered digital information data obtained from the enciphering processor and the time reference code data with each other to produce enciphered word sequence data, and a data transmitting portion for transmitting the enciphered word sequence data obtained from the data multiplexer.

According to embodiments of the invention, there is provided a method of transmitting data, which comprises the steps of subjecting digital information data to enciphering process in such a manner as not to produce forbidden code for producing enciphered digital information data which do not contain any forbidden code, said digital information data containing a group of data including timing identification data in the form of forbidden codes which are not used as information codes for representing information and contained in word sequence data which contain also time reference code data constituted with the timing identification codes in addition to the digital information data, producing enciphered word sequence data which include the enciphered digital information data and the time reference code data, transmitting the enciphered word sequence data, receiving the enciphered word sequence data transmitted for obtaining the enciphered digital information data from the enciphered word sequence data, causing the enciphered digital information data to be subjected to deciphering process for reproducing the digital information data, and reproducing the word sequence data which include the reproduced digital information data and the time reference code data.

According to embodiments of the invention of the present application, there is provided an apparatus for transmitting data, which comprises an enciphering processor for subjecting digital information data to enciphering process in such a manner as not to produce forbidden code for producing enciphered digital information data which do not contain any forbidden code, said digital information data containing a group of data including timing identification data in the form of forbidden codes which are not used as information codes for representing information and contained in word sequence data which contain also time reference code data constituted with the timing identification code in addition to the digital information data, a first data multiplexer for multiplexing the enciphered digital information data obtained from the enciphering processor and the time reference code data with each other to produce enciphered word sequence data, a data transmitting portion for transmitting the enciphered word sequence data obtained from the first data multiplexer, a deciphering processor for receiving the enciphered word sequence data transmitted by the data transmitter to obtain the enciphered digital information data from the enciphered word sequence data and causing the enciphered digital information data to be subjected to deciphering process for reproducing the digital information data, and a second data multiplexer for multiplexing the reproduced digital information data and the time reference code data with each other to reproduce the word sequence data.

In the method of transmitting data constituted in accordance with embodiments of the invention, the digital information data contained in the word sequence data which contain also the time reference code data constituted with the timing identification codes in addition to the digital information data are subjected to the enciphering process in such a manner as not to produce forbidden code for producing the enciphered digital information data which do not contain any forbidden code, and the enciphered digital information data and the time reference code data are multiplexed with each other to produce the enciphered word sequence data to be transmitted.

As described above, since the enciphered digital information data which do not contain any forbidden code are produced and the enciphered word sequence data containing the enciphered digital information data and the time reference code data are subjected to conversion to the enciphered serial data to be transmitted, the enciphered serial data which do not have an undesirable portion thereof corresponding to serial data converted from the forbidden codes are obtained when the enciphered word sequence data are converted to the enciphered serial data the enciphered serial data.

Accordingly, when the method of transmitting data constituted in accordance with embodiments of the invention is applied to the enciphered data transmission in which the digital information data which correspond to the serial data obtained based on the word sequence data which contain the digital information data in which the forbidden codes including the timing identification codes are contained and the time reference code data constituted with the timing identification codes, for example, such data as constituting the HD-SDI signal, are subjected to the enciphering process to produce the enciphered serial data and the enciphered serial data are transmitted, the enciphered data transmission is carried out under the condition wherein the enciphered serial data can be prevented from containing the undesirable portion thereof corresponding to the serial data converted from the forbidden codes.

Further, in the method of transmitting data according to embodiments of the present invention, the digital information data contained in the word sequence data which contain also the time reference code data constituted with the timing identification codes in addition to the digital information data are subjected to the enciphering process in such a manner as not to produce forbidden code for producing the enciphered digital information data which do not contain any forbidden code, the enciphered digital information data and the time reference code data are multiplexed with each other to produce the enciphered word sequence data to be transmitted, and the enciphered digital information data obtained from the enciphered word sequence data are subjected to the deciphering process for reproducing the digital information data to be multiplexed with the time reference code data to reproduce the word sequence data.

As described above, since the enciphered digital information data which do not contain any forbidden code are produced and the enciphered word sequence data containing the enciphered digital information data and the time reference code data are subjected to conversion to the enciphered serial data to be transmitted, the enciphered serial data which do not have an undesirable portion thereof corresponding to serial data converted from the forbidden codes are obtained when the enciphered word sequence data are converted to the enciphered serial data and the original serial data are properly reproduced from the transmitted enciphered serial data when the transmitted enciphered serial data are subjected to the deciphering process. Then, the word sequence data are surely reproduced based on the enciphered word sequence data by subjecting the enciphered digital information data obtained from the enciphered word sequence data to various data processes including the deciphering process.

Accordingly, embodiments of the present invention can be applied to the enciphered data transmission in which the digital information data which correspond to the serial data obtained based on the word sequence data which contain the digital information data in which the forbidden codes including the timing identification codes are contained and the time reference code data constituted with the timing identification codes, for example, such data as constituting the HD-SDI signal, are subjected to the enciphering process to produce the enciphered serial data to be transmitted, and the original serial data are reproduced from the transmitted enciphered serial data, the enciphered data transmission is carried out under the condition wherein the enciphered serial data can be prevented from containing the undesirable portion thereof corresponding to the serial data converted from the forbidden codes and the original serial data can be surely reproduced.

BRIEF DESCRIPTION OF THE DRAWINGS

FIG. 1 is a schematic block diagram showing a basic structure of a cipher-transmission system according to the DES;

FIGS. 2A and 2B are illustrations used for explaining an example of data format of an HD signal;

FIG. 3 is a table showing forbidden codes contained in the HD signal having the data format shown in FIGS. 2A and 2B;

FIG. 5 is a schematic block diagram showing a cipher-transmission system applicable to the cipher-transmission of an HD-SDI signal;

FIG. 7 is a schematic block diagram showing an embodied structure of an enciphering portion in the embodiment of apparatus for transmitting data shown in FIG. 6;

FIG. 8 is a schematic block diagram showing a first embodied structure of a Y data enciphering portion in the embodied structure shown in FIG. 7;

FIG. 9 is a schematic block diagram showing a first embodied structure of a C data enciphering portion in the embodied structure shown in FIG. 7;

FIG. 23 is a block diagram showing, under a condition combined with the embodiment of apparatus for transmitting data shown in FIG. 6, an embodiment of apparatus for transmitting data according to the invention;

FIG. 29 is a schematic block diagram showing a third embodied structure of the Y data deciphering portion in the embodied structure shown in FIG. 24;

FIG. 30 is a schematic block diagram showing a third embodied structure of the C data deciphering portion in the embodied structure shown in FIG. 24;

EMBODIMENTS MOST PREFERABLE FOR WORKING OF THE INVENTION

Figure 4:
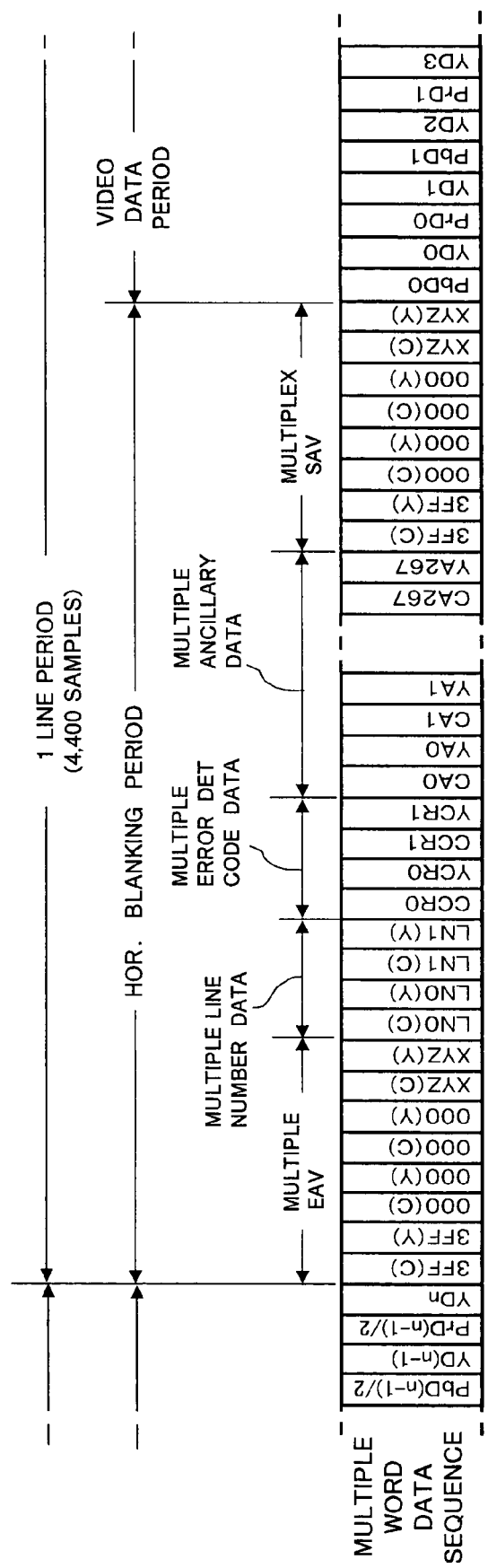
FIG. 4 is an illustration used for explaining another example of data format of an HD signal.
Figure 6:
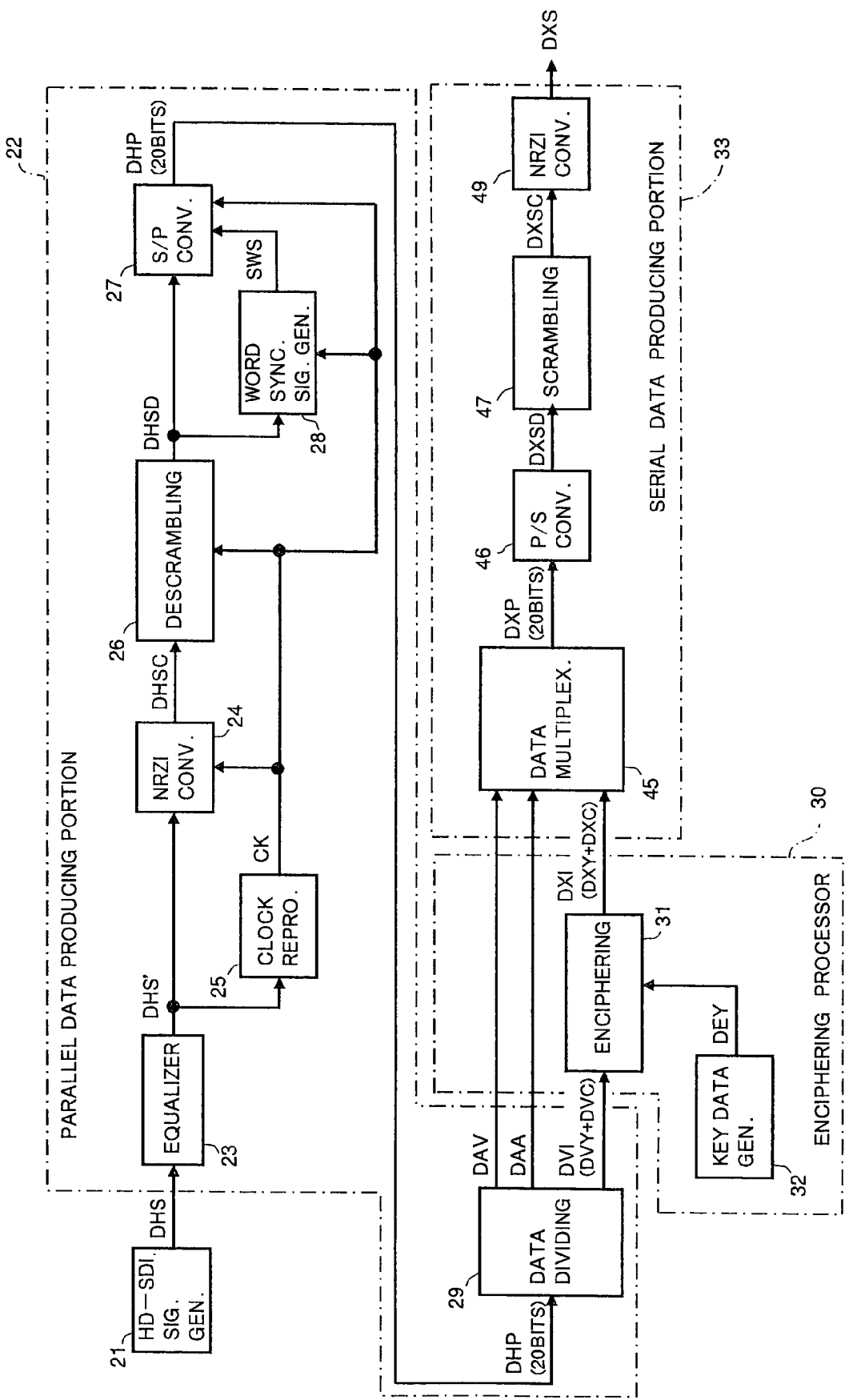
FIG. 6 is a block diagram showing an embodiment of apparatus for transmitting data according to the invention.

Referring to FIG. 6, an HD-SDI signal DHS derived from an HD-SDI signal generating portion 21 is supplied to a parallel data producing portion 22. The HD-SDI signal DHS is generated by subjecting word sequence data based on an HD signal which contains Y and P.sub.B/P.sub.R data sequences each constituting 10-bit word sequence data, as shown in FIG. 2, to P/S conversion. The word sequence data based on the HD signal are produced by causing the Y and P.sub.B/P.sub.R data sequences contained in the HD signal to be multiplexed with each other in conformity with the HD SDI.

Each of the Y and P.sub.B/P.sub.R data sequences constituting the HD signal contains time reference code data SAV and EAV each constituted with timing identification codes 3FFh and 000h. A video data portion of each of the Y and P.sub.B/P.sub.R data sequences is so constituted as not to contain anyone of forbidden codes which are eight code of 000h to 003h and 3FCh to 3FFh including the timing identification codes 3FFh and 000h, as shown in FIG. 3, and not used as information codes for representing information. Consequently, the HD-SDI signal DHS contains the forbidden codes in the form of serial data converted from three timing identification codes arranged in order of 3FFh, 000h and 000h so as to constitute the time reference code data SAV or EAV.

In the parallel data producing portion 22, the HD-SDI signal DHS are subjected to level-equalization for compensating for reduction in high frequency components caused on a data transmission line to produce an equalized HD-SDI signal DHS' in an equalizer 23. The equalized HD-SDI signal DHS' obtained from the equalizer 23 is supplied to both of an NRZI converter 24 and a clock reproducing portion 25. In the clock reproducing portion 25, a clock signal CK contained in the equalized HD-SDI signal DHS' is reproduced.

The clock signal CK obtained from the clock reproducing portion 25 is supplied to the NRZI converter 24 so that NRZI (Non-return to Zero Inverted) conversion of the equalized HD-SDI signal DHS' is carried out with the clock signal CK in the NRZI converter 24. Therefore, an HD-SDI signal DHSC which has been subjected to the NRZI conversion is derived to be supplied to a descrambling portion 26. The clock signal CK obtained from the clock reproducing portion 25 is also supplied to the descrambling portion 26. In the descrambling portion 26, the HD-SDI signal DHSC is descrambled to produce a descrambled HD-SDI signal DHSD. The descrambled HD-SDI signal DHSD is derived from the descrambling portion 26 is supplied to both of an S/P converter 27 and a word synchronous signal generating portion 28.

The clock signal CK obtained from the clock reproducing portion 25 is also supplied to the word synchronous signal generating portion 28. A portion of the descrambled HD-SDI signal DHSD, which corresponds to serial data converted from the timing identification codes arranged in order of 3FFh, 000h, 000h for constituting the time reference code data SAV or EAV, is detected with the clock signal CK and a word synchronous signal SWS is produced in response to the detection of the aforementioned portion, in the word synchronous signal generating portion 28. The word synchronous signal SWS obtained from the word synchronous signal generating portion 28 is supplied to the S/P converter 27. The clock signal CK obtained from the clock reproducing portion 25 is also supplied to the S/P converter 27 and the descrambled HD-SDI signal DHSD is subjected to S/P conversion under the condition of word-synchronization according to the word synchronous signal SWS in the S/P converter 27. With the S/P conversion thus processed, the descrambled HD-SDI signal DHSD is converted into 20-bit word sequence data DHP which are constituted with the Y and P.sub.B/P.sub.R data sequences each forming 10-bit word sequence data and multiplexed bit by bit with their time reference code data SAV and EAV synchronizing with each other.

The 20-bit word sequence data DHP obtained from the S/P converter 27 are supplied to a data dividing portion 29. In the data dividing portion 29, the 20-bit word sequence data DHP are divided into multiple time reference data DAV, multiple ancillary data DAA and multiple video data DVI. The multiple time reference data DAV are obtained in the form of 20-bit word sequence data constituted with the time reference code data SAV and EAV, line number data, error detection code data and so on in the Y data sequence in the form of 10-bit word sequence data and the time reference code data SAV and EAV, line number data, error detection code data and so on in the P.sub.B/P.sub.R data sequence in the form of 10-bit word sequence data which are multiplexed bit by bit under the condition of word-synchronization. The multiple ancillary data DAA are obtained in the form of 20-bit word sequence data constituted with the ancillary data in the Y data sequence in the form of 10-bit word sequence data and the ancillary data in the P.sub.B/P.sub.R data sequence in the form of 10-bit word sequence data which are multiplexed bit by bit under the condition of word-synchronization. The multiple video data DVI are obtained in the form of 20-bit word sequence data containing Y signal video data DVY constituting the video data portion in the Y data sequence in the form of 10-bit word sequence data and C signal video data DVC constituting the video data portion in the P.sub.B/P.sub.R data sequence in the form of 10-bit word sequence data which are multiplexed bit by bit under the condition of word-synchronization.

The multiple time reference data DAV, the multiple ancillary data DAA and the multiple video data DVI obtained from the data dividing portion 29 are sent from the parallel data producing portion 22 to an enciphering processor 30. The enciphering processor 30 is constituted with an enciphering portion 31 and a key data generating portion 32.

The multiple time reference data DAV and the multiple ancillary data DAA pass through the enciphering processor 30 to be supplied to a serial data producing portion 33. The multiple video data DVI are supplied to the enciphering portion 31 in the enciphering processor 30. The key data generating portion 32 is operative to supply the enciphering portion 31 with predetermined key data DEY.

In the enciphering portion 31, the multiple video data DVI in the form of 20-bit word sequence data are subjected to, for example, the DES enciphering process in accordance with the rules determined by the key data DEY to produce enciphered video data DXI in the form of 20-bit word sequence data FIG. 7 shows an embodied structure of the enciphering portion 31.

In the embodied structure shown in FIG. 7, the multiple video data DVI in the form of 20-bit word sequence data are supplied to a bit dividing portion 40. In the bit dividing portion 40, the multiple video data DVI are divided into the Y signal video data DVY in the form of 10-bit word sequence data and the C signal video data DVC in the form of 10-bit word sequence data, which are separately sent from the bit dividing portion 40.

The Y signal video data DVY and the C signal video data DVC obtained from the bit dividing portion 40 are supplied to a Y data enciphering portion 41 and a C data enciphering portion 42, respectively. The key data DEY obtained from the key data generating portion 32 are also supplied to both of the Y data enciphering portion 41 and the C data enciphering portion 42.

In the Y data enciphering portion 41, the Y signal video data DVY in the form of 10-bit word sequence data are subjected to the DES enciphering process in accordance with the rules determined by the key data DEY to produce enciphered Y signal video data DXY in the form of 10 bit word sequence data. In the C data enciphering portion 42, the C signal video data DVC in the form of 10-bit word sequence data are subjected to the DES enciphering process in accordance with the rules determined by the key data DEY to produce enciphered C signal video data DXC in the form of 10-bit word sequence data.

The DES enciphering process to which the Y signal video data DVY are subjected in the Y data enciphering portion 41 is so performed as not to produce anyone of the forbidden codes 000h to 003h and 3FCh to 3FFh and thereby the enciphered Y signal video data DXY based on the Y signal video data DVY are obtained in the form of 10-bit word sequence data which do not contain the forbidden codes 000h to 003h and 3FCh to 3FFh. Similarly, the DES enciphering process to which the C signal video data DVC are subjected in the C data enciphering portion 42 is so performed as not to produce anyone of the forbidden codes 000h to 003h and 3FCh to 3FFh and thereby the enciphered C signal video data DXC based on the C signal video data DVC are obtained in the form of 10-bit word sequence data which do not contain the forbidden codes 000h to 003h and 3FCh to 3FFh.

The enciphered Y signal video data DXY in the form of 10-bit word sequence data and the enciphered C signal video data DXC in the form of 10-bit word sequence data thus obtained from the Y data enciphering portion 41 and the C data enciphering portion 42, respectively, are supplied to a bit multiplexer 43.

In the bit multiplexer 43, the enciphered Y signal video data DXY in the form of 10-bit word sequence data and the enciphered C signal video data DXC in the form of 10-bit word sequence data are multiplexed with each other to produce the enciphered video data DXI in the form of 20-bit word sequence data to be sent from the enciphering portion 31 as output data. The enciphered video data DXI in the form of 20-bit word sequence data thus obtained do not contain the forbidden codes 000h to 003h and 3FCh to 3FFh.

The enciphered video data DXI as the output data from the enciphering portion 31 are sent from the enciphering processor 30 to the serial data producing portion 33. In the serial data producing portion 33, the multiple time reference data DAV and the multiple ancillary data DAA each having passed through the enciphering processor 30 and the enciphered video data DXI are supplied to a data multiplexer 45.

In the data multiplexer 45, the enciphered video data DXI, the multiple time reference data DAV and the multiple ancillary data DAA are subjected to multiplexing process to produce enciphered 20-bit word sequence data DXP including the enciphered video data DXI, the multiple time reference data DAV and the multiple ancillary data DAA. The enciphered 20-bit word sequence data DXP thus obtained in the data multiplexer 45 are supplied to a P/S converter 46.

In the P/S converter 46, the enciphered 20-bit word sequence data DXP are subjected to P/S conversion to produce enciphered serial data DXSD based on the enciphered 20-bit word sequence data DXP to be supplied to a scrambling portion 47.

In the scrambling portion 47, the enciphered serial data DXSD are subjected to scrambling process to produce scrambled enciphered serial data DXSC to be supplied to a NRZI converter 49. In the NRZI converter 49, the scrambled enciphered serial data DXSC are subjected to NRZI conversion to produce enciphered HD-SDI signal DXS. The enciphered HD-SDI signal DXS thus obtained in the NRZI converter 49 is transmitted from the serial data producing portion 33 through, for example, a coaxial cable forming a data transmission line.

In the serial data producing portion 33, a portion thereof which includes the P/S converter 46, the scrambling portion 47 and the NRZI converter 49 constitutes a data transmitting portion for transmitting the enciphered 20-bit word sequence data DXP obtained from the data multiplexer.

FIGS. 8 and 9 show a first embodied structures of the Y data enciphering portion 41 shown in FIG. 7 and a first embodied structures of the C data enciphering portion 42 shown in FIG. 7, respectively.

In the case where the enciphering portion 31 shown in FIG. 6 is constituted with the Y data enciphering portion 41 having the first embodied structure shown in FIG. 8 and the C data enciphering portion 42 having the first embodied structure shown in FIG. 9, the structure of the enciphering portion 31 thus constituted corresponds to an embodiment of apparatus for transmitting data according to the invention.

The first embodied structure shown in FIG. 8 of the Y data enciphering portion 41 is constituted with a memory 51 to which the Y signal video data DVY in the form of 10-bit word sequence data are supplied as first reading address data and a random number generating portion 52 to which the key data DEY are supplied.

In the random number generating portion 52, a register 53 is operative to put out, in response to input data, register output data DRZ composed of, for example, 128 bits to be supplied to a DES cipher producing portion 54. Initial input data DIT are supplied to the register 53.

The key data DEY are also supplied to the DES cipher producing portion 54. In the DES cipher producing portion 54, the register output data DRZ are subjected to DES enciphering process in accordance with the rules determined by the key data DEY to produce cipher data DEZ composed of, for example, 128 bits. The cipher data DEZ obtained from the DES cipher producing portion 54 are supplied to a bit extracting portion 55 and fed back to the register 53 as another input data. The register 53 is operative first to put out the register output data DRZ in response to the initial input data DIT and then to put out the register output data DRZ in response to the cipher data DEZ obtained from the DES cipher producing portion 54.

The bit extracting portion 55 is operative to extract 10 bits of 128 bits forming the cipher data DEZ as pseudo-random number data DXA. The pseudo-random number data DXA obtained from the bit extracting portion 55 are sent from the random number generating portion 52 to be supplied to the memory 51 as second reading address data. 1016 (1024–8) 10-bit words having respectively different 10-bit codes with the exception of the forbidden codes 000h to 003h and 3FCh to 3FFh are stored in the memory 51. The 10-bit code of each of 1016 10-bit words is in a specific corresponding relation to the 10-bit code of each of the 10-bit words constituting the Y signal video data DVY which are supplied to the memory 51 as the first reading address data, and under such specific corresponding relation, 1016 10-bit words are read from the memory 51 in response to the Y signal video data DVY and the specific corresponding relation between the 10-bit code of each of 1016 10-bit words and the 10-bit code of each of the 10-bit words constituting the Y signal video data DVY varies in response to the pseudo-random number data DXA supplied to the memory 51 as the second reading address data.

Figure 10:
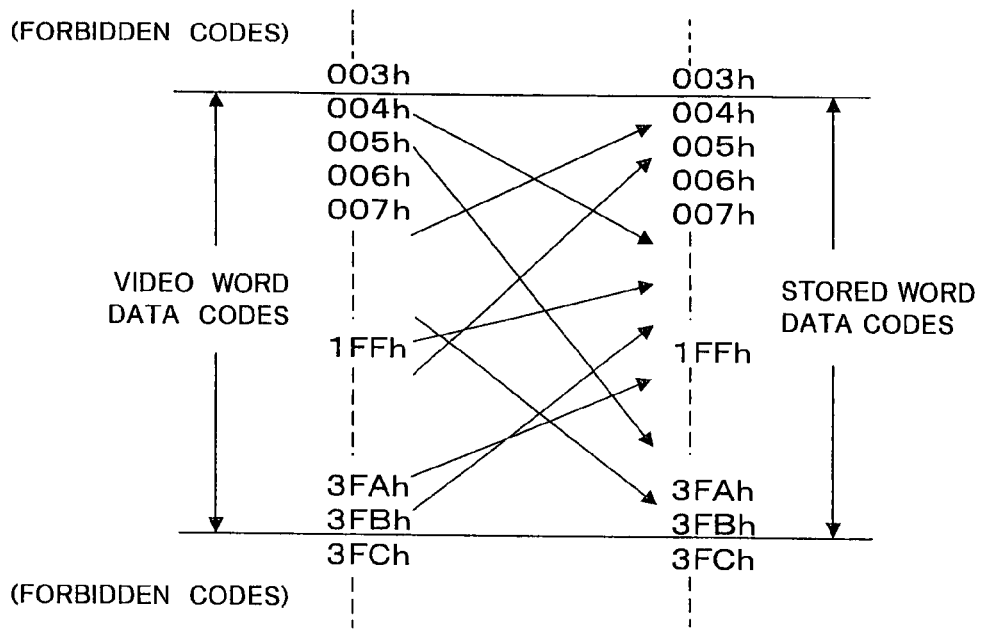
FIG. 10 is an illustration used for explaining data writing in and data reading from a memory shown in each of FIGS. 8 and 9.

For example, if the 10-bit code of each of the 10-bit words constituting the Y signal video data DVY is called a video word data code and the 10-bit code of each of 1016 10-bit words stored in the memory 51 is called a stored word data code, the stored word data code is in such a specific corresponding relation as shown with arrowheaded lines in FIG. 10 to the video word data code, and under such specific corresponding relation, the 10-bit words each having the stored word data code are read from the memory 51 in accordance with the arrowheaded lines in response to the 10-bit words each having the video word data code. When the pseudo-random number data DXA varies, the specific corresponding relation shown with arrowheaded lines in FIG. 10 varies also in response to the variation in the pseudo-random number data DXA.

The 10-bit words each having the stored word data code read out from the memory 51 are successively arranged to produce the enciphered Y signal video data DXY in the form of 10-bit word sequence data. Accordingly, this results in that the Y signal video data DVY are subjected to code conversion for obtaining 10-bit code in response to the pseudo-random number data DXA with the exception of the forbidden codes and thereby converted into the enciphered Y signal video data DXY in the memory 51. As a result, the enciphered Y signal video data DXY do not contain any forbidden code.

The first embodied structure shown in FIG. 9 of the C data enciphering portion 42 is constituted with a memory 56 to which the C signal video data DVC in the form of 10-bit word sequence data are supplied as first reading address data and a random number generating portion 57 to which the key data DEY are supplied.

The random number generating portion 57 is constituted in the same manner as the random number generating portion 52 shown in FIG. 8. The circuit blocks in FIG. 9 corresponding to those in FIG. 8 are marked with the references common to FIG. 8 and further description thereof will be omitted. Pseudo-random number data DXA obtained from the random number generating portion 57 are supplied to the memory 56 as second reading address data.

1016 (1024−8) 10-bit words having respectively different 10-bit codes with the exception of the forbidden codes 000h to 003h and 3FCh to 3FFh are stored also in the memory 56. The 10-bit code of each of 1016 10-bit words is in a specific corresponding relation to the 10-bit code of each of the 10-bit words constituting the C signal video data DVC which are supplied to the memory 56 as the first reading address data, and under such specific corresponding relation, 1016 10-bit words are read from the memory 56 in response to the C signal video data DVC and the specific corresponding relation between the 10-bit code of each of 1016 10-bit words and the 10-bit code of each of the 10-bit words constituting the C signal video data DVC varies in response to the pseudo-random number data DXA supplied to the memory 56 as the second reading address data.

For example, if the 10-bit code of each of the 10-bit words constituting the C signal video data DVC is called a video word data code and the 10-bit code of each of 1016 10-bit words stored in the memory 51 is called a stored word data code, the stored word data code is in such a specific corresponding relation as shown with arrowheaded lines in FIG. 10 to the video word data code, and under such specific corresponding relation, the 10-bit words each having the stored word data code are read from the memory 56 in accordance with the arrowheaded lines in response to the 10-bit words each having the video word data code. When the pseudo-random number data DXA varies, the specific corresponding relation shown with arrowheaded lines in FIG. 10 varies also in response to the variation in the pseudo-random number data DXA.

The 10-bit words each having the stored word data code read out from the memory 56 are successively arranged to produce the enciphered C signal video data DXC in the form of 10-bit word sequence data. Accordingly, this results in that the C signal video data DVC are subjected to code conversion for obtaining 10-bit code in response to the pseudo-random number data DXA with the exception of the forbidden codes and thereby converted into the enciphered C signal video data DXC in the memory 56. As a result, the enciphered C signal video data DXC do not contain any forbidden code.

Although each of the random number generating portions 52 and 57 connected to the memories 51 and 56, respectively, is operative to produce the pseudo-random number data DXA to be supplied to the memory 51 or 56 in the embodied structures shown in FIGS. 8 and 9, it is also possible to have such variations as to cause each of the random number generating portions 52 and 57 to produce, instead of the pseudo-random number data DXA, predetermined genuine random number data to be supplied to the memory 51 or 56.

Figure 11:
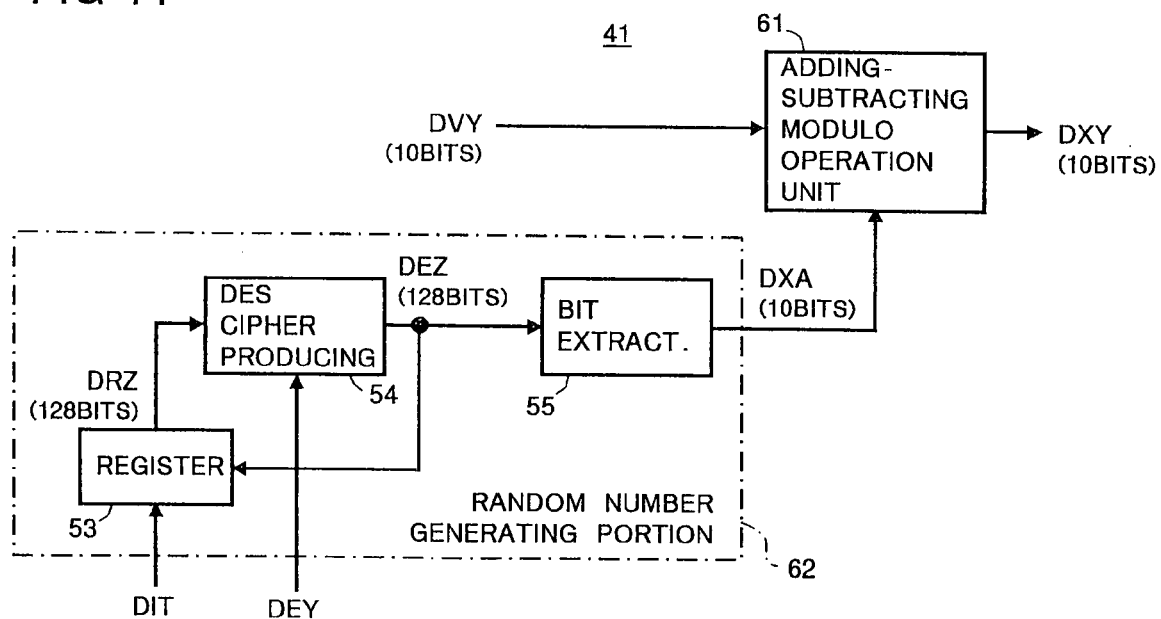
FIG. 11 is a schematic block diagram showing a second embodied structure of the Y data enciphering portion in the embodied structure shown in FIG. 7.
Figure 12:
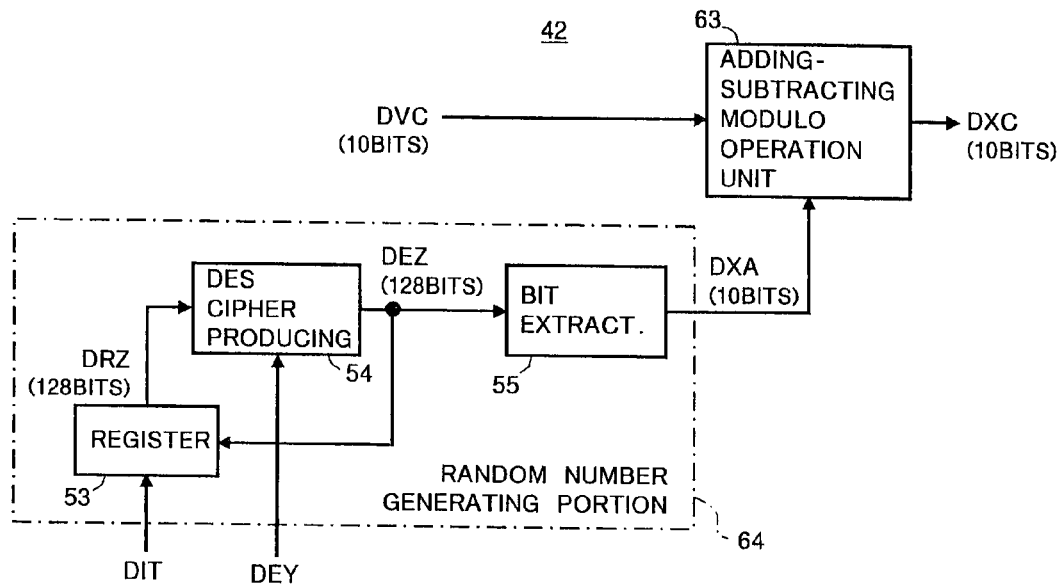
FIG. 12 is a schematic block diagram showing a second embodied structure of the C data enciphering portion in the embodied structure shown in FIG. 7.

FIGS. 11 and 12 show a second embodied structures of the Y data enciphering portion 41 shown in FIG. 7 and a second embodied structures of the C data enciphering portion 42 shown in FIG. 7, respectively.

In the case where the enciphering portion 31 shown in FIG. 6 is constituted with the Y data enciphering portion 41 having the second embodied structure shown in FIG. 11 and the C data enciphering portion 42 having the second embodied structure shown in FIG. 12, the structure of the enciphering portion 31 thus constituted corresponds to an embodiment of apparatus for transmitting data according to the invention.

The second embodied structure shown in FIG. 11 of the Y data enciphering portion 41 is constituted with an adding-subtracting modulo operation unit 61 to which the Y signal video data DVY in the form of 10 bit word sequence data are supplied and a random number generating portion 62 to which the key data DEY are supplied.

The random number generating portion 62 is constituted in the same manner as the random number generating portion 52 shown in FIG. 8. The circuit blocks in the random number generating portion 62 corresponding to those in the random number generating portion 52 shown in FIG. 8 are marked with the references common to FIG. 8 and further description thereof will be omitted. Pseudo-random number data DXA obtained from the random number generating portion 62 are supplied to the adding-subtracting modulo operation unit 61.

The adding-subtracting modulo operation unit 61 is operative to perform adding-subtracting modulo operation, which is necessary for subjecting the Y signal video data DVY to code conversion for obtaining 10-bit code in response to the pseudo-random number data DXA with the exception of the forbidden codes, in use of the fact that information codes of the Y signal video data DVY in the form of 10-bit word sequence data do not contain any forbidden code and a range of the information codes is arranged between ranges of the forbidden codes to adjacent to the latter, and further operative to use converted 10-bit codes which are obtained by the adding-subtracting modulo operation for forming the enciphered Y signal video data DXY. As a result, the Y signal video data DVY are converted into the enciphered Y signal video data DXY which do not contain any forbidden code.

Taking up 10-bit codes because the Y signal video data DVY is constituted in the form of 10-bit word sequence data, there are 1024 different 10-bit codes from 000h to 3FFh. If these 1024 different 10-bit codes from 000h to 3FFh are marked successively with code position numbers 1 to 1024, the code position number for 10-bit code of each of the 10-bit words constituting the enciphered Y signal video data DXY is determined by the adding-subtracting modulo operation.

Supposing that Mi represents the code position number for each of the information codes of the Y signal video data DVY, Ci represents the code position number for each of the information codes of the enciphered Y signal video data DXY, Ei represents the code position number for each of the 10-bit code of the pseudo-random number data DXA, N1 represents the number of the forbidden codes arranged out of one side of the range of the information codes of the Y signal video data DVY and N2 represents the number of the information codes of the Y signal video data DVY, the adding-subtracting modulo operation is represented with the following equation.

$$Ci=\{(Mi-N1)+Ei\} \bmod N2+N1 \qquad (1)$$

wherein $\{(Mi-N1)+Ei\}$ mod N2 represents a remainder obtained by dividing $\{(Mi-N1)+Ei\}$ by N2.

Since the Y signal video data DVY are constituted in the form of 10-bit word sequence data, N1 is equal to the number of the forbidden codes 000h to 003h, namely, 4, and N2 is equal to the number obtained by subtracting the number of the forbidden codes from the total number of the 10-bit codes, namely, 1024−8=1016.

Figure 13:
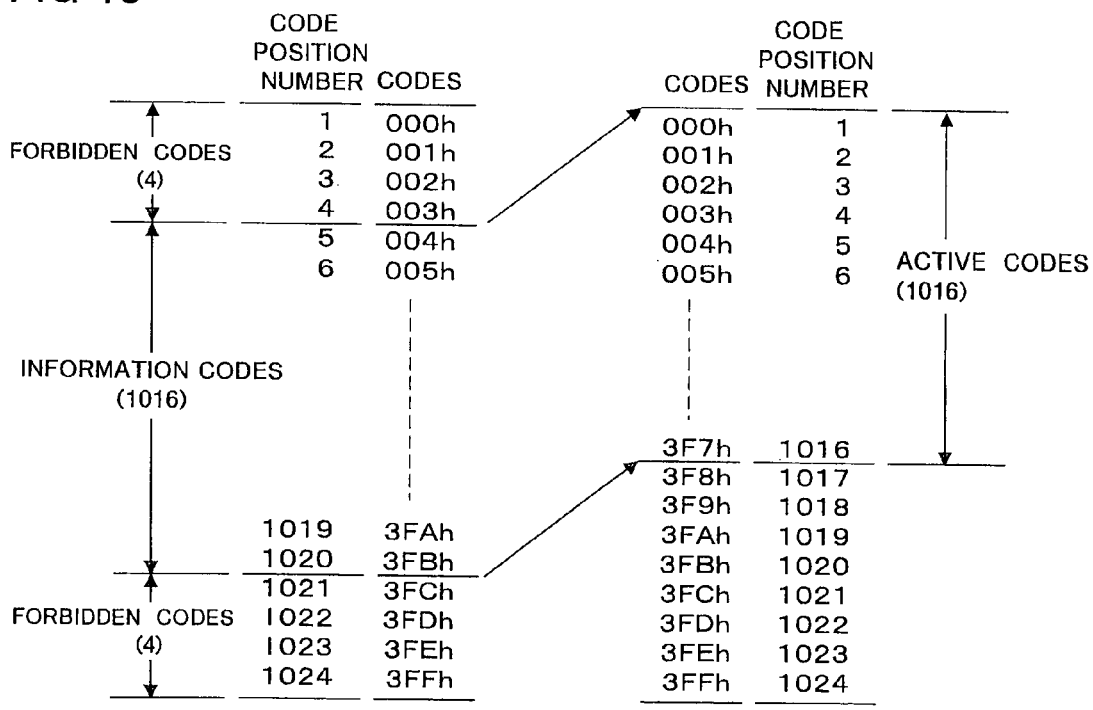
FIG. 13 is an illustration used for explaining the operation of an adding-subtracting modulo operation unit shown in each of FIG. 11 and FIG. 12.

In the equation (1) mentioned above, with the subtraction for subtracting N1 from Mi, the code position number of the information code of the Y signal video data DVY in the code position range from the code position number 5 corresponding to 004h to the code position number 1020 corresponding to 3FBh is converted into the code position number in the code position range from the code position number 1 corresponding to 000h to the code position number 1016 corresponding to 3F7h, which correspond to active codes 000h to 1016h, as shown in FIG. 13. Then, the modulo operation, by which the code position number of the 10-bit code of the pseudo-random number data DXA is added to the code position number converted as mentioned above to produce a sum and a remainder is obtained by dividing the sum by 1016, is performed. Further, with the addition for adding 4 to the obtained remainder, a code position number in the code position range from the code position number 5 corresponding to 004h to the code position number 1020 corresponding to 3FBh is obtained and the code position number thus obtained is used as the code position number Ci for the information code of the enciphered Y signal video data DXY.

Then, in the adding-subtracting modulo operation unit 61, the 10-bit code corresponding to the code position number Ci obtained by the adding-subtracting modulo operation is used as the information code of the enciphered Y signal video data DXY. The information code of the enciphered Y signal video data DXY thus determined is obtained by converting the information code of the Y signal video data DVY into one of the codes which do not include the forbidden codes in response to the 10-bit code of the pseudo-random number data DXA and therefore the enciphered Y signal video data DXY which are constituted with the information codes obtained by the adding-subtracting modulo operation do not contain any forbidden code.

The second embodied structure shown in FIG. 12 of the C data enciphering portion 42 is constituted with an adding-subtracting modulo operation unit 63 to which the C signal video data DVC in the form of 10-bit word sequence data are supplied and a random number generating portion 64 to which the key data DEY are supplied.

The random number generating portion 64 is constituted in the same manner as the random number generating portion 62 shown in FIG. 11. The circuit blocks in the random number generating portion 64 corresponding to those in the random number generating portion 62 shown in FIG. 11 are marked with the references common to FIG. 11 and further description thereof will be omitted. Pseudo-random number data DXA obtained from the random number generating portion 64 are supplied to the adding-subtracting modulo operation unit 63.

The adding-subtracting modulo operation unit 63 is operative to perform adding-subtracting modulo operation, which is necessary for subjecting the C signal video data DVC to code conversion for obtaining 10-bit code in response to the pseudo-random number data DXA with the exception of the forbidden codes, in use of the fact that information codes of the C signal video data DVC in the form of 10-bit word sequence data do not contain any forbidden code and a range of the information codes is arranged between ranges of the forbidden codes to adjacent to the latter. The adding-subtracting modulo operation for the C signal video data DVC in the adding-subtracting modulo operation unit 63 is carried out in the similar manner as the adding-subtracting modulo operation for the Y signal video data DVY carried out in the adding-subtracting modulo operation unit 61 shown in FIG. 11 and converted codes determined by the adding-subtracting modulo operation in the adding-subtracting modulo operation unit 63 are used as the information code of the enciphered C signal video data DXC.

The information code of the enciphered C signal video data DXC determined as mentioned above is obtained by converting the information code of the C signal video data DVC into one of the codes which do not include the forbidden codes in response to the 10-bit code of the pseudo-random number data DXA and therefore the enciphered C signal video data DXC which are constituted with the information codes obtained by the adding-subtracting modulo operation do not contain any forbidden code.

Although each of the random number generating portions 62 and 64 connected to the adding-subtracting modulo operation units 61 and 63, respectively, is operative to produce the pseudo-random number data DXA to be supplied to the adding-subtracting modulo operation units 61 and 63 in the embodied structures shown in FIGS. 11 and 12, it is also possible to have such variations as to cause each of the random number generating portions 62 and 64 to produce, instead of the pseudo-random number data DXA, predetermined genuine random number data to be supplied to the adding-subtracting modulo operation units 61 or 63.

Figure 14:
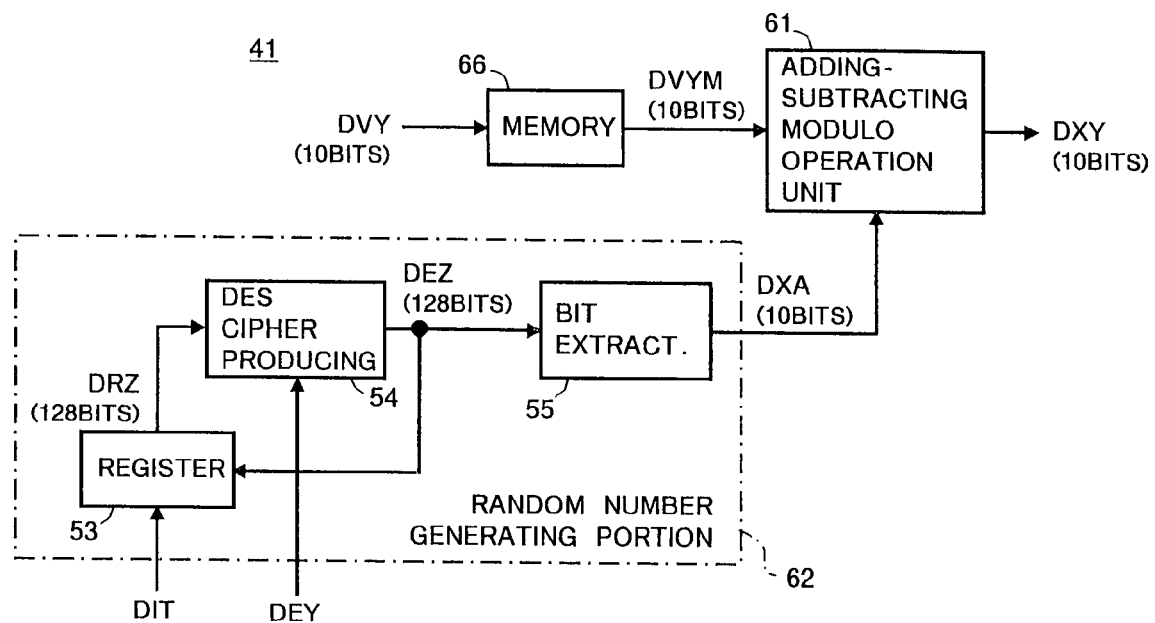
FIG. 14 is a schematic block diagram showing a third embodied structure of the Y data enciphering portion in the embodied structure shown in FIG. 7.
Figure 15:
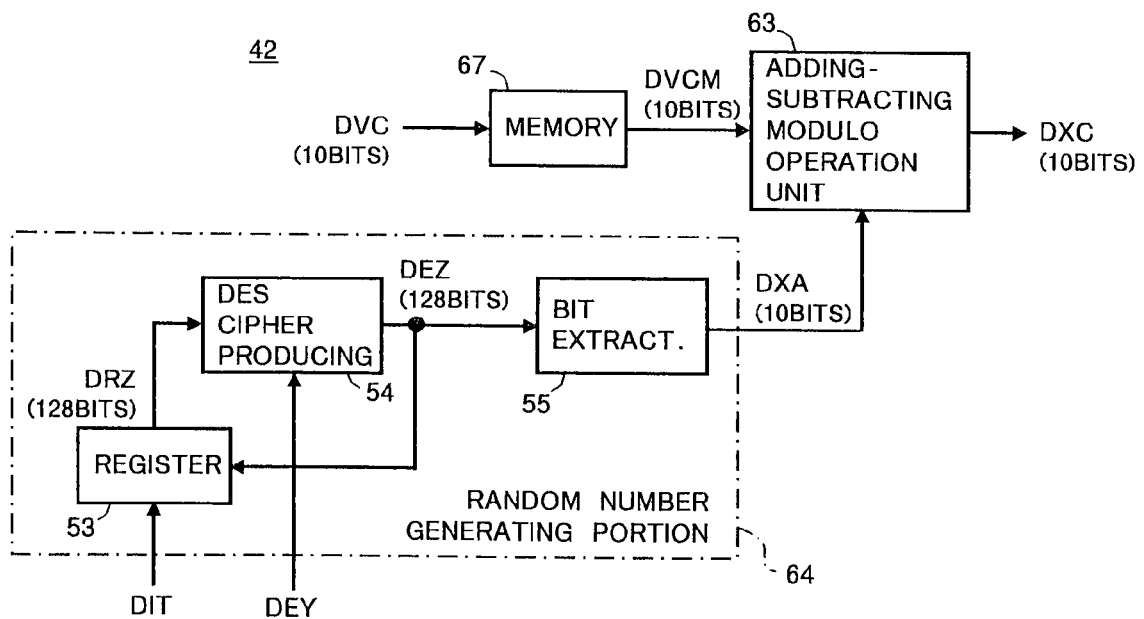
FIG. 15 is a schematic block diagram showing a third embodied structure of the C data enciphering portion in the embodied structure shown in FIG. 7.

FIGS. 14 and 15 show a third embodied structures of the Y data enciphering portion 41 shown in FIG. 7 and a third embodied structures of the C data enciphering portion 42 shown in FIG. 7, respectively.

In the case where the enciphering portion 31 shown in FIG. 6 is constituted with the Y data enciphering portion 41 having the third embodied structure shown in FIG. 14 and the C data enciphering portion 42 having the third embodied structure shown in FIG. 15, the structure of the enciphering portion 31 thus constituted corresponds to an embodiment of apparatus for transmitting data according to the invention.

The third embodied structures shown in FIG. 14 of the Y data enciphering portion 41 is used for the Y signal video data DVY which are composed of 10-bit words each having information code extracted from a 10-bit code group in which the information codes are mixed with forbidden codes which are not set to be 000h to 003h and 3FCh to 3FFh.

Such a third embodied structure as shown in FIG. 14 is constituted by adding a memory 66 to an input end of the adding-subtracting modulo operation unit 61 in the second embodied structure shown in FIG. 11 of the Y data enciphering portion 41.

The Y signal video data DVY in the form of 10-bit word sequence data, which are composed of 10-bit words each having the information code extracted from the 10-bit code group in which the information codes are mixed with the forbidden codes which are not set to be 000h to 003h and 3FCh to 3FFh, are supplied to the memory 66. In the memory 66, the writing and reading of the Y signal video data DVY are carried out and read Y signal video data DVYM based on the Y signal video data DVY are sent from the memory 66.

Figure 16:
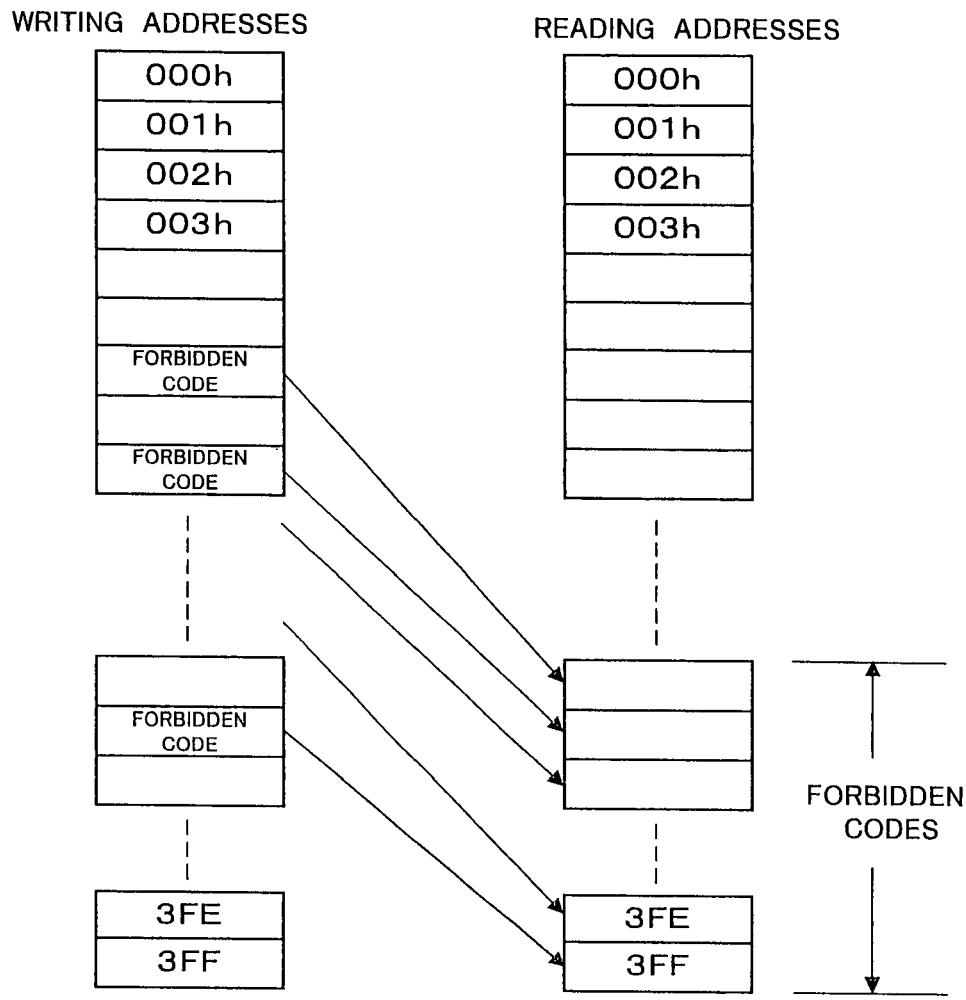
FIG. 16 is an illustration used for explaining data writing in and data reading from a memory shown in each of FIGS. 14 and 15.

In the writing of the Y signal video data DVY in the memory 66, each of the 10-bit words composing of the Y signal video data DVY is written in the memory 66 with writing address determined in accordance with 10-bit code of the 10-bit word to be written and in the reading of the Y signal video data DVY from the memory 66, each of the 10-bit word composing of the Y signal video data DVY is read from the memory 66 with reading address which is put in a specific corresponding relation to the writing address. In the specific corresponding relation between the writing address and the reading address, for example, the writing addresses allotted to the forbidden codes are positioned out of the range of the writing addresses allotted to the information codes, as shown with arrowheaded lines in FIG. 16.

With such specific corresponding relation between the writing address and the reading address, the read Y signal video data DVYM send from the memory 66 by reading the Y signal video data DVY written in the memory 66 are constituted in such a manner that the range of the forbidden codes is arranged out of the range of the information codes to adjacent to the same. This means that the memory 66 is operative to convert the Y signal video data DVY which are composed of 10-bit words each having the information code extracted from the 10-bit code group in which the information codes are mixed with the forbidden codes into the read Y signal video data DVYM which are constituted in such a manner that the range of the forbidden codes is arranged out of the range of the information codes to adjacent to the same.

In the read Y signal video data DVYM sent from the memory 66, the range of the forbidden codes is arranged out of the range of the information codes to adjacent to the same in the same manner as the Y signal video data DVY supplied to the adding-subtracting modulo operation unit 61 in the second embodied structure shown in FIG. 11 of the Y data enciphering portion 41, in which the forbidden codes are set to be 000h to 003h and 3FCh to 3FFh which are arranged out of the information codes. The read Y signal video data DVYM thus obtained from the memory 66 are supplied to the adding-subtracting modulo operation unit 61.

The adding-subtracting modulo operation unit 61 is operative to perform adding-subtracting modulo operation for the read Y signal video data DVYM to produce enciphered Y signal video data DXY. The adding-subtracting modulo operation for the read Y signal video data DVYM in the adding-subtracting modulo operation unit 61 is carried out in the similar manner as the adding-subtracting modulo operation for the Y signal video data DVY carried out in the adding-subtracting modulo operation unit 61 shown in FIG. 11 and converted codes determined by the adding-subtracting modulo operation in the adding-subtracting modulo operation unit 61 are used as the information code of the enciphered Y signal video data DXY. As a result, the read Y signal video data DVYM are converted into the enciphered Y signal video data DXY which do not contain any forbidden code.

As described above, in the third embodied structure shown in FIG. 14 of the Y data enciphering portion 41, the Y signal video data DVY are converted into the read Y signal video data DVYM in the memory 66 and then the read Y signal video data DVYM are subjected to the adding-subtracting modulo operation in the adding-subtracting modulo operation unit 61 to be converted into the enciphered Y signal video data DXY.

The third embodied structures shown in FIG. 15 of the C data enciphering portion 42 is used for the C signal video data DVC which are composed of 10-bit words each having information code extracted from a 10-bit code group in which the information codes are mixed with forbidden codes which are not set to be 000h to 003h and 3FCh to 3FFh.

Such a third embodied structure as shown in FIG. 15 is constituted by adding a memory 67 to an input end of the adding-subtracting modulo operation unit 63 in the second embodied structure shown in FIG. 12 of the C data enciphering portion 42.

The C signal video data DVC in the form of 10-bit word sequence data, which are composed of 10-bit words each having the information code extracted from the 10-bit code group in which the information codes are mixed with the forbidden codes which are not set to be 000h to 003h and 3FCh to 3FFh, are supplied to the memory 67. In the memory 67, the writing and reading of the C signal video data DVC are carried out and read C signal video data DVCM based on the C signal video data DVC are sent from the memory 67. The writing and reading of the C signal video data DVC in the memory 67 are carried out in the similar manner as the writing and reading of the Y signal video data DVY in the memory 66 shown in FIG. 14 and thereby the read C signal video data DVCM, in which a range of the forbidden codes is arranged out of a range of the information codes to adjacent to the same, are sent from the memory 67. This means that the memory 67 is operative to convert the C signal video data DVC which are composed of 10-bit words each having the information code extracted from the 10-bit code group in which the information codes are mixed with the forbidden codes into the read C signal video data DVCM which are constituted in such a manner that the range of the forbidden codes is arranged out of the range of the information codes to adjacent to the same.

In the read C signal video data DVCM sent from the memory 67, the range of the forbidden codes is arranged out of the range of the information codes to adjacent to the same in the same manner as the C signal video data DVC supplied to the adding-subtracting modulo operation unit 63 in the second embodied structure shown in FIG. 12 of the C data enciphering portion 42, in which the forbidden codes are set to be 000h to 003h and 3FCh to 3FFh which are arranged out of the information codes. The read C signal video data DVCM thus obtained from the memory 67 are supplied to the adding-subtracting modulo operation unit 63.

The adding-subtracting modulo operation unit 63 is operative to perform adding-subtracting modulo operation for the read C signal video data DVCM to produce enciphered C signal video data DXC. The adding-subtracting modulo operation for the read C signal video data DVCM in the adding-subtracting modulo operation unit 63 is carried out in the similar manner as the adding-subtracting modulo operation for the C signal video data DVC carried out in the adding-subtracting modulo operation unit 63 shown in FIG. 12 and converted codes determined by the adding-subtracting modulo operation in the adding-subtracting modulo operation unit 63 are used as the information code of the enciphered C signal video data DXC. As a result, the read C signal video data DVCM are converted into the enciphered C signal video data DXC which do not contain any forbidden code.

As described above, in the third embodied structure shown in FIG. 15 of the C data enciphering portion 42, the C signal video data DVC are converted into the read C signal video data DVCM in the memory 67 and then the read C signal video data DVCM are subjected to the adding-subtracting modulo operation in the adding-subtracting modulo operation unit 63 to be converted into the enciphered C signal video data DXC.

Although each of the random number generating portions 62 and 64 connected to the adding-subtracting modulo operation units 61 and 63, respectively, is operative to produce the pseudo-random number data DXA to be supplied to the adding-subtracting modulo operation units 61 and 63 in the embodied structures shown in FIGS. 14 and 15, it is also possible to have such variations as to cause each of the random number generating portions 62 and 64 to produce, instead of the pseudo-random number data DXA, predetermined genuine random number data to be supplied to the adding-subtracting modulo operation units 61 or 63.

Figure 17:
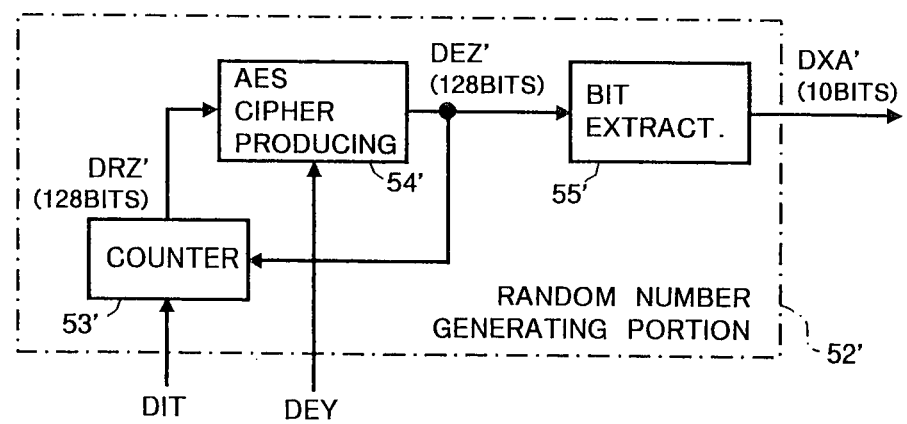
FIG. 17 is a schematic block diagram showing an example of a random number generating portion which can be used in place of a random number generating portion shown in each of FIGS. 8 and 9, FIGS. 11 and 12 and FIGS. 14 and 15.

FIG. 17 shows an example of a random number generating portion which can be used in place of the random number generating portion 52 in the first embodied structure shown in FIG. 8 of the Y data enciphering portion 41, the random number generating portion 57 in the first embodied structure shown in FIG. 9 of the C data enciphering portion 42, the random number generating portion 62 in each of the second and third embodied structures shown in FIGS. 11 and 14 of the Y data enciphering portion 41 or the random number generating portion 64 in each of the second and third embodied structures shown in FIGS. 12 and 15 of the C data enciphering portion 42.

In the random number generating portion 52' shown in FIG. 17, a counter 53' is operative to count in response to initial input data DIT to produce counter output data DRZ' composed of, for example, 128 bits to be supplied to an AES cipher producing portion 54'.

The AES cipher producing portion 54' is operative to perform AES enciphering process in accordance with the AES (Advanced Encryption Standard) published in 2001 by the National Institute of Standards and Technology, the United State of America.

Key data DEY are also supplied to the AES cipher producing portion 54'. In the AES cipher producing portion 54', the counter output data DRZ' are subjected to the AES enciphering process in accordance with the rules determined by the key data DEY to produce cipher data DEZ' composed of, for example, 128 bits.

The cipher data DEZ' obtained from the AES cipher producing portion 54' are supplied to a bit extracting portion 55'. The bit extracting portion 55' is operative to extract 10 bits of 128 bits forming the cipher data DEZ' as pseudo-random number data DXA'. The pseudo-random number data DXA' obtained from the bit extracting portion 55' are sent from the random number generating portion 52' to be used in place of the pseudo-random number data DXA obtained from the random number generating portion 52 shown in FIG. 8, the random number generating portion 57 shown in FIG. 9, the random number generating portion 62 shown in each of FIGS. 11 and 14 or the random number generating portions 64 shown in each of FIGS. 12 and 15.

Figure 18:
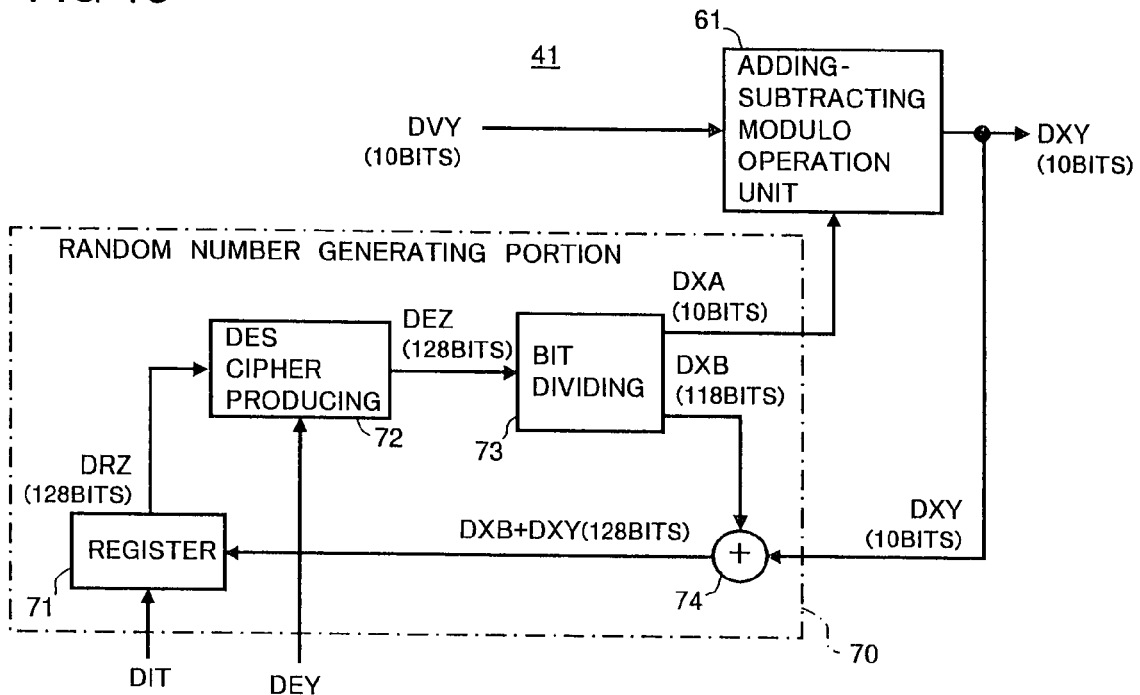
FIG. 18 is a schematic block diagram showing a fourth embodied structure of the Y data enciphering portion in the embodied structure shown in FIG. 7.
Figure 19:
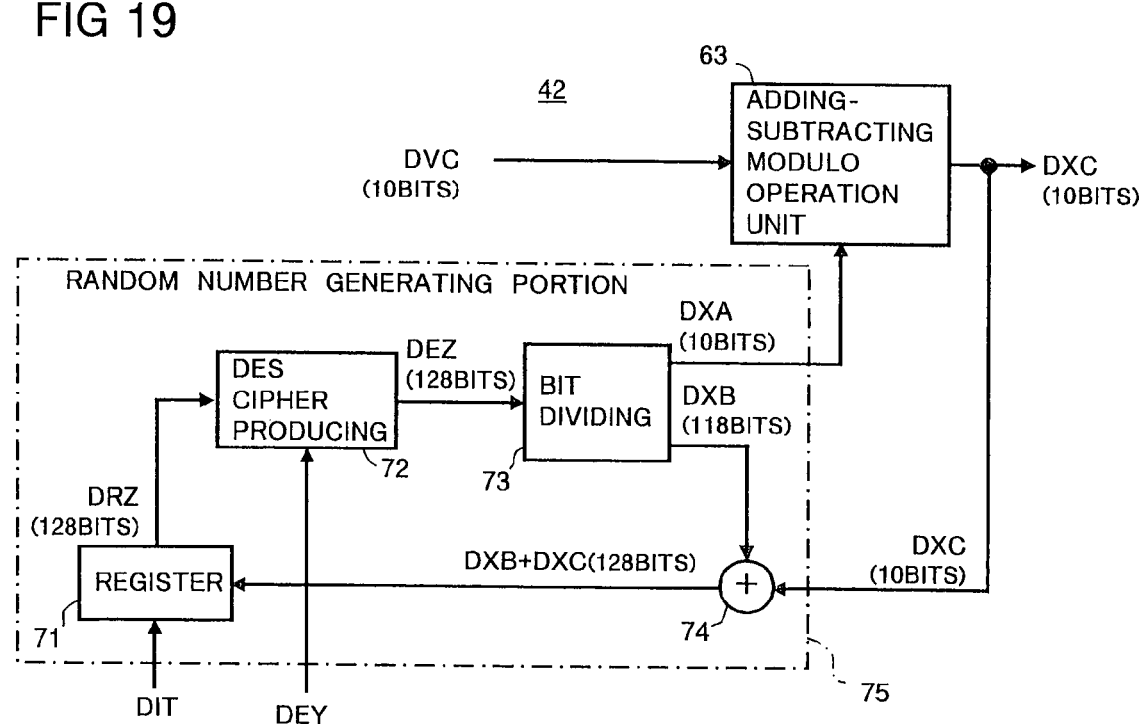
FIG. 19 is a schematic block diagram showing a fourth embodied structure of the C data enciphering portion in the embodied structure shown in FIG. 7.

FIGS. 18 and 19 show a fourth embodied structures of the Y data enciphering portion 41 shown in FIG. 7 and a fourth embodied structures of the C data enciphering portion 42 shown in FIG. 7, respectively.

In the case where the enciphering portion 31 shown in FIG. 6 is constituted with the Y data enciphering portion 41 having the fourth embodied structure shown in FIG. 18 and the C data enciphering portion 42 having the fourth embodied structure shown in FIG. 19, the structure of the enciphering portion 31.

The fourth embodied structure shown in FIG. 18 of the Y data enciphering portion 41 is constituted with an adding-subtracting modulo operation unit 61 to which Y signal video data DVY in the form of 10-bit word sequence data are supplied and a random number generating portion 70 to which key data DEY are supplied.

The adding-subtracting modulo operation unit 61 is constituted in the same manner as the adding-subtracting modulo operation unit 61 shown in FIG. 11 and operative to convert the Y signal video data DVY into enciphered Y signal video data DXY constituted in the form of 10-bit word sequence data which do not contain any forbidden code in such a manner as aforementioned.

In the random number generating portion 70, a register 71 is operative to put out, in response to input data, register output data DRZ composed of, for example, 128 bits to be supplied to a DES cipher producing portion 72. Initial input data DIT are supplied to the register 71.

The key data DEY also supplied to the DES cipher producing portion 72. In the DES cipher producing portion 72, the register output data DRZ are subjected to the DES enciphering process in accordance with the rules determined by the key data DEY to produce cipher data DEZ composed of, for example, 128 bits. The cipher data DEZ obtained from the DES cipher producing portion 72 are supplied to a bit dividing portion 73.

The bit dividing portion 73 is operative to divide 128 bits composing the cipher data DEZ into 10 bits and 118 bits to produce pseudo-random number data DXA composed of 10 bits and feedback data DXB composed of 118 bits. The pseudo-random number data DXA obtained from the bit dividing portion 73 are sent from the random number generating portion 70 to the adding-subtracting modulo operation unit 61. The feedback data DXB obtained from the bit dividing portion 73 are supplied to a bit adder 74.

The enciphered Y signal video data DXY in the form of 10-bit word sequence data obtained from the adding-subtracting modulo operation unit 61 are also supplied to the bit adder 74. In the bit adder 74, the enciphered Y signal video data DXY in the form of 10-bit word sequence data are added in bit to the feedback data DXB composed of 118 bits to produce data DXB+DXY composed of 128 bits. The data DXB+DXY composed of 128 bits thus obtained are fed to the register 71 as another input data. Therefore, the register 71 is operative first to put out the register output data DRZ in response to the initial input data DIT and then to put out the register output data DRZ in response to the data DXB+DXY obtained from the bit adder 74.

The fourth embodied structure shown in FIG. 19 of the C data enciphering portion 42 is constituted with an adding-subtracting modulo operation unit 63 to which C signal video data DVC in the form of 10-bit word sequence data are supplied and a random number generating portion 75 to which key data DEY are supplied.

The adding-subtracting modulo operation unit 63 is constituted in the same manner as the adding-subtracting modulo operation unit 63 shown in FIG. 12 and operative to convert the C signal video data DVC into enciphered C signal video data DXC constituted in the form of 10-bit word sequence data which do not contain any forbidden code in such a manner as aforementioned.

The random number generating portion 75 is constituted with a register 71, a DES cipher producing portion 72, a bit dividing portion 73 and a bit adder 74 in the same manner as the random number generating portion 70 shown in FIG. 18. In the bit adder 74 provided in the random number generating portion 75, the enciphered C signal video data DXC in the form of 10-bit word sequence data obtained from the adding-subtracting modulo operation unit 61 are added in bit to feedback data DXB composed of 118 bits obtained from the bit dividing portion 73 to produce data DXB+DXC composed of 128 bits. The other operations of the random number generating portion 75 are the same as those in the random number generating portion 70 shown in FIG. 18.

Although each of the random number generating portions 70 and 75 connected to the adding-subtracting modulo operation units 61 and 63, respectively, is operative to produce the pseudo-random number data DXA to be supplied to the adding-subtracting modulo operation units 61 and 63 in the embodied structures shown in FIGS. 18 and 19, it is also possible to have such variations as to cause each of the random number generating portions 70 and 75 to produce, instead of the pseudo-random number data DXA, predetermined genuine random number data to be supplied to the adding-subtracting modulo operation units 61 or 63.

Figure 20:
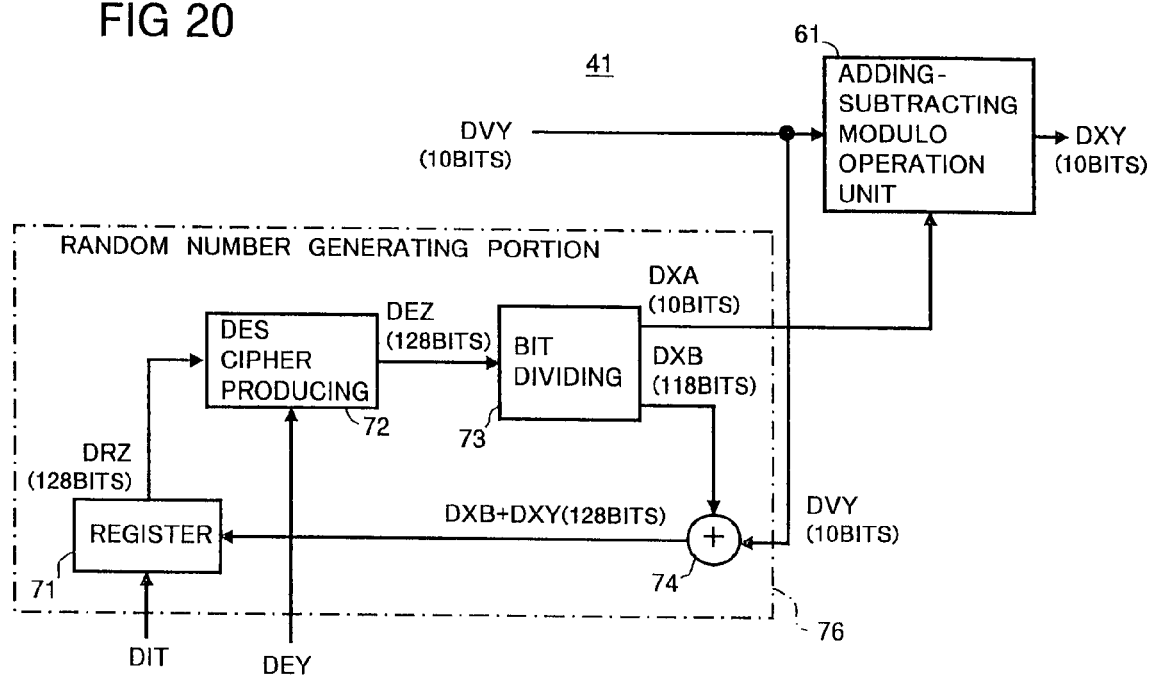
FIG. 20 is a schematic block diagram showing a fifth embodied structure of the Y data enciphering portion in the embodied structure shown in FIG. 7.
Figure 21:
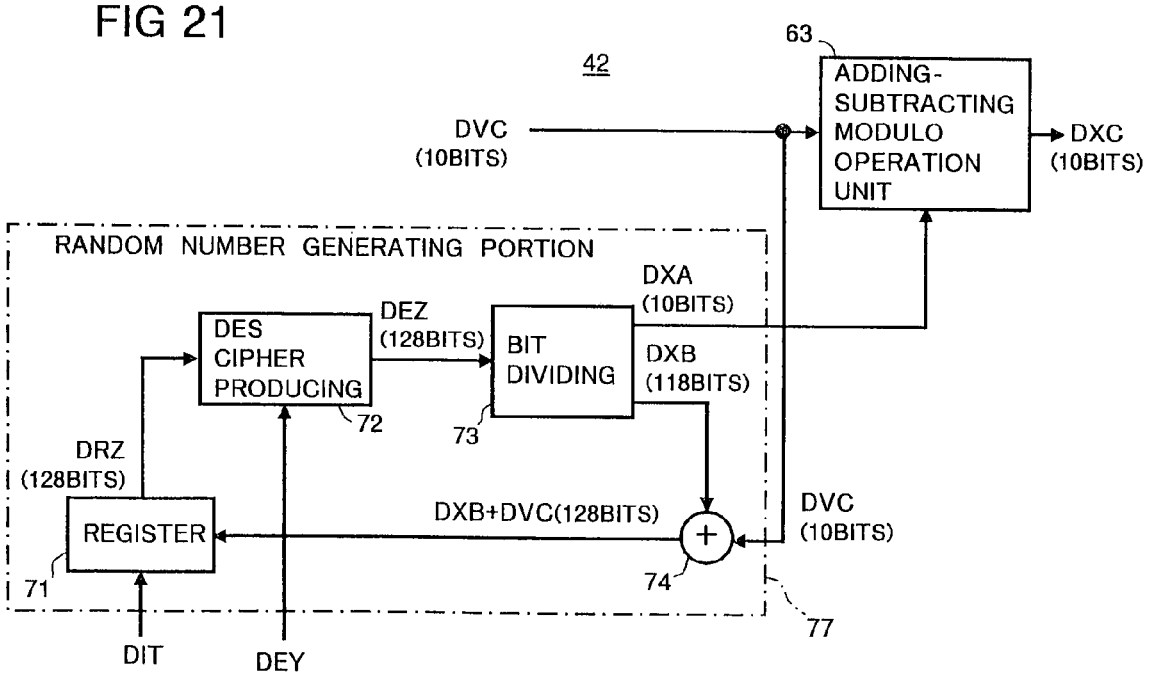
FIG. 21 is a schematic block diagram showing a fifth embodied structure of the C data enciphering portion in the embodied structure shown in FIG. 7.

FIGS. 20 and 21 show a fifth embodied structures of the Y data enciphering portion 41 shown in FIG. 7 and a fifth embodied structures of the C data enciphering portion 42 shown in FIG. 7, respectively.

In the case where the enciphering portion 31 shown in FIG. 6 is constituted with the Y data enciphering portion 41 having the fifth embodied structure shown in FIG. 20 and the C data enciphering portion 42 having the fifth embodied structure shown in FIG. 21, the structure of the enciphering portion 31.

The fifth embodied structure shown in FIG. 20 of the Y data enciphering portion 41 is constituted with an adding-subtracting modulo operation unit 61 to which Y signal video data DVY in the form of 10-bit word sequence data are supplied and a random number generating portion 76 to which key data DEY are supplied.

The adding-subtracting modulo operation unit 61 is constituted in the same manner as the adding-subtracting modulo operation unit 61 shown in FIG. 18 and operative to convert the Y signal video data DVY into enciphered Y signal video data DXY constituted in the form of 10-bit word sequence data which do not contain any forbidden code in such a manner as aforementioned.

The random number generating portion 76 is constituted with a register 71, a DES cipher producing portion 72, a bit dividing portion 73 and a bit adder 74 in the same manner as the random number generating portion 70 shown in FIG. 18. In the bit adder 74 provided in the random number generating portion 76, the Y signal video data DVY in the form of 10-bit word sequence data which is supplied to the adding-subtracting modulo operation unit 61 are added in bit to feedback data DXB composed of 118 bits obtained from the bit dividing portion 73 to produce data DXB+DVY composed of 128 bits. The other operations of the random number generating portion 76 are the same as those in the random number generating portion 70 shown in FIG. 18.

The fifth embodied structure shown in FIG. 21 of the C data enciphering portion 42 is constituted with an adding-subtracting modulo operation unit 63 to which C signal video data DVC in the form of 10-bit word sequence data are supplied and a random number generating portion 77 to which key data DEY are supplied.

The adding-subtracting modulo operation unit 63 is constituted in the same manner as the adding-subtracting modulo operation unit 63 shown in FIG. 19 and operative to convert the C signal video data DVC into enciphered C signal video data DXC constituted in the form of 10-bit word sequence data which do not contain any forbidden code in such a manner as aforementioned.

The random number generating portion 77 is constituted with a register 71, a DES cipher producing portion 72, a bit dividing portion 73 and a bit adder 74 in the same manner as the random number generating portion 75 shown in FIG. 19. In the bit adder 74 provided in the random number generating portion 77, the C signal video data DVC in the form of 10-bit word sequence data which are supplied to the adding-subtracting modulo operation unit 63 are added in bit to feedback data DXB composed of 118 bits obtained from the bit dividing portion 73 to produce data DXB+DVC composed of 128 bits. The other operations of the random number generating portion 77 are the same as those in the random number generating portion 75 shown in FIG. 19.

Although each of the random number generating portions 76 and 77 connected to the adding-subtracting modulo operation units 61 and 63, respectively, is operative to produce pseudo-random number data DXA to be supplied to the adding-subtracting modulo operation units 61 and 63 in the embodied structures shown in FIGS. 20 and 21, it is also possible to have such variations as to cause each of the random number generating portions 76 and 77 to produce, instead of the pseudo-random number data DXA, predetermined genuine random number data to be supplied to the adding-subtracting modulo operation units 61 or 63.

Figure 22:
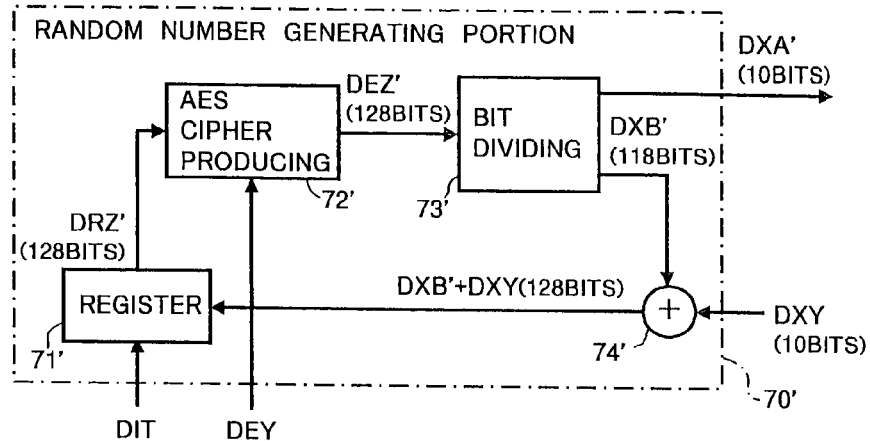
FIG. 22 is a schematic block diagram showing an example of a random number generating portion which can be used in place of a random number generating portion shown in each of FIGS. 18 to 21.

FIG. 22 shows an example of a random number generating portion which can be used in place of the random number generating portion 70 in the fourth embodied structure shown in FIG. 18 of the Y data enciphering portion 41, the random number generating portion 75 in the fourth embodied structure shown in FIG. 19 of the C data enciphering portion 42, the random number generating portion 76 in the fifth embodied structures shown in FIG. 20 of the Y data enciphering portion 41 or the random number generating portion 77 in the fifth embodied structures shown in FIG. 21 of the C data enciphering portion 42.

In a random number generating portion 70' shown in FIG. 22, a register 71' produces, in response to initial input data DIT, register output data DRZ' composed of, for example, 128 bits to be supplied to an AES cipher producing portion 72'.

The AES cipher producing portion 72' is constituted in the same manner as the AES cipher producing portion 54' in the random number generating portion 52' shown in FIG. 17.

Key data DEY are also supplied to the AES cipher producing portion 72'. In the AES cipher producing portion 72', the register output data DRZ' are subjected to the AES enciphering process in accordance with the rules determined by the key data DEY to produce cipher data DEZ' composed of, for example, 128 bits. The cipher data DEZ' obtained from the AES cipher producing portion 72' are supplied to a bit dividing portion 73'.

The bit dividing portion 73' is operative to divide 128 bits composing the cipher data DEZ' into 10 bits and 118 bits to produce pseudo-random number data DXA' composed of 10 bits and feedback data DXB' composed of 118 bits. The pseudo-random number data DXA' obtained from the bit dividing portion 73' are sent from the random number generating portion 70' to be used in place of the pseudo-random number data DXA obtained from the random number generating portion 70 shown in FIG. 18, the random number generating portion 75 shown in FIG. 19, the random number generating portion 76 shown in FIG. 20 or the random number generating portion 77 shown in FIG. 21.

The feedback data DXB' obtained from the bit dividing portion 73' are supplied to a bit adder 74'. Enciphered Y signal video data DXY in the form of 10-bit word sequence data are also supplied to the bit adder 74'. In the bit adder 74', the enciphered Y signal video data DXY in the form of 10-bit word sequence data are added in bit to the feedback data DXB' composed of 118 bits to produce data DXB'+DXY composed of 128 bits. The data DXB'+DXY composed of 128 bits thus obtained are fed to the register 71' as another input data. Therefore, the register 71' is operative first to put out the register output data DRZ' in response to the initial input data DIT and then to put out the register output data DRZ' in response to the data DXB'+DXY obtained from the bit adder 74'.

FIG. 23 shows, under a condition combined with the embodiment of apparatus for transmitting data shown in FIG. 6, an embodiment of apparatus for transmitting data.

The embodiment of apparatus for transmitting data shown in FIG. 6 has been already explained and therefore further description thereof will be omitted.

Referring to FIG. 23, the enciphered HD-SDI signal DXS transmitted from the serial data producing portion 33 in the embodiment of apparatus for transmitting data shown in FIG. 6 is received by a parallel data producing portion 81. In the parallel data producing portion 81, the enciphered HD-SDI signal DXS is supplied to an equalizer 82. In the equalizer 82, the enciphered HD-SDI signal DXS are subjected to level-equalization for compensating for reduction in high frequency components caused on a data transmission line to produce an equalized enciphered HD-SDI signal DXS'. The equalized enciphered HD-SDI signal DXS' obtained from the equalizer 82 is supplied to both of a NRZI converter 83 and a clock reproducing portion 84. In the clock reproducing portion 84, a clock signal CK contained in the equalized enciphered HD-SDI signal DXS' is reproduced.

The clock signal CK obtained from the clock reproducing portion 84 is supplied to the NRZI converter 83 so that NRZI conversion of the equalized enciphered HD-SDI signal DXS' is carried out with the clock signal CK in the NRZI converter 83. Therefore, an enciphered HD-SDI signal DXSC which has been subjected to the NRZI conversion is derived to be supplied to a descrambling portion 85. The clock signal CK obtained from the clock reproducing portion 84 is also supplied to the descrambling portion 85. In the descrambling portion 85, the enciphered HD-SDI signal DXSC is descrambled to produce a descrambled enciphered HD-SDI signal DXSD. The descrambled enciphered HD-SDI signal DXSD is derived from the descrambling portion 85 is supplied to both of an S/P converter 86 and a word synchronous signal generating portion 87.

The clock signal CK obtained from the clock reproducing portion 84 is also supplied to the word synchronous signal generating portion 87. A portion of the descrambled enciphered HD-SDI signal DXSD, which corresponds to serial data converted from the timing identification codes arranged in order of 3FFh, 000h, 000h for constituting the time reference code data SAV or EAV, is detected with the clock signal CK and a word synchronous signal SWS is produced in response to the detection of the aforementioned portion, in the word synchronous signal generating portion 87. The word synchronous signal SWS obtained from the word synchronous signal generating portion 87 is supplied to the S/P converter 86. The clock signal CK obtained from the clock reproducing portion 84 is also supplied to the S/P converter 86 and the descrambled enciphered HD-SDI signal DXSD is subjected to S/P conversion under the condition of word-synchronization according to the word synchronous signal SWS in the S/P converter 86. With the S/P conversion thus processed, the descrambled enciphered HD-SDI signal DXSD is converted into enciphered 20-bit word sequence data DXP which are constituted with the enciphered Y and P.sub.B/P.sub.R data sequences each forming 10-bit word sequence data and multiplexed bit by bit with their time reference code data SAV and EAV synchronizing with each other.

The enciphered 20-bit word sequence data DXP obtained from the S/P converter 86 are supplied to a data dividing portion 88. In the data dividing portion 88, the enciphered 20-bit word sequence data DXP are divided into the multiple time reference data DAV, the multiple ancillary data DAA and the enciphered video data DXI. The multiple time reference data DAV are obtained in the form of 20-bit word sequence data constituted with the time reference code data SAV and EAV, the line number data, the error detection code data and so on in the Y data sequence in the form of 10-bit word sequence data and the time reference code data SAV and EAV, the line number data, the error detection code data and so on in the P.sub.B/P.sub.R data sequence in the form of 10-bit word sequence data which are multiplexed bit by bit under the condition of word-synchronization. The multiple ancillary data DAA are obtained in the form of 20-bit word sequence data constituted with the ancillary data in the Y data sequence in the form of 10-bit word sequence data and the ancillary data in the P.sub.B/P.sub.R data sequence in the form of 10-bit word sequence data which are multiplexed bit by bit under the condition of word-synchronization. The enciphered video data DXI are obtained in the form of 20-bit word sequence data containing the Y signal video data DVY constituting the video data portion in the Y data sequence in the form of 10-bit word sequence data and the C signal video data DVC constituting the video data portion in the P.sub.B/P.sub.R data sequence in the form of 10-bit word sequence data which are multiplexed bit by bit under the condition of word-synchronization.

The multiple time reference data DAV, the multiple ancillary data DAA and the enciphered video data DXI obtained from the data dividing portion 88 are sent from the parallel data producing portion 81 to a deciphering processor 89. The deciphering processor 89 is constituted with a deciphering portion 90 and a key data generating portion 91.

The multiple time reference data DAV and the multiple ancillary data DAA pass through the deciphering processor 89 to be supplied to a serial data producing portion 92. The enciphered video data DXI are supplied to the deciphering portion 90 in the deciphering processor 89. The key data generating portion 91 is operative to supply the deciphering portion 90 with predetermined key data DEY. The key data DEY obtained from the key data generating portion 91 are of the same contents as those of the key data DEY obtained from the key data generating portion in the embodiment of apparatus for transmitting data shown in FIG. 6.

In the deciphering portion 90, the enciphered video data DXI in the form of 20-bit word sequence data are subjected to, for example, the DES deciphering process in accordance with the rules determined by the key data DEY to produce the multiple video data DVI in the form of 20-bit word sequence data.

Figure 24:
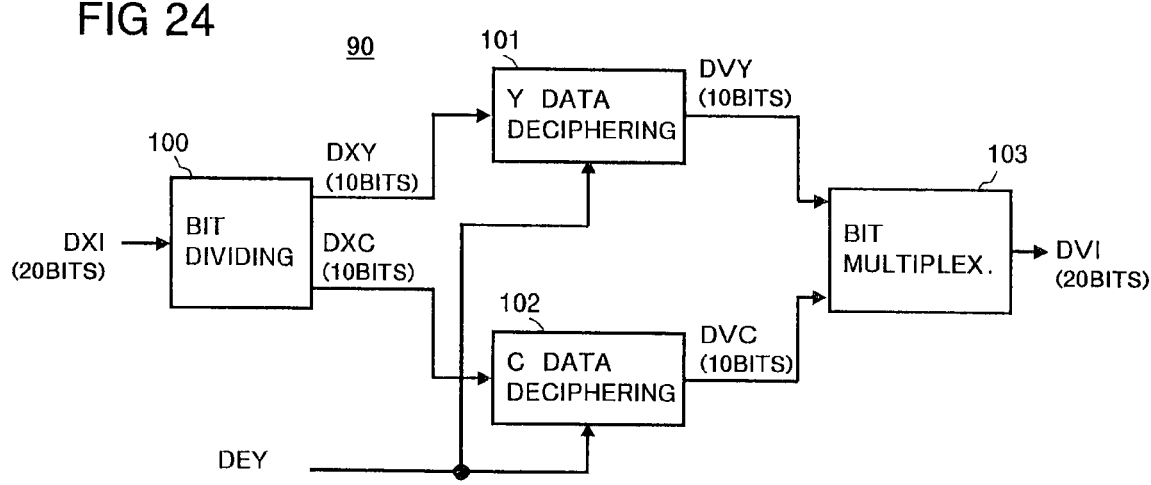
FIG. 24 is a schematic block diagram showing an embodied structure of a deciphering portion in the embodiment of apparatus for transmitting data shown in FIG. 23.

FIG. 24 shows an embodied structure of the deciphering portion 90.

In the embodied structure shown in FIG. 24, the enciphered video data DXI in the form of 20-bit word sequence data are supplied to a bit dividing portion 100. In the bit dividing portion 100, the enciphered video data DXI are divided into the enciphered Y signal video data DXY in the form of 10-bit word sequence data and the enciphered C signal video data DXC in the form of 10-bit word sequence data, which are separately sent from the bit dividing portion 100.

The enciphered Y signal video data DXY and the enciphered C signal video data DXC obtained from the bit dividing portion 100 are supplied to a Y data deciphering portion 101 and a C data deciphering portion 102, respectively. The key data DEY obtained from the key data generating portion 91 are also supplied to both of the Y data deciphering portion 101 and the C data deciphering portion 102.

In the Y data deciphering portion 101, the enciphered Y signal video data DXY in the form of 10-bit word sequence data are subjected to the DES deciphering process in accordance with the rules determined by the key data DEY to produce the Y signal video data DVY in the form of 10-bit word sequence data. In the C data deciphering portion 102, the enciphered C signal video data DXC in the form of 10-bit word sequence data are subjected to the DES deciphering process in accordance with the rules determined by the key data DEY to produce the C signal video data DVC in the form of 10-bit word sequence data.

The Y signal video data DVY in the form of 10-bit word sequence data and the C signal video data DVC in the form of 10-bit word sequence data thus obtained from the Y data deciphering portion 101 and the C data deciphering portion 102, respectively, are supplied to a bit multiplexer 103.

In the bit multiplexer 103, the Y signal video data DVY in the form of 10-bit word sequence data and the C signal video data DVC in the form of 10-bit word sequence data are multiplexed with each other to produce the multiple video data DVI in the form of 20-bit word sequence data to be sent from the deciphering portion 90 as output data.

The multiple video data DVI as the output data from the deciphering portion 90 are sent from the deciphering processor 89 to the serial data producing portion 92. In the serial data producing portion 92, the multiple time reference data DAV and the multiple ancillary data DAA each having passed through the deciphering portion 90 and the multiple video data DVI are supplied to a data multiplexer 104.

In the data multiplexer 104, the multiple video data DVI, the multiple time reference data DAV and the multiple ancillary data DAA are subjected to multiplexing process to reproduce the 20-bit word sequence data DHP including the multiple video data DVI, the multiple time reference data DAV and the multiple ancillary data DAA. The 20-bit word sequence data DHP thus obtained in the data multiplexer 104 are supplied to a P/S converter 105.

In the P/S converter 105, the 20-bit word sequence data DHP are subjected to P/S conversion to reproduce the serial data DHSD based on the 20-bit word sequence data DHP to be supplied to a scrambling portion 106.

In the scrambling portion 106, the serial data DHSD are subjected to scrambling process to reproduce the scrambled serial data DHSC to be supplied to a NRZI converter 108. In the NRZI converter 108, the scrambled serial data DHSC are subjected to NRZI conversion to reproduce the HD-SDI signal DHS. The HD-SDI signal DHS thus reproduced in the NRZI converter 108 is obtained from the serial data producing portion 92.

Figure 25:
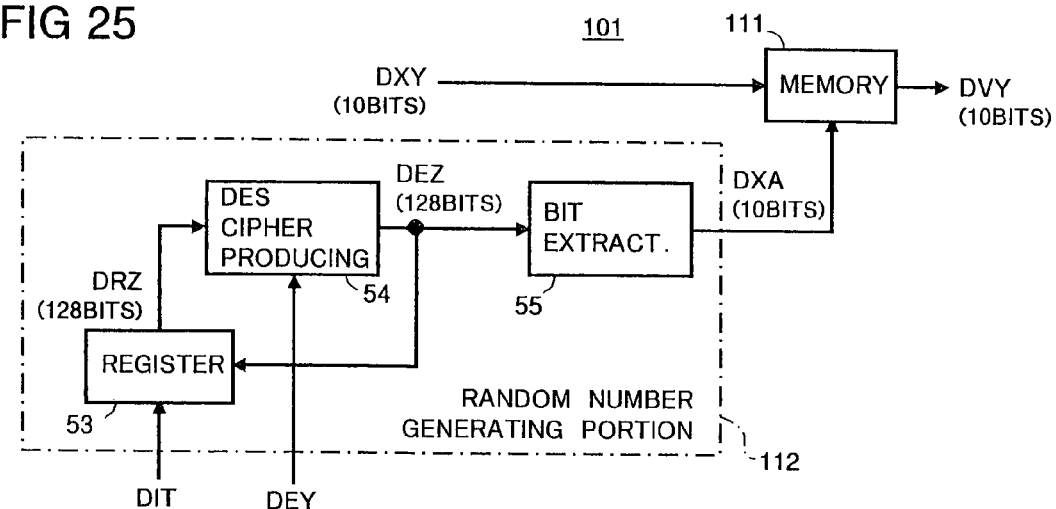
FIG. 25 is a schematic block diagram showing a first embodied structure of a Y data deciphering portion in the embodied structure shown in FIG. 24.
Figure 26:
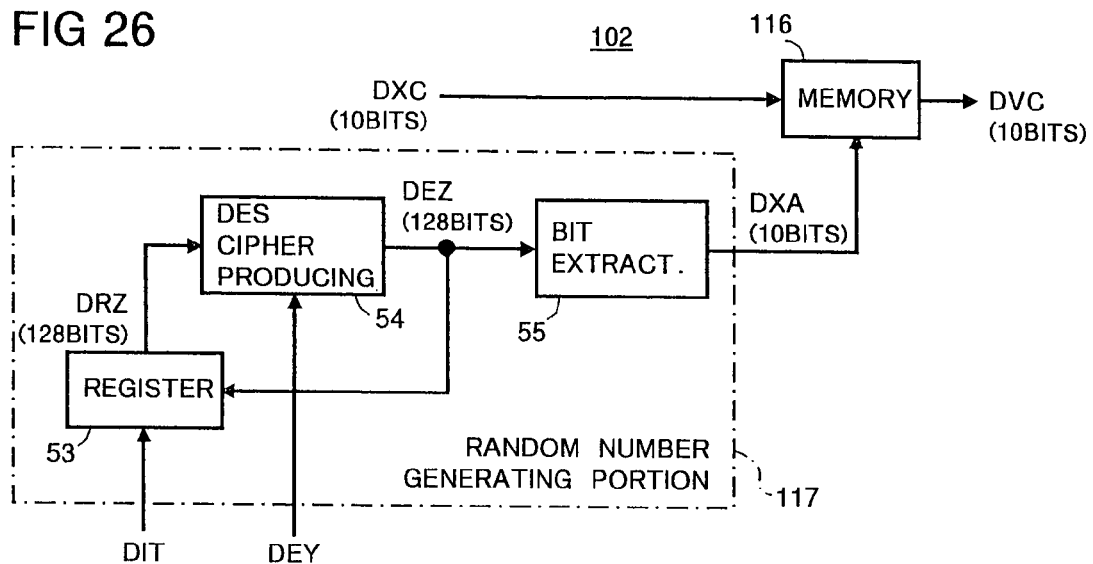
FIG. 26 is a schematic block diagram showing a first embodied structure of a C data deciphering portion in the embodied structure shown in FIG. 24.

FIGS. 25 and 26 show a first embodied structures of the Y data deciphering portion 101 shown in FIG. 24 and a first embodied structures of the C data deciphering portion 102 shown in FIG. 24, respectively.

In the case where the deciphering portion 90 shown in FIG. 24 is constituted with the Y data deciphering portion 101 having the first embodied structure shown in FIG. 25 and the C data deciphering portion 102 having the first embodied structure shown in FIG. 26, the structure of the deciphering portion 90 thus constituted corresponds to a first embodiment of apparatus for transmitting data according to the invention.

The first embodied structure shown in FIG. 25 of the Y data deciphering portion 101 is constituted with a memory 111 to which the enciphered Y signal video data DXY in the form of 10-bit word sequence data are supplied as first reading address data and a random number generating portion 112 to which the key data DEY are supplied.

The random number generating portion 112 is constituted with a register 53, a DES cipher producing portion 54 and a bit extracting portion 55 in the same manner as the random number generating portion 52 shown in FIG. 8 and produces pseudo-random number data DXA to be supplied to the memory 111 as second reading address data.

1016 (1024−8) 10-bit words having respectively different 10-bit codes with the exception of the forbidden codes 000h to 003h and 3FCh to 3FFh are stored in the memory 111. The 10-bit code of each of 1016 10 bit words is in a specific corresponding relation to the 10-bit code of each of the 10-bit words constituting the enciphered Y signal video data DXY which are supplied to the memory 111 as the first reading address data, and under such specific corresponding relation, 1016 10-bit words are read from the memory 111 in response to the enciphered Y signal video data DXY and the specific corresponding relation between the 10-bit code of each of 1016 10-bit words and the 10-bit code of each of the 10-bit words constituting the enciphered Y signal video data DXY varies in response to the pseudo-random number data DXA supplied to the memory 111 as the second reading address data.

The 10-bit words thus read from the memory 111 are successively arranged to produce the Y signal video data DVY in the form of 10-bit word sequence data.

The first embodied structure shown in FIG. 26 of the C data deciphering portion 102 is constituted with a memory 116 to which the enciphered C signal video data DXC in the form of 10-bit word sequence data are supplied as first reading address data and a random number generating portion 117 to which the key data DEY are supplied.

The random number generating portion 117 is constituted with a register 53, a DES cipher producing portion 54 and a bit extracting portion 55 in the same manner as the random number generating portion 112 shown in FIG. 25 and produces pseudo-random number data DXA to be supplied to the memory 116 as second reading address data.

1016 (1024−8) 10-bit words having respectively different 10-bit codes with the exception of the forbidden codes 000h to 003h and 3FCh to 3FFh are stored also in the memory 116. The 10-bit code of each of 1016 10-bit words is in a specific corresponding relation to the 10-bit code of each of the 10-bit words constituting the enciphered C signal video data DXC which are supplied to the memory 116 as the first reading address data, and under such specific corresponding relation, 1016 10-bit words are read from the memory 116 in response to the enciphered C signal video data DXC and the specific corresponding relation between the 10-bit code of each of 1016 10-bit words and the 10-bit code of each of the 10 bit words constituting the enciphered C signal video data DXC varies in response to the pseudo-random number data DXA supplied to the memory 116 as the second reading address data.

The 10-bit words thus read from the memory 116 are successively arranged to produce the C signal video data DVC in the form of 10-bit word sequence data.

Although each of the random number generating portions 112 and 117 connected to the memories 111 and 116, respectively, is operative to produce the pseudo-random number data DXA to be supplied to the memory 111 or 116 in the embodied structures shown in FIGS. 25 and 26, it is also possible to have such variations as to cause each of the random number generating portions 112 and 117 to produce, instead of the pseudo-random number data DXA, predetermined genuine random number data to be supplied to the memory 111 or 116.

Figure 27:
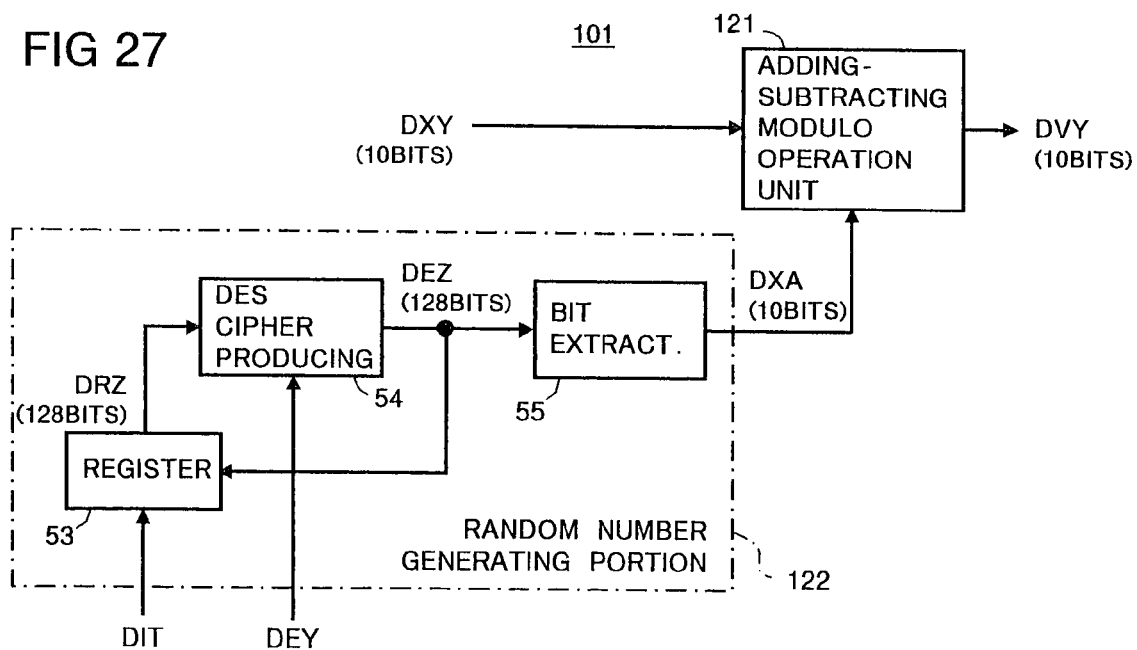
FIG. 27 is a schematic block diagram showing a second embodied structure of the Y data deciphering portion in the embodied structure shown in FIG. 24.
Figure 28:
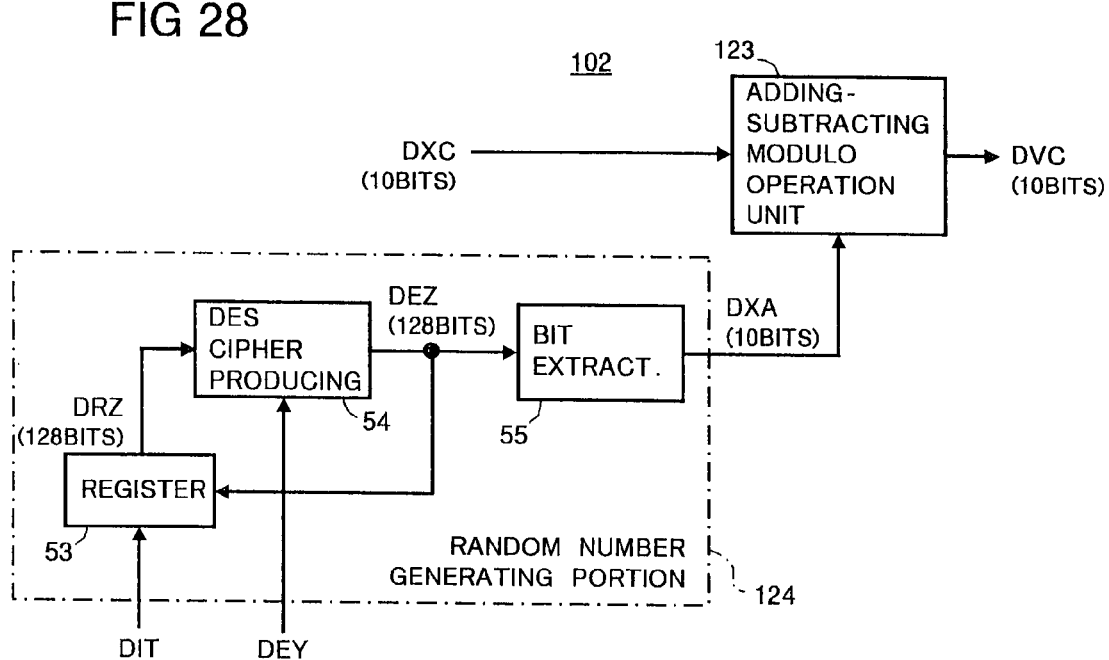
FIG. 28 is a schematic block diagram showing a second embodied structure of the C data deciphering portion in the embodied structure shown in FIG. 24.

FIGS. 27 and 28 show a second embodied structures of the Y data deciphering portion 101 shown in FIG. 24 and a second embodied structures of the C data deciphering portion 102 shown in FIG. 24, respectively.

In the case where the deciphering portion 90 shown in FIG. 23 is constituted with the Y data deciphering portion 101 having the second embodied structure shown in FIG. 27 and the C data deciphering portion 102 having the second embodied structure shown in FIG. 28, the structure of the deciphering portion 90 thus constituted corresponds to an embodiment of apparatus for transmitting data according to the invention.

The second embodied structure shown in FIG. 27 of the Y data deciphering portion 101 is constituted with an adding-subtracting modulo operation unit 121 to which the enciphered Y signal video data DXY in the form of 10-bit word sequence data are supplied and a random number generating portion 122 to which the key data DEY are supplied.

The random number generating portion 122 is constituted with a register 53, a DES cipher producing portion 54 and a bit extracting portion 55 in the same manner as the random number generating portion 112 shown in FIG. 25 and produces pseudo-random number data DXA to be supplied to the adding-subtracting modulo operation unit 121.

The adding-subtracting modulo operation unit 121 is operative to convert the enciphered Y signal video data DXY into the Y signal video data DVY. In the adding-subtracting modulo operation unit 121, the enciphered Y signal video data DXY is subjected to adding-subtracting modulo operation in response to the pseudo-random number data DXA and converted codes which are determined in accordance with the result of the adding-subtracting modulo operation are used for information code of the Y signal video data DVY so that the enciphered Y signal video data DXY are converted into the Y signal video data DVY.

Taking up 10-bit codes because the enciphered Y signal video data DXY is constituted in the form of 10-bit word sequence data, there are 1024 different 10-bit codes from 000h to 3FFh. If these 1024 different 10-bit codes from 000h to 3FFh are marked successively with code position numbers 1 to 1024, the code position number for 10-bit code of each of the 10-bit words constituting the Y signal video data DVY is determined by the adding-subtracting modulo operation.

Supposing that Ci represents the code position number for each of the information codes of the enciphered Y signal video data DXY, Mi represents the code position number for each of the information codes of the Y signal video data DVY, Ei represents the code position number for each of the 10-bit code of the pseudo-random number data DXA, N1 represents the number of the forbidden codes arranged out of one side of the range of the information codes of the Y signal video data DVY and N2 represents the number of the information codes of the Y signal video data DVY, the adding-subtracting modulo operation is represented with the following equation.

$$Mi = \{(Ci-N1)+Ei\} \bmod N2 + N1 \quad (2)$$

wherein $\{(Ci-N1)+Ei\}$ mod N2 represents a remainder obtained by dividing $\{(Ci-N1)+Ei\}$ by N2.

Since the Y signal video data DVY are constituted in the form of 10-bit word sequence data, N1 is equal to the number of the forbidden codes 000h to 003h, namely, 4, and N2 is equal to the number obtained by subtracting the number of the forbidden codes from the total number of the 10-bit codes, namely, 1024−8=1016.

In the equation (2) mentioned above, with the subtraction for subtracting N1 from Ci, the code position number of the information code of the enciphered Y signal video data DXY is reduced by 4 to be a converted code position number. Then, the modulo operation, by which the code position number of the 10-bit code of the pseudo-random number data DXA is subtracted from the converted code position number to produce a difference and a remainder is obtained by dividing the difference by 1016, is performed. Further, a code position number is determined by adding 4 to the obtained remainder and the code position number thus determined is used as the code position number Mi for the information code of the Y signal video data DVY.

Then, in the adding-subtracting modulo operation unit 121, the 10-bit code corresponding to the code position number Mi obtained by the adding-subtracting modulo operation is used as the information code of the Y signal video data DVY.

The second embodied structure shown in FIG. 28 of the C data deciphering portion 102 is constituted with an adding-subtracting modulo operation unit 123 to which the enciphered C signal video data DXC in the form of 10-bit word sequence data are supplied and a random number generating portion 124 to which the key data DEY are supplied.

The random number generating portion 124 is constituted with a register 53, a DES cipher producing portion 54 and a bit extracting portion 55 in the same manner as the random number generating portion 122 shown in FIG. 27 and produces pseudo-random number data DXA to be supplied to the adding-subtracting modulo operation unit 123.

The adding-subtracting modulo operation unit 123 is operative to convert the enciphered C signal video data DXC into the C signal video data DVC. In the adding-subtracting modulo operation unit 123, the enciphered C signal video data DXC is subjected to adding-subtracting modulo operation in response to the pseudo-random number data DXA and converted codes which are determined in accordance with the result of the adding-subtracting modulo operation are used for information code of the C signal video data DVC so that the enciphered C signal video data DXC are converted into the C signal video data DVC. This adding-subtracting modulo operation for the enciphered C signal video data DXC is performed in the similar manner as the adding-subtracting modulo operation for the enciphered Y signal video data DXY performed in the adding-subtracting modulo operation unit 121 shown in FIG. 27.

Although each of the random number generating portions 122 and 124 connected to the adding-subtracting modulo operation units 121 and 123, respectively, is operative to produce the pseudo-random number data DXA to be supplied to the adding-subtracting modulo operation units 121 and 123 in the embodied structures shown in FIGS. 27 and 28, it is also possible to have such variations as to cause each of the random number generating portions 122 and 124 to produce, instead of the pseudo-random number data DXA, predetermined genuine random number data to be supplied to the adding-subtracting modulo operation unit 121 or 123.

FIGS. 29 and 30 show a third embodied structures of the Y data deciphering portion 101 shown in FIG. 24 and a third embodied structures of the C data deciphering portion 102 shown in FIG. 24, respectively.

In the case where the deciphering portion 90 shown in FIG. 23 is constituted with the Y data deciphering portion 101 having the third embodied structure shown in FIG. 29 and the C data deciphering portion 102 having the third embodied structure shown in FIG. 30, the structure of the deciphering portion 90 thus constituted corresponds to an embodiment of apparatus for transmitting data according to the invention.

The third embodied structures shown in FIG. 29 of the Y data deciphering portion 101 is used for the Y signal video data DVY which are composed of 10-bit words each having information code extracted from a 10-bit code group in which the information codes are mixed with forbidden codes which are not set to be 000h to 003h and 3FCh to 3FFh.

Such a third embodied structure as shown in FIG. 29 is constituted by adding a memory 126 to an output end of the adding-subtracting modulo operation unit 121 in the second embodied structure shown in FIG. 27 of the Y data deciphering portion 101.

Each of the adding-subtracting modulo operation unit 121 and the random number generating portion 122 operates in the similar manner as each of the adding-subtracting modulo operation unit 121 and the random number generating portion 122 in the second embodied structures shown in FIG. 27 of the Y data deciphering portion 101 and the Y signal video data DVY' based on the enciphered Y signal video data DXY are obtained from the adding-subtracting modulo operation unit 121. This Y signal video data DVY' corresponds to the Y signal video data DVY obtained from the adding-subtracting modulo operation unit 121 in the second embodied structures shown in FIG. 27 of the Y data deciphering portion 101, for which the range of the forbidden codes is arranged out of the range of the information codes.

The Y signal video data DVY' obtained from the adding-subtracting modulo operation unit 121 are supplied to the memory 126. In the memory 126, the writing and reading of the Y signal video data DVY' are carried out and the Y signal video data DVY based on the Y signal video data DVY' are sent from the memory 126.

In the writing of the Y signal video data DVY' in the memory 126, each of the 10-bit words composing of the Y signal video data DVY' is written in the memory 126 with writing address determined in accordance with 10-bit code of the 10-bit word to be written and in the reading of the Y signal video data DVY' from the memory 126, each of the 10-bit word composing of the Y signal video data DVY' is read from the memory 126 with reading address which is put in a specific corresponding relation to the writing address. In the specific corresponding relation between the writing address and the reading address, for example, the writing addresses allotted to the forbidden codes are dispersed in the range of the writing addresses allotted to the information codes.

With such specific corresponding relation between the writing address and the reading address, the Y signal video data DVY send from the memory 126 by reading the Y signal video data DVY' written in the memory 126 are composed of the 10-bit words each having the information code extracted from the 10-bit code group in which the information codes are mixed with forbidden codes which are not set to be 000h to 003h and 3FCh to 3FFh.

As described above, in the third embodied structure shown in FIG. 29 of the Y data deciphering portion 101, the enciphered Y signal video data DXY is subjected to the adding-subtracting modulo operation in the adding-subtracting modulo operation unit 121 to be converted into the Y signal video data DVY' and then the Y signal video data DVY' are further subjected to the aforementioned data conversion in the memory 126 to reproduce the Y signal video data DVY.

The third embodied structures shown in FIG. 30 of the C data deciphering portion 102 is used for the C signal video data DVC which are composed of 10-bit words each having information code extracted from a 10-bit code group in which the information codes are mixed with forbidden codes which are not set to be 000h to 003h and 3FCh to 3FFh.

Such a third embodied structure as shown in FIG. 30 is constituted by adding a memory 127 to an output end of the adding-subtracting modulo operation unit 123 in the second embodied structure shown in FIG. 28 of the C data deciphering portion 102.

Each of the adding-subtracting modulo operation unit 123 and the random number generating portion 124 operates in the similar manner as each of the adding-subtracting modulo operation unit 123 and the random number generating portion 124 in the second embodied structures shown in FIG. 28 of the C data deciphering portion 102 and the C signal video data DVC' based on the enciphered C signal video data DXC are obtained from the adding-subtracting modulo operation unit 123. This C signal video data DVC' corresponds to the C signal video data DVC obtained from the adding-subtracting modulo operation unit 123 in the second embodied structures shown in FIG. 28 of the C data deciphering portion 102, for which the range of the forbidden codes is arranged out of the range of the information codes.

The C signal video data DVC' obtained from the adding-subtracting modulo operation unit 123 are supplied to the memory 127. In the memory 127, the writing and reading of the C signal video data DVC' are carried out and the C signal video data DVC based on the C signal video data DVC' are sent from the memory 127.

In the writing of the C signal video data DVC' in the memory 127, each of the 10-bit words composing of the C signal video data DVC' is written in the memory 127 with writing address determined in accordance with 10-bit code of the 10-bit word to be written and in the reading of the C signal video data DVC' from the memory 127, each of the 10-bit word composing of the C signal video data DVC' is read from the memory 127 with reading address which is put in a specific corresponding relation to the writing address. In the specific corresponding relation between the writing address and the reading address, for example, the writing addresses allotted to the forbidden codes are dispersed in the range of the writing addresses allotted to the information codes.

With such specific corresponding relation between the writing address and the reading address, the C signal video data DVC send from the memory 127 by reading the C signal video data DVC' written in the memory 127 are composed of the 10-bit words each having the information code extracted from the 10-bit code group in which the information codes are mixed with forbidden codes which are not set to be 000h to 003h and 3FCh to 3FFh.

As described above, in the third embodied structure shown in FIG. 30 of the C data deciphering portion 102, the enciphered C signal video data DXC is subjected to the adding-subtracting modulo operation in the adding-subtracting modulo operation unit 123 to be converted into the C signal video data DVC' and then the C signal video data DVC' are further subjected to the aforementioned data conversion in the memory 127 to reproduce the C signal video data DVC.

Although each of the random number generating portions 122 and 124 connected to the adding-subtracting modulo operation units 121 and 123, respectively, is operative to produce the pseudo-random number data DXA to be supplied to the adding-subtracting modulo operation units 121 and 123 in the embodied structures shown in FIGS. 29 and 30, it is also possible to have such variations as to cause each of the random number generating portions 122 and 124 to produce, instead of the pseudo-random number data DXA, predetermined genuine random number data to be supplied to the adding-subtracting modulo operation unit 121 or 123.

Figure 31:
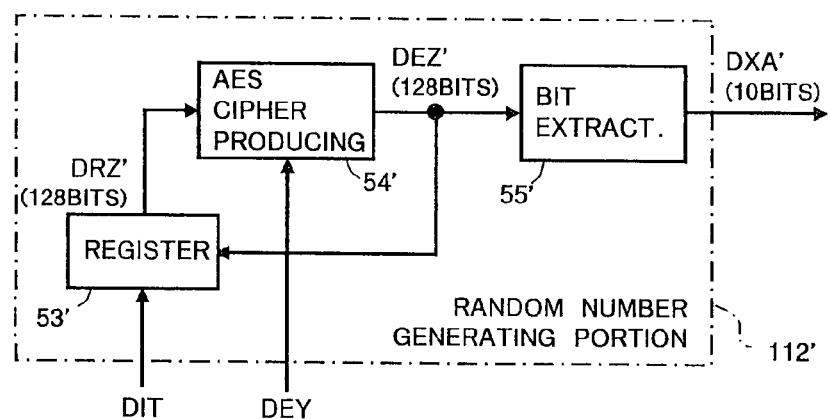
FIG. 31 is a schematic block diagram showing an example of a random number generating portion which can be used in place of a random number generating portion shown in each of FIGS. 25 to 30.

FIG. 31 shows an example of a random number generating portion which can be used in place of the random number generating portion 112 in the first embodied structure shown in FIG. 25 of the Y data deciphering portion 101, the random number generating portion 117 in the first embodied structure shown in FIG. 26 of the C data deciphering portion 102, the random number generating portion 122 in each of the second and third embodied structures shown in FIGS. 27 and 29 of the Y data deciphering portion 101 or the random number generating portion 124 in each of the second and third embodied structures shown in FIGS. 28 and 30 of the C data deciphering portion 102.

The random number generating portion 112' shown in FIG. 31 is constituted in the same manner as the random number generating portion 52' shown in FIG. 17 and further description thereof will be omitted. Pseudo-random number data DXA' obtained from the random number generating portion 112' are used in place of the pseudo-random number data DXA obtained from each of the random number generating portion 112 in the first embodied structure shown in FIG. 25 of the Y data deciphering portion 101, the random number generating portion 117 in the first embodied structure shown in FIG. 26 of the C data deciphering portion 102, the random number generating portion 122 in each of the second and third embodied structures shown in FIGS. 27 and 29 of the Y data deciphering portion 101 and the random number generating portion 124 in each of the second and third embodied structures shown in FIGS. 28 and 30 of the C data deciphering portion 102.

Figure 32:
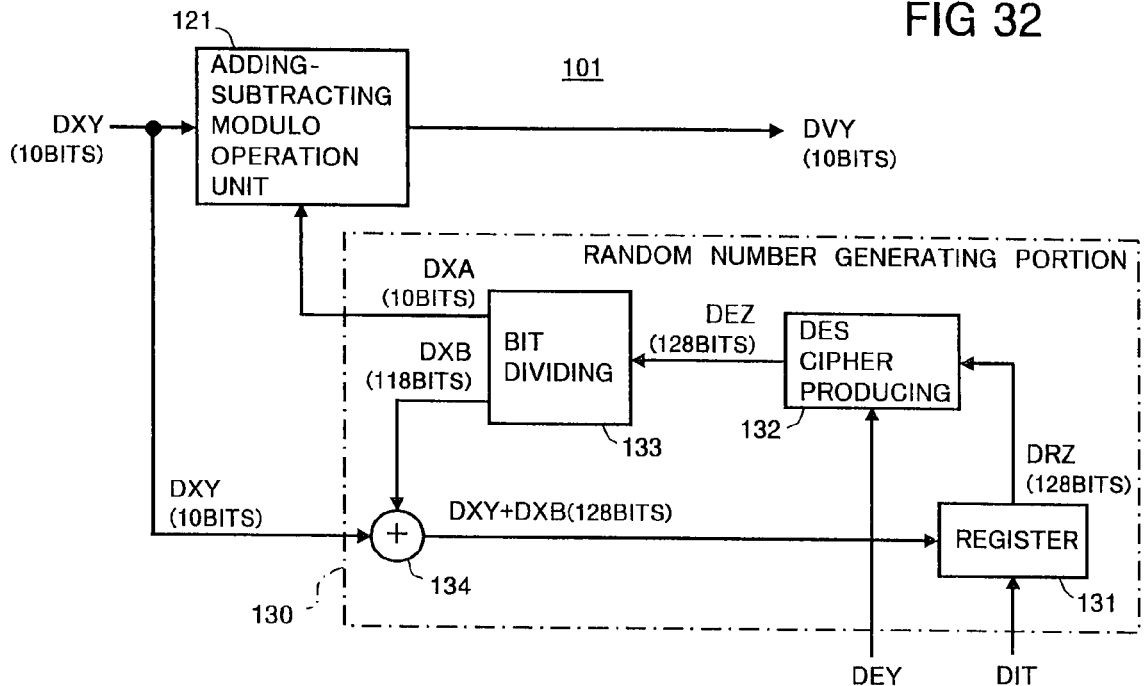
FIG. 32 is a schematic block diagram showing a fourth embodied structure of the Y data deciphering portion in the embodied structure shown in FIG. 24.
Figure 33:
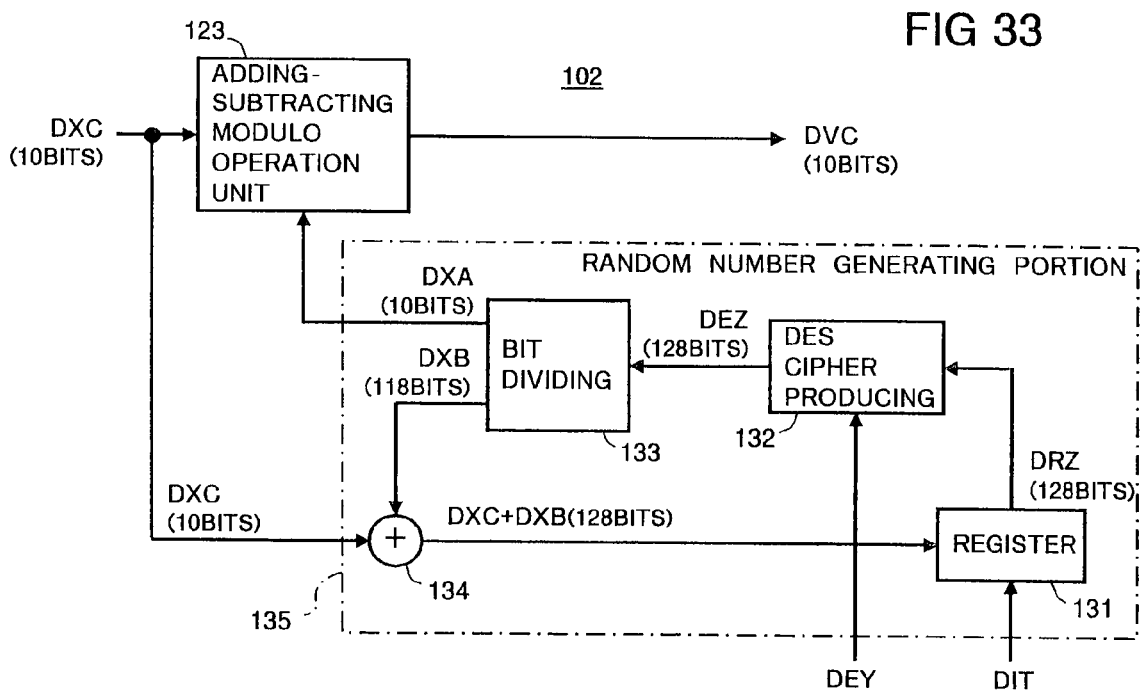
FIG. 33 is a schematic block diagram showing a fourth embodied structure of the C data deciphering portion in the embodied structure shown in FIG. 24.

FIGS. 32 and 33 show a fourth embodied structures of the Y data deciphering portion 101 shown in FIG. 24 and a fourth embodied structures of the C data deciphering portion 102 shown in FIG. 24, respectively.

In the case where the deciphering portion 90 shown in FIG. 23 is constituted with the Y data deciphering portion 101 having the fourth embodied structure shown in FIG. 32 and the C data deciphering portion 102 having the fourth embodied structure shown in FIG. 33, the structure of the deciphering portion 90 thus constituted corresponds to a second embodiment of apparatus for transmitting data according to the invention.

The fourth embodied structure shown in FIG. 32 of the Y data deciphering portion 101 is constituted with an adding-subtracting modulo operation unit 121 to which the enciphered Y signal video data DXY in the form of 10-bit word sequence data are supplied and a random number generating portion 130 to which key data DEY are supplied.

The adding-subtracting modulo operation unit 121 is constituted in the same manner as the adding-subtracting modulo operation unit 121 shown in FIG. 27 and operative to convert the enciphered Y signal video data DXY into the Y signal video data DVY constituted in the form of 10 bit word sequence data in such a manner as aforementioned.

In the random number generating portion 130, a register 131 is operative to put out, in response to input data, register output data DRZ composed of, for example, 128 bits to be supplied to a DES cipher producing portion 132. Initial input data DIT are supplied to the register 131.

The key data DEY also supplied to the DES cipher producing portion 132. In the DES cipher producing portion 132, the register output data DRZ are subjected to the DES enciphering process in accordance with the rules determined by the key data DEY to produce cipher data DEZ composed of, for example, 128 bits. The cipher data DEZ obtained from the DES cipher producing portion 132 are supplied to a bit dividing portion 133.

The bit dividing portion 133 is operative to divide 128 bits composing the cipher data DEZ into 10 bits and 118 bits to produce pseudo-random number data DXA composed of 10 bits and feedback data DXB composed of 118 bits. The pseudo-random number data DXA obtained from the bit dividing portion 73 are sent from the random number generating portion 130 to the adding-subtracting modulo operation unit 121. The feedback data DXB obtained from the bit dividing portion 133 are supplied to a bit adder 134.

The enciphered Y signal video data DXY in the form of 10-bit word sequence data which are supplied to the adding-subtracting modulo operation unit 121 are also supplied to the bit adder 134. In the bit adder 134, the enciphered Y signal video data DXY in the form of 10-bit word sequence data are added in bit to the feedback data DXB composed of 118 bits to produce data DXB+DXY composed of 128 bits. The data DXB+DXY composed of 128 bits thus obtained are fed to the register 131 as another input data. Therefore, the register 131 is operative first to put out the register output data DRZ in response to the initial input data DIT and then to put out the register output data DRZ in response to the data DXB+DXY obtained from the bit adder 134.

The fourth embodied structure shown in FIG. 33 of the C data deciphering portion 102 is constituted with an adding-subtracting modulo operation unit 123 to which the enciphered C signal video data DXC in the form of 10-bit word sequence data are supplied and a random number generating portion 135 to which key data DEY are supplied.

The adding-subtracting modulo operation unit 123 is constituted in the same manner as the adding-subtracting modulo operation unit 123 shown in FIG. 28 and operative to convert the enciphered C signal video data DXC into the C signal video data DVC constituted in the form of 10 bit word sequence data in such a manner as aforementioned.

The random number generating portion 135 is constituted with a register 131, a DES cipher producing portion 132, a bit dividing portion 133 and a bit adder 134 in the same manner as the random number generating portion 130 shown in FIG. 32. In the bit adder 134 provided in the random number generating portion 135, the enciphered C signal video data DXC in the form of 10-bit word sequence data which are supplied also to the adding-subtracting modulo operation unit 123 are added in bit to feedback data DXB composed of 118 bits obtained from the bit dividing portion 133 to produce data DXB+DXC composed of 128 bits. The other operations of the random number generating portion 135 are the same as those in the random number generating portion 130 shown in FIG. 32.

Although each of the random number generating portions 130 and 135 connected to the adding-subtracting modulo operation units 121 and 123, respectively, is operative to produce the pseudo-random number data. DXA to be supplied to the adding-subtracting modulo operation units 121 and 123 in the embodied structures shown in FIGS. 32 and 33, it is also possible to have such variations as to cause each of the random number generating portions 130 and 135 to produce, instead of the pseudo-random number data DXA, predetermined genuine random number data to be supplied to the adding-subtracting modulo operation unit 121 or 123.

Figure 34:
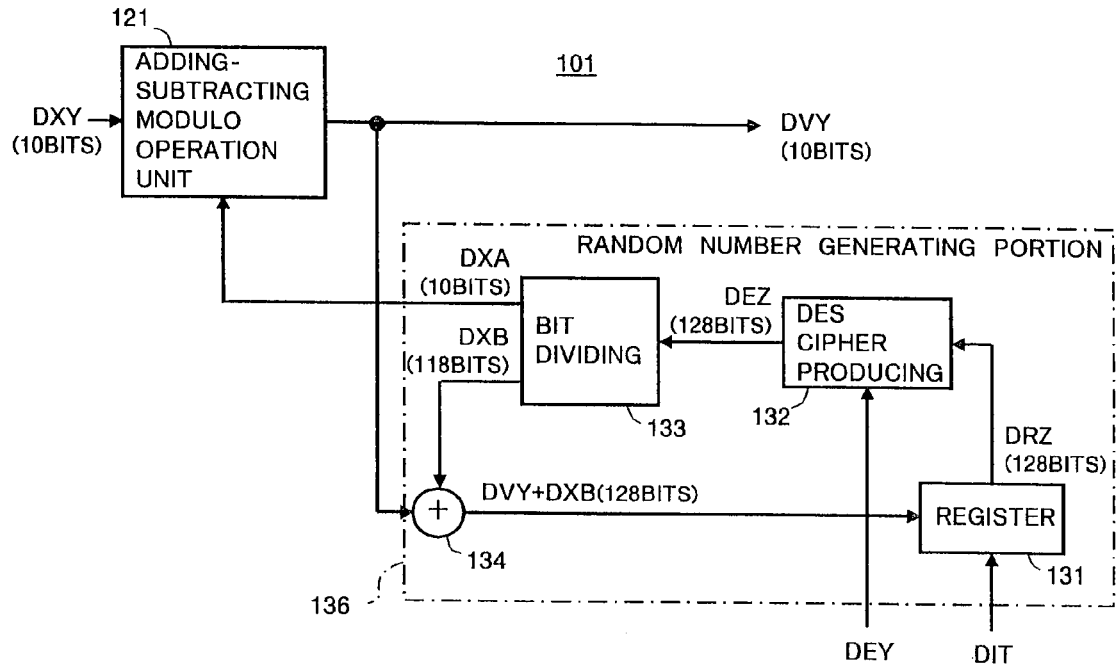
FIG. 34 is a schematic block diagram showing a fifth embodied structure of the Y data deciphering portion in the embodied structure shown in FIG. 24.
Figure 35:
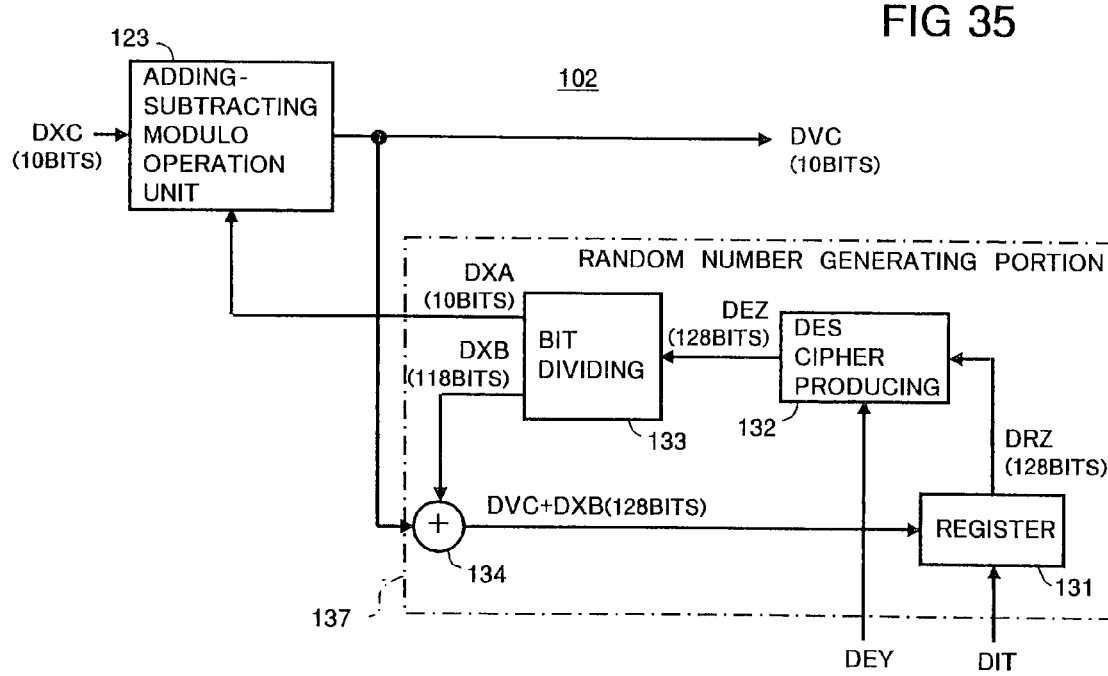
FIG. 35 is a schematic block diagram showing a fifth embodied structure of the C data deciphering portion in the embodied structure shown in FIG. 24.

FIGS. 34 and 35 show a fifth embodied structures of the Y data deciphering portion 101 shown in FIG. 24 and a fifth embodied structures of the C data deciphering portion 102 shown in FIG. 24, respectively.

In the case where the deciphering portion 90 shown in FIG. 23 is constituted with the Y data deciphering portion 101 having the fifth embodied structure shown in FIG. 34 and the C data deciphering portion 102 having the fifth embodied structure shown in FIG. 35, the structure of the deciphering portion 90 thus constituted corresponds to a third embodiment of apparatus for transmitting data according to the invention.

The fifth embodied structure shown in FIG. 34 of the Y data deciphering portion 101 is constituted with an adding-subtracting modulo operation unit 121 to which the enciphered Y signal video data DXY in the form of 10-bit word sequence data are supplied and a random number generating portion 136 to which key data DEY are supplied.

The adding-subtracting modulo operation unit 121 is constituted in the same manner as the adding-subtracting modulo operation unit 121 shown in FIG. 32 and operative to convert the enciphered Y signal video data DXY into the Y signal video data DVY constituted in the form of 10 bit word sequence data in such a manner as aforementioned.

The random number generating portion 136 is constituted with a register 131, a DES cipher producing portion 132, a bit dividing portion 133 and a bit adder 134 in the same manner as the random number generating portion 130 shown in FIG. 32. In the bit adder 134 provided in the random number generating portion 136, the Y signal video data DVY in the form of 10-bit word sequence data obtained from to the adding-subtracting modulo operation unit 121 are added in bit to feedback data DXB composed of 118 bits obtained from the bit dividing portion 133 to produce data DXB+DVY composed of 128 bits. The other operations of the random number generating portion 136 are the same as those in the random number generating portion 130 shown in FIG. 32.

The fifth embodied structure shown in FIG. 35 of the C data deciphering portion 102 is constituted with an adding-subtracting modulo operation unit 123 to which the enciphered C signal video data DXC in the form of 10-bit word sequence data are supplied and a random number generating portion 137 to which key data DEY are supplied.

The adding-subtracting modulo operation unit 123 is constituted in the same manner as the adding-subtracting modulo operation unit 123 shown in FIG. 33 and operative to convert the enciphered C signal video data DXC into the C signal video data DVC constituted in the form of 10-bit word sequence data in such a manner as aforementioned.

The random number generating portion 137 is constituted with a register 131, a DES cipher producing portion 132, a bit dividing portion 133 and a bit adder 134 in the same manner as the random number generating portion 135 shown in FIG. 33. In the bit adder 134 provided in the random number generating portion 137, the C signal video data DVC in the form of 10-bit word sequence data obtained from the adding-subtracting modulo operation unit 123 are added in bit to feedback data DXB composed of 118 bits obtained from the bit dividing portion 133 to produce data DXB+DVC composed of 128 bits. The other operations of the random number generating portion 137 are the same as those in the random number generating portion 135 shown in FIG. 33.

Although each of the random number generating portions 136 and 137 connected to the adding-subtracting modulo operation units 121 and 123, respectively, is operative to produce pseudo-random number data DXA to be supplied to the adding-subtracting modulo operation units 121 and 123 in the embodied structures shown in FIGS. 34 and 35, it is also possible to have such variations as to cause each of the random number generating portions 136 and 137 to produce, instead of the pseudo-random number data DXA, predetermined genuine random number data to be supplied to the adding-subtracting modulo operation unit 121 or 123.

Figure 36:
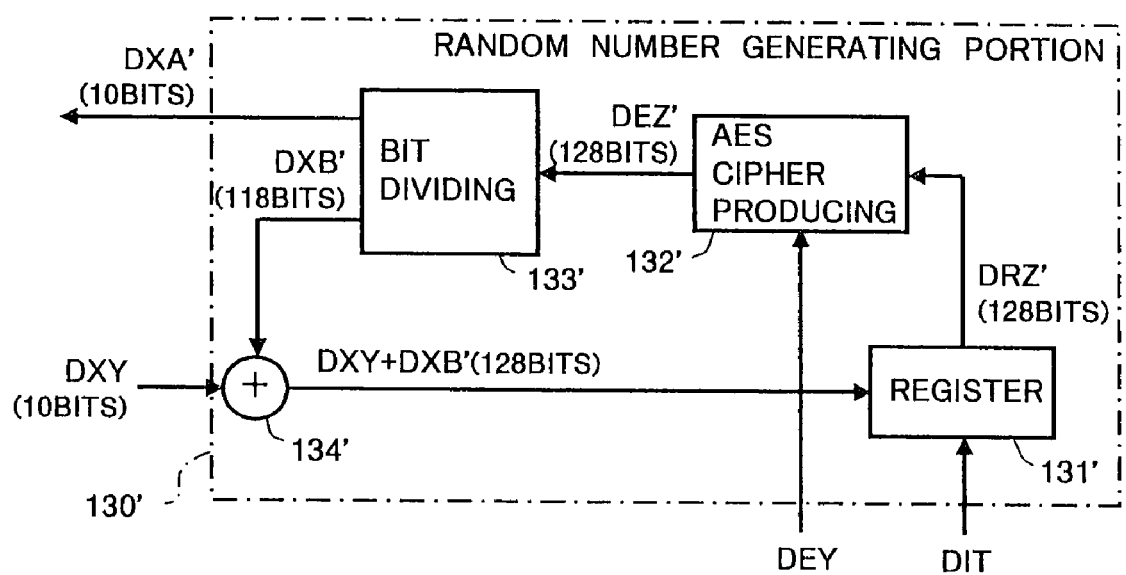
FIG. 36 is a schematic block diagram showing an example of a random number generating portion which can be used in place of a random number generating portion shown in each of FIGS. 32 to 35.

FIG. 36 shows an example of a random number generating portion which can be used in place of the random number generating portion 130 in the fourth embodied structure shown in FIG. 32 of the Y data deciphering portion 101, the random number generating portion 135 in the fourth embodied structure shown in FIG. 33 of the C data deciphering portion 102, the random number generating portion 136 in the fifth embodied structures shown in FIG. 34 of the Y data deciphering portion 101 or the random number generating portion 137 in the fifth embodied structures shown in FIG. 35 of the C data deciphering portion 102.

In the random number generating portion 130' shown in FIG. 36, a register 131' produces, in response to initial input data DIT, register output data DRZ' composed of, for example, 128 bits to be supplied to an AES cipher producing portion 132'.

The AES cipher producing portion 132' is constituted in the same manner as the AES cipher producing portion 54' in the random number generating portion 52' shown in FIG. 17.

Key data DEY are also supplied to the AES cipher producing portion 132' In the AES cipher producing portion 132', the register output data DRZ' are subjected to the AES enciphering process in accordance with the rules determined by the key data DEY to produce cipher data DEZ' composed of, for example, 128 bits. The cipher data DEZ' obtained from the AES cipher producing portion 132' are supplied to a bit dividing portion 133'.

The bit dividing portion 133' is operative to divide 128 bits composing the cipher data DEZ' into 10 bits and 118 bits to produce pseudo-random number data DXA' composed of 10 bits and feedback data DXB' composed of 118 bits. The pseudo-random number data DXA' obtained from the bit dividing portion 133' are sent from the random number generating portion 130' to be used in place of the pseudo-random number data DXA obtained from the random number generating portion 130 shown in FIG. 32, the random number generating portion 135 shown in FIG. 33, the random number generating portion 136 shown in FIG. 34 or the random number generating portion 137 shown in FIG. 35.

The feedback data DXB' obtained from the bit dividing portion 133' are supplied to a bit adder 134'. The enciphered Y signal video data DXY in the form of 10-bit word sequence data are also supplied to the bit adder 134'. In the bit adder 74', the enciphered Y signal video data DXY in the form of 10-bit word sequence data are added in bit to the feedback data DXB' composed of 118 bits to produce data DXB'+DXY composed of 128 bits. The data DXB'+DXY composed of 128 bits thus obtained are fed to the register 131' as another input data. Therefore, the register 131' is operative first to put out the register output data DRZ' in response to the initial input data DIT and then to put out the register output data DRZ' in response to the data DXB'+DXY obtained from the bit adder 134'.

Although the serial data are transmitted from the apparatus for transmitting data shown in FIG. 6, in which the enciphering process is carried out, to the apparatus for transmitting data shown in FIG. 23, in which the deciphering process is carried out, in the embodiments mentioned above, the method of or the apparatus for transmitting data according to the invention.

APPLICABILITY FOR INDUSTRIAL USE

As apparent from the above description, with the method of transmitting data according to the invention, digital information data contained in word sequence data which contain also time reference code data constituted with timing identification codes in addition to the digital information data are subjected to enciphering process in such a manner as not to produce forbidden code for producing enciphered digital information data which do not contain any forbidden code, and the enciphered digital information data and the time reference code data are multiplexed with each other to produce enciphered word sequence data to be transmitted. Thereby, when the enciphered word sequence data to be transmitted are converted into enciphered serial data, the enciphered serial data which do not have an undesirable portion thereof corresponding to serial data converted from the forbidden codes are obtained.

Accordingly, when the method of transmitting data according to the invention is applied to enciphered data transmission in which digital information data which correspond to serial data obtained based on word sequence data which contain the digital information data in which forbidden codes including timing identification codes are contained and time reference code data constituted with timing identification codes, for example, such data as constituting the HD-SDI signal, are subjected to enciphering process to produce enciphered serial data and the enciphered serial data are transmitted, the enciphered data transmission is carried out under the condition wherein the enciphered serial data can be prevented from containing an undesirable portion thereof corresponding to serial data converted from the forbidden codes.

Further, with the method of transmitting data according to the invention, digital information data contained in word sequence data which contain also time reference code data constituted with timing identification codes in addition to the digital information data are subjected to enciphering process in such a manner as not to produce forbidden code for producing enciphered digital information data which do not contain any forbidden code, the enciphered digital information data and the time reference code data are multiplexed with each other to produce enciphered word sequence data to be transmitted, and the enciphered digital information data obtained from the enciphered word sequence data are subjected to deciphering process for reproducing the digital information data to be multiplexed with the time reference code data to reproduce the word sequence data. Thereby, when the enciphered word sequence data to be transmitted are converted into enciphered serial data, the enciphered serial data which do not have an undesirable portion thereof corresponding to serial data converted from the forbidden codes are obtained and the original serial data are properly reproduced from the transmitted enciphered serial data by subjecting the transmitted enciphered serial data to the deciphering process.

Accordingly, when the method of transmitting data according to the invention or the apparatus for transmitting data according to the invention is applied to enciphered data transmission in which digital information data which correspond to serial data obtained based on word sequence data which contain the digital information data in which forbidden codes including timing identification codes are contained and time reference code data constituted with timing identification codes, for example, such data as constituting the HD-SDI signal, are subjected to enciphering process to produce enciphered serial data to be transmitted, and the original serial data are reproduced from the transmitted enciphered serial data, the enciphered data transmission is carried out under the condition wherein the enciphered serial data can be prevented from containing an undesirable portion thereof corresponding to serial data converted from the forbidden codes and the original serial data can be surely reproduced.

The invention claimed is:

1. A method of transmitting video data, utilizing a processor, comprising the steps of:

subjecting digital information data to enciphering process in such a manner as not to produce forbidden code for producing enciphered digital information data which do not contain any forbidden code, wherein said digital information data comprises a group of data including timing identification data in the form of forbidden codes which are not used as information codes for representing information, wherein said digital information data is contained in word sequence data which contain also time reference code data constituted with the timing identification codes in addition to the digital information data;

producing enciphered word sequence data which include the enciphered digital information data and the time reference code data; and transmitting the enciphered word sequence data wherein the digital information data and one of pseudo-random number data and genuine random number data are subjected to operational process without producing forbidden code to produce the enciphered digital information data wherein the operational process to which the digital information data and one of the pseudo-random number data and the genuine random number data are subjected without producing the forbidden code, includes adding, subtracting and modulo operations relating to the digital information data and one of the pseudo-random number data and the genuine random number data each performed with data representing the number of the forbidden codes arranged out of one side of the range of the information codes of the digital information data and data representing the number of the information codes of the digital information data, wherein, the adding, subtracting and modulo operations relating to the digital information data, is represented with an equation $Ci=\{(Mi-N1)+Ei\}$ mod $N2+N1$, wherein Mi represents a code position number for each of the information codes of the digital information data, Ci represents a code position number for each of the information codes of the enciphered digital information data, Ei represents code position number for each of 10-bit code of the pseudo-random number data, N1 represents the number of the forbidden codes arranged out of one side of the range of the information codes of the digital information data, N2 represents the number of the information codes of the digital information data, and $\{(Mi-N1)+Ei\}$ mod N2 represents a remainder obtained by dividing $\{(Mi-N1)+Ei\}$ by N2, and wherein the forbidden codes exclude video data.

2. A method of transmitting video data, utilizing a processor, comprising the steps of:

subjecting digital information data to enciphering process in such a manner as not to produce forbidden code for producing enciphered digital information data which do not contain any forbidden code, wherein said digital information data comprises a group of data including timing identification data in the form of forbidden codes which are not used as information codes for representing information, wherein said digital information data is contained in word sequence data which contain also time reference code data constituted with the timing identification codes in addition to the digital information data;

producing enciphered word sequence data which include the enciphered digital information data and the time reference code data; and transmitting the enciphered word sequence data, wherein the digital information data and one of pseudo-random number data and genuine random number data are subjected to operational process without producing forbidden code to produce the enciphered digital information data, wherein the operational process to which the digital information data and one of the pseudo-random number data and the genuine random number data are subjected without producing the forbidden code, includes converting operation for converting the digital information data to word-position-converted word sequence data having a range of information codes adjacent at its one end to the forbidden codes by writing the digital information data in a memory and reading the digital information data from the memory, and adding, subtracting and modulo operations relating to the word-position-converted word sequence data and one of the pseudo-random number data and the genuine random number data each performed with data representing the number of the forbidden codes arranged out of one side of the range of the information codes of the word-position-converted word sequence data and data representing the number of the information codes of the word-position-converted word sequence data, wherein, the adding, subtracting and modulo operations relating to the digital information data, is represented with an equation $Ci=\{(Mi-N1)+Ei\} \mod N2+N1$, wherein Mi represents a code position number for each of the information codes of the digital information data, Ci represents a code position number for each of the information codes of the enciphered digital information data, Ei represents code position number for each of 10-bit code of the pseudo-random number data, N1 represents the number of the forbidden codes arranged out of one side of the range of the information codes of the digital information data, N2 represents the number of the information codes of the digital information data, and $\{(Mi-N1)+Ei\} \mod N2$ represents a remainder obtained by dividing $\{(Mi-N1)+Ei\}$ by N2 and wherein the forbidden codes exclude video data.

3. An apparatus for transmitting video data comprising:

an enciphering processor for subjecting digital information data to enciphering process in such a manner as not to produce forbidden code for producing enciphered digital information data which do not contain any forbidden code, wherein said digital information data comprises a group of data including timing identification data in the form of forbidden codes which are not used as information codes for representing information, and wherein said digital information data is contained in word sequence data which contain also time reference code data constituted with the timing identification code in addition to the digital information data;

a data multiplexer for multiplexing the enciphered digital information data obtained from the enciphering processor and the time reference code data with each other to produce enciphered word sequence data; and a data transmitting portion for transmitting the enciphered word sequence data obtained from the data multiplexer, wherein the enciphering processor comprises a key data generating portion for supplying key data and an enciphering portion for subjecting the digital information data and one of pseudo-random number data and genuine random number data to operational process without producing forbidden code to produce the enciphered digital information data, wherein the enciphering portion comprises an adding-subtracting-modulo operation unit operative to perform adding, subtracting and modulo operations relating to the digital information data and one of the pseudo-random number data and the genuine random number data with data representing the number of the forbidden codes arranged out of one side of the range of the information codes of the digital information data and data representing the number of the information codes of the digital information data, as the operational process to which the digital information data and one of the pseudo-random number data and the genuine random number data are subjected without producing the forbidden code, wherein, the adding, subtracting and modulo operations relating to the digital information data, is represented with an equation $Ci=\{(Mi-N1)+Ei\} \mod N2+N1$, wherein Mi represents a code position number for each of the information codes of the digital information data, Ci represents a code position number for each of the information codes of the enciphered digital information data, Ei represents code position number for each of 10-bit code of the pseudo-random number data, N1 represents the number of the forbidden codes arranged out of one side of the range of the information codes of the digital information data, N2 represents the number of the information codes of the digital information data, and $\{(Mi-N1)+Ei\} \mod N2$ represents a remainder obtained by dividing $\{(Mi-N1)+Ei\}$ by N2, and wherein the forbidden codes exclude video data.

4. An apparatus for transmitting video data comprising: an enciphering processor for subjecting digital information data to enciphering process in such a manner as not to produce forbidden code for producing enciphered digital information data which do not contain any forbidden code, wherein said digital information data comprises a group of data including timing identification data in the form of forbidden codes which are not used as information codes for representing information, and wherein said digital information data is contained in word sequence data which contain also time reference code data constituted with the timing identification code in addition to the digital information data;

a data multiplexer for multiplexing the enciphered digital information data obtained from the enciphering processor and the time reference code data with each other to produce enciphered word sequence data; and a data transmitting portion for transmitting the enciphered word sequence data obtained from the data multiplexer, wherein the enciphering processor comprises a key data generating portion for supplying key data and an enciphering portion for subjecting the digital information data and one of pseudo-random number data and genuine random number data to operational process without producing forbidden code to produce the enciphered digital information data, wherein the enciphering portion comprises a memory for converting the digital information data written therein to word-position-converted word sequence data having a range of information codes adjacent at its one end to the forbidden codes and read therefrom, and an adding-subtracting-modulo operation unit operative to perform adding, subtracting and modulo operations relating to the word-position-converted word sequence data and one of the pseudo-random number data and the genuine random number data with data representing the number of the forbidden codes arranged out of one side of the range of the information codes of the word-position-converted word sequence data and data representing the number of the information codes of the word-position-converted word sequence data, as the operational process to which the digital information data and one of the pseudo-random number data and the genuine random number data are subjected without producing the forbidden code, wherein, the adding, subtracting and modulo operations relating to the word-position-converted word sequence data, is represented with an equation $Ci=\{(Mi-N1)+Ei\}$ mod $N2+N1$, wherein $Mi$ represents a code position number for each of the information codes of the digital information data, $Ci$ represents a code position number for each of the information codes of the enciphered digital information data, $Ei$ represents code position number for each of 10-bit code of the pseudo-random number data, $N1$ represents the number of the forbidden codes arranged out of one side of the range of the information codes of the digital information data, $N2$ represents the number of the information codes of the digital information data, and $\{(Mi-N1)+Ei\}$ mod $N2$ represents a remainder obtained by dividing $\{(Mi-N1)+Ei\}$ by $N2$ and wherein the forbidden codes exclude video data.

5. A method of transmitting video data, utilizing a processor, comprises the steps of:

subjecting digital information data to enciphering process in such a manner as not to produce forbidden code for producing enciphered digital information data which do not contain any forbidden code, wherein said digital information data comprises a group of data including timing identification data in the form of forbidden codes which are not used as information codes for representing information, and wherein said digital information data is contained in word sequence data which also contain time reference code data constituted with the timing identification codes in addition to the digital information data;

producing enciphered word sequence data which include the enciphered digital information data and the time reference code data;

transmitting the enciphered word sequence data, receiving the enciphered word sequence data transmitted for obtaining the enciphered digital information data from the enciphered word sequence data;

subjecting the enciphered digital information data to deciphering process for reproducing the digital information data; and reproducing the word sequence data which include the reproduced digital information data and the time reference code data wherein the digital information data and one of first pseudo-random number data and first genuine random number data are subjected to operational process without producing forbidden code to produce the enciphered digital information data and the enciphered digital information data and one of second pseudo-random number data and second genuine random number data are subjected to operational process to produce the reproduced digital information data, wherein the operational process to which the digital information data and one of the first pseudo-random number data and the first genuine random number data are subjected without producing the forbidden code, includes adding, subtracting and modulo operations relating to the digital information data and one of the first pseudo-random number data and the first genuine random number data each performed with data representing the number of the forbidden codes arranged out of one side of the range of the information codes of the digital information data and data representing the number of the information codes of the digital information data, and the operational process to which the enciphered digital information data and one of the second pseudo-random number data and the second genuine random number data are subjected, includes adding, subtracting and modulo operations relating to the enciphered digital information data and one of the second pseudo-random number data and the second genuine random number data each performed with data representing the number of the forbidden codes arranged out of one side of the range of the information codes of the enciphered digital information data and data representing the number of the information codes of the enciphered digital information data, wherein, the adding, subtracting and modulo operations relating to the digital information data, is represented with an equation $Ci=\{(Mi-N1)+Ei\}$ mod $N2+N1$, wherein $Mi$ represents a code position number for each of the information codes of the digital information data, $Ci$ represents a code position number for each of the information codes of the enciphered digital information data, $Ei$ represents code position number for each of 10-bit code of the pseudo-random number data, $N1$ represents the number of the forbidden codes arranged out of one side of the range of the information codes of the digital information data, $N2$ represents the number of the information codes of the digital information data, and $\{(Mi-N1)+Ei\}$ mod $N2$ represents a remainder obtained by dividing $\{(Mi-N1)+Ei\}$ by $N2$, wherein, the adding, subtracting and modulo operations relating to the enciphered digital information data, is represented with an equation $Mi=\{(Ci-N1)+Ei\}$ mod $N2+N1$, wherein $\{(Ci-N1)+Ei\}$ mod $N2$ represents a remainder obtained by dividing $\{(Ci-N1)+Ei\}$ by $N2$, and wherein the forbidden codes exclude video data.

6. A method of transmitting video data, utilizing a processor, comprises the steps of:

subjecting digital information data to enciphering process in such a manner as not to produce forbidden code for producing enciphered digital information data which do not contain any forbidden code, wherein said digital information data comprises a group of data including timing identification data in the form of forbidden codes which are not used as information codes for representing information, and wherein said digital information data is contained in word sequence data which also contain time reference code data constituted with the timing identification codes in addition to the digital information data;

producing enciphered word sequence data which include the enciphered digital information data and the time reference code data;

transmitting the enciphered word sequence data, receiving the enciphered word sequence data transmitted for obtaining the enciphered digital information data from the enciphered word sequence data;

subjecting the enciphered digital information data to deciphering process for reproducing the digital information data; and reproducing the word sequence data which include the reproduced digital information data and the time reference code data wherein the digital information data and one of first pseudo-random number data and first genuine random number data are subjected to operational process without producing forbidden code to produce the enciphered digital information data and the enciphered digital information data and one of second pseudo-random random number data are subjected to operational process to produce the reproduced digital information data, wherein the operational process to which the digital information data and one of the first pseudo-random number data and the first genuine random number data are subjected without producing the forbidden code, includes converting operation for converting the digital information data to word-position-converted word sequence data having a range of information codes adjacent at its one end to the forbidden codes by writing the digital information data in a first memory and reading the digital information data from the first memory, and adding, subtracting and modulo operations relating to the word-position-converted word sequence data and one of the first pseudo-random number data and the first genuine random number data each performed with data representing the number of the forbidden codes arranged out of one side of the range of the information codes of the word-position-converted word sequence data and data representing the number of the information codes of the word-position-converted word sequence data, and the operational process to which the enciphered digital information data and one of the second pseudo-random number data and the second genuine random number data are subjected, includes adding, subtracting and modulo operations relating to the enciphered digital information data and one of the second pseudo-random number data and the second genuine random number data each performed with data representing the number of the forbidden codes arranged out of one side of the range of the information codes of the enciphered digital information data and data representing the number of the information codes of the enciphered digital information data, and converting operation for converting word-position-converted word sequence data obtained by the adding, subtracting and modulo operations relating to the enciphered digital information data and written in a second memory to the reproduced digital information data read from the second memory, wherein, the adding, subtracting and modulo operations relating to the word-position-converted word sequence data, is represented with an equation $Ci=\{(Mi-N1)+Ei\}$ mod $N2+N1$, wherein $Mi$ represents a code position number for each of the information codes of the digital information data, $Ci$ represents a code position number for each of the information codes of the enciphered digital information data, $Ei$ represents code position number for each of 10-bit code of the pseudo-random number data, $N1$ represents the number of the forbidden codes arranged out of one side of the range of the information codes of the digital information data, $N2$ represents the number of the information codes of the digital information data, and $\{(Mi-N1)+Ei\}$ mod $N2$ represents a remainder obtained by dividing $\{(Mi-N1)+Ei\}$ by $N2$, wherein, the adding, subtracting and modulo operations relating to the enciphered digital information data, is represented with an equation $Mi=\{(Ci-N1)+Ei\}$ mod $N2+N1$, wherein $\{(Ci-N1)+Ei\}$ mod $N2$ represents a remainder obtained by dividing $\{(Ci-N1)+Ei\}$ by $N2$, and wherein the forbidden codes exclude video data.

7. An apparatus for transmitting video data comprising:

an enciphering processor for subjecting digital information data to enciphering process in such a manner as not to produce forbidden code for producing enciphered digital information data which do not contain any forbidden code, wherein said digital information data containing a group of data including timing identification data in the form of forbidden codes which are not used as information codes for representing information, and wherein said digital information data is contained in word sequence data which also contain time reference code data constituted with the timing identification code in addition to the digital information data, a first data multiplexer for multiplexing the enciphered digital information data obtained from the enciphering processor and the time reference code data with each other to produce enciphered word sequence data;

a data transmitting portion for transmitting the enciphered word sequence data obtained from the first data multiplexer;

a deciphering processor for receiving the enciphered word sequence data transmitted by the data transmitting portion to obtain the enciphered digital information data from the enciphered word sequence data and subjecting the enciphered digital information data to deciphering process for reproducing the digital information data; and a second data multiplexer for multiplexing the reproduced digital information data and the time reference code data with each other to reproduce the word sequence data, wherein the enciphering processor comprises a first key data generating portion for supplying first key data and an enciphering portion for subjecting the digital information data and one of first pseudo-random number data and first genuine random number data to operational process without producing forbidden code to produce the enciphered digital information data, and the deciphering processor comprises a second key data generating portion for supplying second key data and an deciphering portion for subjecting the enciphered digital information data and one of second pseudo-random number data and second genuine random number data to operational process to obtain the reproduced digital information data, wherein the enciphering portion comprises a first adding-subtracting-modulo operation unit operative to perform adding, subtracting and modulo operations relating to the digital information data and one of the first pseudo-random number data and the first genuine random number data with data representing the number of the forbidden codes arranged out of one side of the range of the information codes of the digital information data and data representing the number of the information codes of the digital information data, as the operational process to which the digital information data and one of the first pseudo-random number data and the first genuine random number data are subjected without producing the forbidden code, and the deciphering portion comprises a second adding-subtracting-modulo operation unit operative to perform adding, subtracting and modulo operations relating to the enciphered digital information data and one of the second pseudo-random number data and the second genuine random number data with data representing the number of the forbidden codes arranged out of one side of the range of the information codes of the enciphered digital information data and data representing the number of the information codes of the enciphered digital information data, as the operational process to which the enciphered digital information data and one of the second pseudo-random number data and the second genuine random number data are subjected, wherein, the adding, subtracting and modulo operations relating to the word-position-converted word sequence data, is represented with an equation $C_i = \{(M_i - N_1) + E_i\} \mod N_2 + N_1$, wherein $M_i$ represents a code position number for each of the information codes of the digital information data, $C_i$ represents a code position number for each of the information codes of the enciphered digital information data, $E_i$ represents code position number for each of 10-bit code of the pseudo-random number data, $N_1$ represents the number of the forbidden codes arranged out of one side of the range of the information codes of the digital information data, $N_2$ represents the number of the information codes of the digital information data, and $\{(M_i - N_1) + E_i\} \mod N_2$ represents a remainder obtained by dividing $\{(M_i - N_1) + E_i\}$ by $N_2$, wherein, the adding, subtracting and modulo operations relating to the enciphered digital information data, is represented with an equation $M_i = \{(C_i - N_1) + E_i\} \mod N_2 + N_1$, wherein $\{(C_i - N_1) + E_i\} \mod N_2$ represents a remainder obtained by dividing $\{(C_i - N_1) + E_i\}$ by $N_2$, and wherein the forbidden codes exclude video data.

8. An apparatus for transmitting video data comprising: an enciphering processor for subjecting digital information data to enciphering process in such a manner as not to produce forbidden code for producing enciphered digital information data which do not contain any forbidden code, wherein said digital information data containing a group of data including timing identification data in the form of forbidden codes which are not used as information codes for representing information, and wherein said digital information data is contained in word sequence data which also contain time reference code data constituted with the timing identification code in addition to the digital information data, a first data multiplexer for multiplexing the enciphered digital information data obtained from the enciphering processor and the time reference code data with each other to produce enciphered word sequence data;

a data transmitting portion for transmitting the enciphered word sequence data obtained from the first data multiplexer;

a deciphering processor for receiving the enciphered word sequence data transmitted by the data transmitting portion to obtain the enciphered digital information data from the enciphered word sequence data and subjecting the enciphered digital information data to deciphering process for reproducing the digital information data; and a second data multiplexer for multiplexing the reproduced digital information data and the time reference code data with each other to reproduce the word sequence data, wherein the enciphering processor comprises a first key data generating portion for supplying first key data and an enciphering portion for subjecting the digital information data and one of first pseudo-random number data and first genuine random number data to operational process without producing forbidden code to produce the enciphered digital information data, and the deciphering processor comprises a second key data generating portion for supplying second key data and an deciphering portion for subjecting the enciphered digital information data and one of second pseudo-random number data and second genuine random number data to operational process to obtain the reproduced digital information data, wherein the enciphering portion comprises a first memory for converting the digital information data written therein to word-position-converted word sequence data having a range of information codes adjacent at its one end to the forbidden codes and read therefrom, and a first adding-subtracting-modulo operation unit operative to perform adding, subtracting and modulo operations relating to the word-position-converted word sequence data and one of the first pseudo-random number data and the first genuine random number data with data representing the number of the forbidden codes arranged out of one side of the range of the information codes of the word-position-converted word sequence data and data representing the number of the information codes of the word-position-converted word sequence data, as the operational process to which the digital information data and one of the first pseudo-random number data and the first genuine random number data are subjected without producing the forbidden code, and the deciphering portion comprises a second adding-subtracting-modulo operation unit operative to perform adding, subtracting and modulo operations relating to the enciphered digital information data and one of the second pseudo-random number data and the second genuine random number data with data representing the number of the forbidden codes arranged out of one side of the range of the information codes of the enciphered digital information data and data representing the number of the information codes of the enciphered digital information data, as the operational process to which the enciphered digital information data and one of the second pseudo-random number data and the second genuine random number data are subjected, and a second memory for converting word-position-converted word sequence data obtained from the second adding-subtracting-modulo operation unit and written therein to the reproduced digital information data read therefrom, wherein, the adding, subtracting and modulo operations relating to the word-position-converted word sequence data, is represented with an equation $C_i = \{(M_i - N_1) + E_i\} \mod N_2 + N_1$, wherein $M_i$ represents a code position number for each of the information codes of the digital information data, $C_i$ represents a code position number for each of the information codes of the enciphered digital information data, $E_i$ represents code position number for each of 10-bit code of the pseudo-random number data, $N_1$ represents the number of the forbidden codes arranged out of one side of the range of the information codes of the digital information data, $N_2$ represents the number of the information codes of the digital information data, and $\{(Mi-N1)+Ei\}$ mod N2 represents a remainder obtained by dividing $\{(Mi-N1)+Ei\}$ by N2, wherein, the adding, subtracting and modulo operations relating to the enciphered digital information data, is represented with an equation $Mi=\{(Ci-N1)+Ei\}$ mod N2+N1, wherein $\{(Ci-N1)+Ei\}$ mod N2 represents a remainder obtained by dividing $\{(Ci-N1)+Ei\}$ by N2, and wherein the forbidden codes exclude video data.

9. A method of receiving video data, utilizing a processor, comprising the steps of:

receiving enciphered word sequence data, wherein the enciphered word sequence data includes enciphered digital information data and time reference code data, wherein enciphered digital information data and one of pseudo-random number data and genuine random number data are subjected to operational process to produce digital information data, wherein the operational process to which the enciphered digital information data and one of the pseudo-random number data and the genuine random number data are subjected, includes adding, subtracting and modulo operations relating to the enciphered digital information data and one of the pseudo-random number data and the genuine random number data each performed with data representing the number of the forbidden codes arranged out of one side of the range of the information codes of the enciphered digital information data and data representing the number of the information codes of the digital information data, wherein said digital information data comprises a group of data including timing identification data in the form of forbidden codes which are not used as information codes for representing information, wherein, the adding, subtracting and modulo operations relating to the enciphered digital information data, is represented with an equation $Mi=\{(Ci-N1)+Ei\}$ mod N2+N1, wherein Mi represents a code position number for each of the information codes of the digital information data, Ci represents a code position number for each of the information codes of the enciphered digital information data, Ei represents code position number for each of 10-bit code of the pseudo-random number data, N1 represents the number of the forbidden codes arranged out of one side of the range of the information codes of the digital information data, N2 represents the number of the information codes of the digital information data, and $\{(Ci-N1)+Ei\}$ mod N2 represents a remainder obtained by dividing $\{(Ci-N1)+Ei\}$ by N2, and wherein the forbidden codes exclude video data.

10. A method of receiving video, utilizing a processor, data comprising the steps of:

receiving enciphered word sequence data, wherein the enciphered word sequence data includes enciphered digital information data and time reference code data, wherein enciphered digital information data and one of pseudo-random number data and genuine random number data are subjected to an operational process to produce the digital information data, wherein the operational process to which the enciphered digital information data and one of the pseudo-random number data and the genuine random number data are subjected, includes adding, subtracting and modulo operations relating to the enciphered digital information data and one of the pseudo-random number data and the genuine random number data each performed with data representing the number of the forbidden codes arranged out of one side of the range of the information codes of the enciphered digital information data and data representing the number of the information codes of the enciphered digital information data, and converting operation for converting word-position-converted word sequence data obtained by the adding, subtracting and modulo operations relating to the enciphered digital information data and written in a memory to the digital information data read from the memory, wherein said digital information data comprises a group of data including timing identification data in the form of forbidden codes which are not used as information codes for representing information, wherein, the adding, subtracting and modulo operations relating to the enciphered digital information data, is represented with an equation $Mi=\{(Ci-N1)+Ei\}$ mod N2+N1, wherein Mi represents a code position number for each of the information codes of the digital information data, Ci represents a code position number for each of the information codes of the enciphered digital information data, Ei represents code position number for each of 10-bit code of the pseudo-random number data, N1 represents the number of the forbidden codes arranged out of one side of the range of the information codes of the digital information data, N2 represents the number of the information codes of the digital information data, and $\{(Ci-N1)+Ei\}$ mod N2 represents a remainder obtained by dividing $\{(Ci-N1)+Ei\}$ by N2, and wherein the forbidden codes exclude video data.

\* \* \* \* \*